(12) United States Patent
Funk et al.

(10) Patent No.: US 8,706,414 B2
(45) Date of Patent: Apr. 22, 2014

(54) METHOD AND SYSTEM FOR LOCATING AND MONITORING FIRST RESPONDERS

(75) Inventors: Benjamin E. Funk, Silver Spring, MD (US); Amrit Bandyopadhyay, Greenbelt, MD (US); Eric A. Kohn, Washington, DC (US); Neil Goldsman, Takoma Park, MD (US); Carole A. Teolis, Glendale, MD (US); Gilmer L. Blankeship, Washington, DC (US)

(73) Assignee: TRX Systems, Inc., Greenbelt, MD (US)

( * ) Notice: Subject to any disclaimer, the term of this patent is extended or adjusted under 35 U.S.C. 154(b) by 0 days.

(21) Appl. No.: 13/616,323

(22) Filed: Sep. 14, 2012

(65) Prior Publication Data
US 2013/0166198 A1    Jun. 27, 2013

Related U.S. Application Data

(63) Continuation of application No. 11/756,412, filed on May 31, 2007.

(60) Provisional application No. 60/809,900, filed on May 31, 2006, provisional application No. 60/914,032, filed on Apr. 25, 2007.

(51) Int. Cl.
*G01C 21/00* (2006.01)
*G08G 1/123* (2006.01)

(52) U.S. Cl.
USPC ........................... 701/495; 340/995.19

(58) Field of Classification Search
CPC ....... G01S 15/876; G01S 15/04; G01S 7/523; G01S 19/49; G01C 21/16; G01C 21/165; G08B 25/016; G08G 1/20
USPC ................. 701/400–541; 340/539.13, 568.1, 340/573.1; 345/633, 156
See application file for complete search history.

(56) References Cited

U.S. PATENT DOCUMENTS

| 5,552,772 A | 9/1996 | Janky et al. |
| 5,583,776 A | 12/1996 | Levi et al. |

(Continued)

FOREIGN PATENT DOCUMENTS

| WO | WO 02/056274 | 7/2002 |
| WO | WO 2006/017266 | 2/2006 |

OTHER PUBLICATIONS

Indoor Navigation for First Responders: A feasibility Study, L. Miller, Information Technology Laboratory, National Institute of Standards and Technology, Feb. 10, 2006.*

(Continued)

*Primary Examiner* — Muhammad Shafi
(74) *Attorney, Agent, or Firm* — Baker & Hostetler LLP

(57) ABSTRACT

The invention is directed to methods and systems for locating and monitoring the status of people and moveable assets, such as first responders, including firefighters and other public service personnel, and their equipment both indoors and out. The invention provides for locating and monitoring the status of people and assets in environments where GPS systems do not operate, or where operation is impaired or otherwise limited. The system and method uses inertial navigation to determine the location, motion and orientation of the personnel or assets and communicates with an external monitoring station to receive requests for location, motion orientation and status information and to transmit the location, motion orientation and status information to the monitoring station.

22 Claims, 41 Drawing Sheets

(56) References Cited

U.S. PATENT DOCUMENTS

| | | |
|---|---|---|
| 5,645,077 A | 7/1997 | Foxlin |
| 5,742,509 A | 4/1998 | Goldberg et al. |
| 5,774,385 A * | 6/1998 | Bristol .................... 708/203 |
| 5,899,963 A | 5/1999 | Hutchings |
| 5,956,660 A | 9/1999 | Neumann |
| 5,977,913 A | 11/1999 | Christ |
| 6,061,021 A | 5/2000 | Zibell |
| 6,122,960 A | 9/2000 | Hutchings et al. |
| 6,181,253 B1 | 1/2001 | Eschenbach et al. |
| 6,240,367 B1 | 5/2001 | Lin |
| 6,366,855 B1 | 4/2002 | Reilly et al. |
| 6,415,223 B1 | 7/2002 | Lin et al. |
| 6,474,159 B1 | 11/2002 | Foxlin et al. |
| 6,496,779 B1 | 12/2002 | Hwang |
| 6,504,483 B1 | 1/2003 | Richards et al. |
| 6,512,455 B2 | 1/2003 | Finn et al. |
| 6,522,266 B1 | 2/2003 | Soehren et al. |
| 6,622,090 B2 | 9/2003 | Lin |
| 6,631,323 B2 | 10/2003 | Tucker et al. |
| 6,658,354 B2 | 12/2003 | Lin |
| 6,681,629 B2 | 1/2004 | Foxlin et al. |
| 6,721,769 B1 | 4/2004 | Rappaport et al. |
| 6,813,582 B2 | 11/2004 | Levi et al. |
| 6,826,477 B2 | 11/2004 | Ladetto et al. |
| 6,833,811 B2 | 12/2004 | Zeitfuss et al. |
| 6,847,892 B2 | 1/2005 | Zhou et al. |
| 6,850,844 B1 | 2/2005 | Walters et al. |
| 6,898,559 B2 | 5/2005 | Saitta |
| 6,900,732 B2 | 5/2005 | Richards |
| 6,922,632 B2 | 7/2005 | Foxlin |
| 6,944,542 B1 | 9/2005 | Eschenbach |
| 7,000,469 B2 | 2/2006 | Foxlin et al. |
| 7,015,831 B2 | 3/2006 | Karlsson et al. |
| 7,034,678 B2 | 4/2006 | Burkley et al. |
| 7,091,851 B2 | 8/2006 | Mason et al. |
| 7,091,852 B2 | 8/2006 | Mason et al. |
| 7,103,471 B2 | 9/2006 | Levi et al. |
| 7,135,992 B2 | 11/2006 | Karlsson et al. |
| 7,143,130 B2 | 11/2006 | Lin |
| 7,145,478 B2 | 12/2006 | Goncalves et al. |
| 7,161,504 B2 * | 1/2007 | Linn .................... 340/995.13 |
| 7,162,338 B2 | 1/2007 | Goncalves et al. |
| 7,177,737 B2 | 2/2007 | Karlsson et al. |
| 7,199,754 B2 | 4/2007 | Krumm et al. |
| 7,203,497 B2 | 4/2007 | Belcea |
| 7,239,953 B2 | 7/2007 | Braunberger et al. |
| 7,245,215 B2 | 7/2007 | Gollu et al. |
| 7,245,216 B2 | 7/2007 | Burkley et al. |
| 7,250,907 B2 | 7/2007 | Krumm et al. |
| 7,263,379 B1 | 8/2007 | Parkulo et al. |
| 7,272,467 B2 | 9/2007 | Goncalves et al. |
| 7,295,119 B2 | 11/2007 | Rappaport et al. |
| 7,301,648 B2 | 11/2007 | Foxlin |
| 7,302,359 B2 | 11/2007 | McKitterick |
| 7,305,303 B2 | 12/2007 | Soehren et al. |
| 7,379,015 B2 | 5/2008 | Workman |
| 7,389,207 B2 | 6/2008 | Saitta |
| 7,400,246 B2 | 7/2008 | Breeding |
| 7,403,853 B1 | 7/2008 | Janky et al. |
| 7,405,658 B2 | 7/2008 | Richards |
| 2001/0026240 A1 | 10/2001 | Neher |
| 2002/0010694 A1 | 1/2002 | Navab et al. |
| 2002/0026283 A1 | 2/2002 | Tucker et al. |
| 2002/0072881 A1 | 6/2002 | Saitta |
| 2002/0193091 A1 | 12/2002 | Zmarthie |
| 2003/0018430 A1 * | 1/2003 | Ladetto et al. ............ 701/217 |
| 2003/0045998 A1 | 3/2003 | Medl |
| 2003/0135324 A1 | 7/2003 | Navab |
| 2003/0144795 A1 | 7/2003 | Lin |
| 2003/0158635 A1 | 8/2003 | Pillar et al. |
| 2003/0158664 A1 | 8/2003 | Swope et al. |
| 2003/0191582 A1 | 10/2003 | Terada |
| 2003/0214410 A1 | 11/2003 | Johnson et al. |
| 2004/0021569 A1 * | 2/2004 | Lepkofker et al. ......... 340/568.1 |
| 2004/0066329 A1 | 4/2004 | Zeitfuss et al. |
| 2004/0073360 A1 | 4/2004 | Foxlin |
| 2004/0148125 A1 | 7/2004 | Fager et al. |
| 2004/0167688 A1 | 8/2004 | Karlsson et al. |
| 2005/0033515 A1 | 2/2005 | Bozzone |
| 2005/0060088 A1 | 3/2005 | Helal et al. |
| 2005/0182518 A1 | 8/2005 | Karlsson |
| 2005/0197769 A1 | 9/2005 | Soehren et al. |
| 2005/0228613 A1 | 10/2005 | Fullerton et al. |
| 2005/0234679 A1 | 10/2005 | Karlsson |
| 2005/0242947 A1 * | 11/2005 | Burneske et al. ......... 340/539.13 |
| 2005/0250440 A1 | 11/2005 | Zhou et al. |
| 2005/0289162 A1 | 12/2005 | Saitta |
| 2006/0002590 A1 | 1/2006 | Borak |
| 2006/0023681 A1 | 2/2006 | A'Rafat |
| 2006/0027404 A1 | 2/2006 | Foxlin |
| 2006/0074540 A1 | 4/2006 | Braunberger et al. |
| 2006/0125644 A1 | 6/2006 | Sharp |
| 2006/0195254 A1 | 8/2006 | Ladetto et al. |
| 2006/0256001 A1 | 11/2006 | Markhovsky et al. |
| 2006/0267833 A1 | 11/2006 | Langford et al. |
| 2006/0287824 A1 | 12/2006 | Lin |
| 2007/0032748 A1 | 2/2007 | McNeil et al. |
| 2007/0050129 A1 | 3/2007 | Salmre |
| 2007/0073482 A1 | 3/2007 | Churchill et al. |
| 2007/0075898 A1 | 4/2007 | Markhovsky et al. |
| 2007/0090973 A1 | 4/2007 | Karlsson et al. |
| 2007/0093962 A1 | 4/2007 | Swope et al. |
| 2007/0126623 A1 | 6/2007 | Workman |
| 2007/0139200 A1 | 6/2007 | Yushkov et al. |
| 2007/0150195 A1 | 6/2007 | Koskan et al. |
| 2007/0168126 A1 | 7/2007 | Wence et al. |
| 2007/0168127 A1 | 7/2007 | Zaruba et al. |
| 2007/0219711 A1 | 9/2007 | Kaldewey et al. |
| 2007/0222674 A1 | 9/2007 | Tan et al. |
| 2007/0241886 A1 | 10/2007 | Breeding |
| 2007/0260418 A1 | 11/2007 | Ladetto et al. |
| 2007/0262884 A1 | 11/2007 | Goncalves et al. |
| 2007/0271011 A1 | 11/2007 | Lee et al. |
| 2007/0271037 A1 | 11/2007 | Overstreet et al. |
| 2007/0281745 A1 | 12/2007 | Parkulo et al. |
| 2007/0282565 A1 | 12/2007 | Bye et al. |
| 2008/0004796 A1 | 1/2008 | Schott et al. |
| 2008/0036594 A1 | 2/2008 | Kates |
| 2008/0040071 A1 | 2/2008 | McKitterick |
| 2008/0150724 A1 | 6/2008 | Richards |
| 2008/0186161 A1 | 8/2008 | Fussner et al. |
| 2009/0216438 A1 | 8/2009 | Shafer |
| 2012/0130632 A1 | 5/2012 | Bandyopadhyay et al. |

OTHER PUBLICATIONS

AGNC Coremicro® AHRS/INS Unit Specification, GSA Contract No. GS-24F-0014K, © 1986-2006 American GNC Corporation, 1 page.

AHRS440 MEMS-Based AHRS System, Crossbow, Document Part No. 6020-0087-02 Rev B, 2-page brochure. [No Date].

Atair Aerospace Circinus Overview, GPS-Integrated IMU, http://www.atairaerosoace.com/circinus/, © 2008 Atair Aerospace, Inc., 4 pages.

Bailey, Tim, et al., "Simultaneous Localization and Mapping (SLAM): Part II", Tutorial, IEEE Robotics & Automation Magazine, Sep. 2006, pp. 108-117.

Bennewitz, Maren, et al., "Adapting Navigation Strategies Using Motions Patterns of People", Proceedings of the 2003 IEEE International Conference on Robotics & Automation, Taipei, Taiwan, Sep. 14-19, 2003, pp. 2000-2005.

Brown, Alison K., et at., "Performance Test Results of an Integrated GPS/MEMS Inertial Navigation Package", Proceedings of ION GNSS 2004, Long Beach, California, Sep. 2004, 8 pages.

Clipp., Brian, Simultaneous Localization and Mapping, Comp 790-072 Robotics, PowerPoint Presentation, [no date], 47 slides.

Cross, Paul, et al., "Intelligent Navigation, Inertial Integration, Double Assistance for GPS", GPS World, May 1, 2002, 7 pages.

Cyganski, D., et al., WPI Precision Personnel Locator System Indoor Location Demonstrations and RF Design Improvements, Electrical and Computer Engineering Department, Worcester Polytechnic Institute, [no date], pp. 511-521.

(56) References Cited

OTHER PUBLICATIONS

Cyganski, David, et al., "Performance Limitations of a Precision Indoor Positioning System Using a Multi-Carrier Approach", ION NTM 2005, San Diego, California, Jan. 24-26, 2005, 1093-1100.
Desouza, Guiherme, et al., Vision for Mobile Robot Navigation: A Survey, IEEE Transactions on Pattern Analysis and Machine Intelligence, Feb. 2002, 24(2), 237-267.
Diebel, J., et al., "Simultaneous Localization and Mapping with Active Stereo Vision", Proceedings of 2004 IEEE/RSJ International Conference on Intelligent Robots and S stems, Sendai, Japan, Sep. 28-Oct. 2, 2004, pp. 3436-3443.
Doucet, Arnaud, et al., "Monte Carlo Methods for Signal Processing: A Review in the Statistical Signal Processing Context", IEEE Sional Processino Magazine, Nov. 2005, pp. 152-170.
Durrant-Whyte, Hugh, "Uncertain Geometry in Robotics", IEEE Journal of Robotics and Automation, Feb. 1988, 4(1), pp. 23-31.
Durrant-Whyte, Hugh, et al., "Simultaneous Localization and Mapping: Part 1", Tutorial, IEEE Robotics & Automation Magazine, Jun. 2006, pp. 99-108.
European Patent Application No. 08797306.1—Supplementary European Search Report dated Aug. 28, 2012, 8 pages.
Foxlin, Eric, "Intertial Head-Tracker Sensor Fusion by a Complementary Separate-Bias Kalman Filter", Proceedinas of VRAIS '96, © 1996 1EEE, 185-194.
Foxlin, Eric, "Pedestrian Tracking with Shoe-Mounted Inertial Sensors", Moving Mixed Reality into the Real World, published by the IEEE Computer Society, Nov./Dec. 2005, 38-46.
Godha, S., et al., "Integrated GPS/INS System for Pedestrian Navigation in a Signal Degraded Environment", ION GNSS 2006, Fort Worth, Texas, Sep. 26-29, 2006, 14 pages.
Group 1 Solutions, Inc. Press Release, "Remote AccessTM Showcased at Fire Rescue International Advanced Technology Center", Sep. 15, 2006, 1 page.
HG1900 MEMS IMU (Inertial Measurement Unit), "Next-Generation Inertial Measurement Unit Provides Sophisticated Guidance for Tactical Military Applications", Honeywell, © 2004, Mar. 2005, 2-page brochure.
Jensfelt, P., et al., "A Framework for Vision Based Bearing Only 3D SLAM", Proceedings of the 2006 IEE International Conference on Robotics and Automation, Orlando, Florida, May 2006, pp. 1944-1950.
Langelaan, Jack, eta/., "Passive GPS-Free Navigation for Small UAVs", IEEEAC Paper No. 1132, © 2005 IEEE, 9 pages.
Lee, Dr. Young C., eta/., "A Performance Analysis of a Tightly Coupled GPS/Inertial System for Two Integrity Monitoring Methods", © 1999, The MITRE Corporation, Center for Advanced Aviation System Development (CAASD), Mclean, Virginia, 14 pages.
Life-Line Wireless Environment & Safety Monitoring System, © 2006, Safe Environment Engineering, http://www.safeenv.com, one page.
MEMSense IJIMU Micro Inertial Measurement Unit, Series Documentation, Document DN00009, Revision 2.8, Nov. 2007, 12 pages.
MEMSense niMU Nano Inertial Measurement Unit, Series Documentation, Document DN00010, Version 2.9, Nov. 2007, 15 pages.
Miller, Leonard E., "Indoor Navigation for First Responders: A Feasibility Study", Wireless Communication Technologies Group, Advanced Networking Technologies Division, Information Technology Laboratory, National Institute of Standards and Technology, Feb. 10, 2006, 56 pages.
Montemerlo, Michael, et al., "Conditional Particle Filters for Simultaneous Mobile Robot Localization and People-Tracking", Proceedings of the 2002 IEEE International Conference on Robotics & Automation, Washington, D.C., May 2002, 7 pages.
Montemerlo, Michael, et al., "FastSLAM 2.0: An Improved Particle Filtering Algorithm for Simultaneous Localization and Mapping that Provably Converges", [no date], 6 pages.
Park, Sang-Cheol, et al., "Fast Distance Computation with a Stereo Head-Eye System", BMCV 2000, LNCS 1811, © 2000, pp. 434-443.
Se, Stephen, et al., "Vision-Based Global Localization and Mapping for Mobile Robots", IEEE Transactions on Robotics, 21(3), Jun. 2005, 364-375.
Smith, Randall, et al., "Estimating Uncertain Spatial Relationships in Robotics", SRI International, [no date]. 26 pages.
U.S. Appl. No. 12/187,067—U.S. Final Office Action dated Aug. 22, 2012, 11 pages.
U.S. Appl. No. 12/187,067—U.S. Non-Final Office Action dated Dec. 9, 2010, 5 pages.
Yi, Sooyeong, et al., "An Omnidirectional Stereo Vision System Using a Single Camera", © 2006, IEEE, 6 pages.

\* cited by examiner

Sentinel System Satelite Views

The SATELITE IMAGERY tab allows the Incident Commanders and firefighters to plan the mission on the way to the incident scene and at the scene.
It provides geographic and structural awareness of the surrounding area.

TOP VIEW: The top view reveals critical roof information for Roof and Venting operations.

N,S,E,W views provide side views of the building revealing window, exit and other structural information.

From: *Microsoft Live Locals*

Fig. 26

Sentinel System Satelite Views

MFRI SOUTH VIEW

The Sentinel System provides views of the building from the NORTH, SOUTH, EAST, and WEST, to give the Incident Commander complete awareness of the Incident Scene.

Sentinel Preplan View

| RAW INU | Outdoor View | Indoor View | Satellite Imagery | Pre Plan View |

Raw INU Pict. | Outdoor View | Indoor View | Satellite Imagery | Pre-Plan Notes | Dual View

Building Address  Additional Information

4500 Point Branch Parkway
College Park, MD 20742

Building Type
O TYPE I - Fire-Resistive Construction
⦿ TYPE II - Non/Limited Combustable Construction
O TYPE III - Ordinary Construction
O TYPE IV - Heavy Timber Construction
O TYPE V - Wood Frame Construction

Pre-Plan Notes

PRINCE GEORGE'S COUNTY FIRE/EMS DEPARTMENT PRE-PLAN FACT SHEET — PGFD

BUILDING NAME_____ ADDRESS_____
CONSTRUCTION TYPE___Choose Type___ PRINCIPAL OCCUPANCY_____
ROOF CONSTRUCTION - SUPPORTS_____ SURFACE_____
AREAS OF DANGER/TRAPPED/DISABLED OCCUPANTS_____

LIKELY FIRE BEHAVIOR/FUEL LOAD_____

HVAC - TYPE/FEATURES/VALUE_____
OWNER NAME/ADDRESS/PHONE_____

OCCUPANT/MANAGER - NAME/ADDRESS/PHONE (24 HOUR)_____

DRAWING CHECKLIST / - ITEM PRESENT AND SHOWN ON DRAWING (give side/quadrant) X - BUILDING NOT EQUIPPED WITH ITEM SITE PLAN ☐  INDICATE NORTH ☐            SITE PLAN
FLOOR PLAN ☐  INDICATE SIDE 1 ☐
STAIRWAYS ☐  ENTRANCES/EXITS ☐
FIRE WALLS ☐  EXPOSURES ☐

DIMENSIONS_____
NUMBER OD FLOORS_____
ELEVATORS_____
DETECTION SYSTEMS_____
ALARM SYSTEM CONTROL_____
SYSTEM SUPERVISION_____
ELECTRIC SHUTOFF_____
GAS SHUTOFF_____
WATER SHUTOFF_____
FUEL OIL/PROPANE SHUTOFF_____
FUEL OIL/PROPANE TANK_____

---

The SENTINEL PRE-PLAN VIEW allows firefighters to view their preplan notes within the *Sentinel System Base Station* while getting to the incident scene and at the scene.

*New Notes* and *Additional Information* and *Lessons* learnt for the building can be saved to the *DataBase* from quick reference on the next call to the location.

Fig. 28

When an ALARM is triggered the ticker of the personnel *"in alarm"* is turned red as shown in the picture revealing the location of the distress.

The figure shows the indoor location of the alarm of Nick Eid shown in the Outdoor View

METHOD AND SYSTEM FOR LOCATING AND MONITORING FIRST RESPONDERS

CROSS-REFERENCE TO RELATED APPLICATIONS

This Application is a continuation of U.S. patent application Ser. No. 11/756,412, filed on May 31, 2007, which claims priority to U.S. Provisional Patent Application Ser. No. 60/809,900, filed May 31, 2006, and U.S. Provisional Patent Application Ser. No. 60/914,032, filed on Apr. 25, 2007, each of which is hereby incorporated by reference herein in its entirety.

GOVERNMENT RIGHTS

The subject matter disclosed herein was made with government support under award/contract/grant number N41756-04-C-4193 awarded by the Department of Homeland Security, and IIP-0750498 awarded by the National Science Foundation. The Government has certain rights in the herein disclosed subject matter.

BACKGROUND

1. Technical Field of the Invention

The present invention is directed to methods and systems for locating and monitoring the status of people and moveable assets, such as first responders, including firefighters and other public service personnel, and their equipment both indoors and out. More specifically, the invention can provide for locating, and monitoring the status of, people and assets in environments where GPS systems do not operate, or where GPS operation is impaired or otherwise limited.

2. Description of the Prior Art

Global Positioning Systems (GPS) are well known systems for locating and monitoring people and assets. However, public GPS operation is limited in its accuracy by design for various reasons, including for national security. Further, the operation and accuracy of a GPS can be further limited by environmental conditions, for example, urban environments can block or limit GPS satellite signals. For the same reasons, GPS may not operate indoors.

Navigation systems and methods are typically used to provide position and tracking information for vehicles in land, sea and aerospace environments. Recently, there has been increased interest in providing navigation and tracking information on individuals moving in an indoor environment. Applications include, but are not limited to, identifying and locating individuals, pathways and exits in complex building structures during emergency situations and identifying and tracking emergency personnel in emergency search and rescue operations.

A variety of methods well-known in the art have been utilized for navigating and tracking moving vehicles in land, sea and aerospace environments. These include various forms of radio navigation methods, transponders, long range navigation beacons (LORAN), radio detection and ranging systems (RADAR), radio frequency identification and fixing, global positioning system tracking (GPS and DGPS) and space-based systems employed by the military. Typically such methods require that a moving vehicle to be equipped with radio transmitter or transceiver where location is determined by measurement of time delays of coded signals from multiple source transmitters at known stationary or moving positions. Such methods are typically limited to low power, line-of-sight transmission of weak signals between a transmitter and receiver and tracking may be compromised by local natural topological features or man-made structures, such as buildings, where weak signals are either obscured or severely attenuated.

While the Global Positioning System (GPS) has proved to be a useful navigation and tracking tool for outdoor tracking of moving vehicles, there are significant limitations when applying GPS to indoor navigation and tracking. Since GPS relies primarily on a line of sight signal acquisition and tracking, in indoor environments, the line of sight of GPS satellites is substantially obscured and GPS signals are highly attenuated. As a result, GPS signals are typically several orders of magnitude weaker in building environments than outdoors. With such weakened signals, GPS receivers have difficulty receiving GPS signals and calculating accurate position information.

In conventional vehicle navigation applications, both inertial and non-inertial sensor devices, such as compasses, barometers, gyroscopes and accelerometers, are frequently combined for navigation purposes. Compasses are frequently found on passenger vehicle dashboards. Barometer altitude measurements and compass direction measurements are required instruments on aircraft control panels. Inertial sensor device combinations are commonly employed in attitude and heading reference systems (AHRS), where vertical and directional gyroscopes are combined to provide measurements of role, pitch and heading (azimuth) angles, vertical gyroscopes (VG), rate gyro accelerometer units (RGA) and inertial measurement units (IMU). At least one company offers an AHRS system which combines 3-axis angular rate, linear acceleration, and magnetic field measurements to create an electronically stabilized AHRS device (see Crossbow Technology Inc, San Jose, Calif.). Vertical gyroscopes devices are commercially available which employ mechanically-gimbaled gyroscopes that are electronically stabilized to provide measurements of roll and pitch angles relative to the horizon. Single axis yaw rate gyros and 3-axis accelerometers are frequently employed in systems used for dead reckoning and controlling roll and pitch in land vehicles and robots.

Inertial measurement units (IMU), comprising of combination of accelerometers and gyroscopes, are frequently combined with control systems as critical components of an inertial navigation system (INS) for vehicles. The IMUs may be either mounted in a gimbaled servo motor system, where the control system keeps an IMU platform mounted in a constant orientation and vehicle orientation is determined from motion relative to the IMU, or, alternatively, IMUs may be mounted in a strap-down system where IMU sensor outputs provide a direct measurement of vehicle orientation. In typical applications, IMUs are generally employed with objects that move in relatively normal and smooth pattern, such as planes, land vehicles and machinery. For example, for aircraft navigation, inertial sensor combinations are frequently deployed in mechanically and thermally stabilized INS or IMU packages which typically combine three axes servo accelerometers and three axes rate gyros for vehicle motion sensing and navigation in free space where six degrees of freedom are required.

More recently, efforts have attempted to integrate inertial IMUs with GPS systems for vehicle, aviation, weapon and robotic navigation during periods when GPS signals are unreliable (see Y. C. Lee et al., "A Performance Analysis of a Tightly Coupled GPS/Inertial System for Two Integrity Monitoring Methods", CAASD Technical Paper, March 2000, MITRE Corp. McLean, Va.; A. K Brown et al. "Performance test Results of an Integrated GPS/MEMS Inertial Navigation Package", Proc. ION GNSS, September 2004, Long Beach; and P. Cross et al. "Intelligent Navigation, Inertial Integration: Double Assistance for GPS", GPS World, May 1, 2002). In addition, efforts have been made to develop MEMS-based IMU navigation systems some of which use GPS for initial position calibration and periodic correction (see Honeywell H G 1900 MEMS IMU data sheet, Honeywell Corp.; Atair INU data sheet, Atair Aerospace, Brooklyn, N.Y.; MEMSense PINU and nINU data sheets, MEMSense LLC, Rapid City, S. Dak.; coremicro AHRS/INS/SPS data sheet, American GNC Corp., Simi Valley, Calif.).

Thus far, reliable methods for accurate personal indoor tracking and navigation have been very limited because, unlike vehicle motion, human movement is characteristically complex, non-linear and erratic. A review of indoor navigation methods and capabilities for emergency personnel has been conducted by researchers at the National Institute of Standards and Technology (see L. E. Miller, Indoor Navigation for First Responders: A Feasibility Study, Advanced Networking Technologies Division Report, Feb. 10, 2006 NIST, Washington, D.C.). In this study, well-known navigation techniques such as dead reckoning, waypoint detection and map matching are reviewed and discussed as to their viability in an indoor navigation environment.

While the NIST report identifies a number of INU devices and methods which have been recently developed for indoor tracking of individuals, the most common tracking methods employed by current workers utilizes dead reckoning navigation techniques which employ a fairly inaccurate method of integrating acceleration data over time. Due to accelerometer drift error, such tracking methods typically accumulate large amounts of error in a relatively short period of time, dead reckoning methods are inherently unreliable and location tracking must be frequently corrected using fixed waypoints that have a known, pre-determined position. In addition, for tracking highly non-linear and erratic human movements, such methods are inherently unsuitable since error accumulates too quickly which makes waypoint correction unfeasible. Furthermore, many of these devices suffer from inaccurate calibration and zero point determination.

SUMMARY

It is common to use GPS to locate and track personnel and assets. However, GPS may not operate indoors. Furthermore, in many outdoor applications, including urban canyons, GPS can be unreliable.

The present invention is directed to a method and system for tracking the position, motion and orientation of personnel and assets. The present invention can provide location, orientation, and motion tracking, two-way communications, and data management functions. It can be an open system that can be tailored to a wide variety of applications—for example, applications directed to location, tracking, and status monitoring of personnel and/or assets. As such, in addition to tracking of first responders, it can be adapted to a variety of applications and can be expanded to meet a wide range of requirements, such as location and tracking of people and/or assets in campus environments, VIP status and monitoring, and blue force applications.

For illustrative purposes, an example of the invention is described in the context of a system for locating, tracking and monitoring first responders and other emergency personnel, however, the invention can be used to locate, track and monitor anything moveable, including people, animals and assets. Assets as used herein is intended to refer to objects or things, whether or not valuable and not animals or people, however, it should be noted that assets include vehicles and other things that can use used to transport people and animals.

The systems and methods according to the invention can be used to enable an Emergency Incident Commander to monitor the location, vital signs, and other situational information of first responders including firefighters, police, EMS technicians, safety workers, military and paramilitary personnel and related personnel (as well as animals and assets), both indoors and outdoors, during an emergency incident or other operation. The situational information can include information about the person, animal or asset monitored as well as the environmental information (such as temperature, atmospheric pressure, background radiation, etc.) of the person, animal or asset at a given point in time or location. This information can be stored on a periodic basis, such as every minute (or fraction thereof) or every 2 or more minutes. The information can be displayed using diagrams that show the information at each periodic increment. Alternatively, the information can displayed on a map, chart or location diagram, showing the information according to absolute or relative physical location.

The System can include an inertial navigation unit and a communication sensor module. The Inertial Navigation Unit (INU) can be a small device that is worn by the first responder, such as on a belt, and can include inertial navigation sensors and signal processing components to determine the location, motion and orientation of the first responder. The Communications Sensor Module (CSM) can be a small device carried by the first responder and can be in communication with the INU to receive the sensor data and communicate the data wirelessly to an Incident Command system. The CSM can include a radio transceiver for communicating with the Incident Command system. The INU and CSM can be connected by wires or wirelessly to transfer data between the INU and CSM. In addition, the INU and the CSM can be integrated into a single device. Each device can be powered by one or more batteries or another energy source.

An Incident Command system or base station can provide for monitoring and management of all personnel and assets (and information associated there with) at a scene. It can include a computer (such as a portable or laptop computer) connected to a radio transceiver which allows the incident commander to receive data from all the emergency personnel (both inside and outside structures) via their Communication Units, and to transmit individual or broadcast messages to the personnel such as warnings (for example, to evacuate an area). The base-station can include software that coordinates all communications at the scene and can be customized to display all the location and related status information in a simple, yet comprehensive view.

The Incident Command System can use and integrate different methodologies and subsystems to determine the location of the tracked personnel and assets. The data from each of subsystems can be fused electronically, using hardware and software, to minimize tracking error from any single data set or sensor. The system can integrate Inertial Navigation, including micro-electrical-mechanical systems (MEMS), Global Positioning Systems (GPS) when available, and Signal Processing and Control Algorithms incorporated in hardware and software to process (e.g., integrate) sensor data and determine the location, motion and orientation of people and assets inside complex structures. In addition, Image Processing and Artificial Intelligence based Mapping can be used to correlate the INU information to floor plans of a given building or location. The system can also provide a First Responder Safety Communications Network that links all personnel with one or more Incident Commander(s).

These and other capabilities of the invention, along with the invention itself, will be more fully understood after a review of the following figures, detailed description, and claims.

BRIEF DESCRIPTION OF THE FIGURES

FIG. 26 shows a diagram of the System Satellite Top View according to the invention.

FIG. 28 shows a diagram of the System Pre-Plan View according to the invention.

DETAILED DESCRIPTION OF PREFERRED EMBODIMENTS

Figure 1:
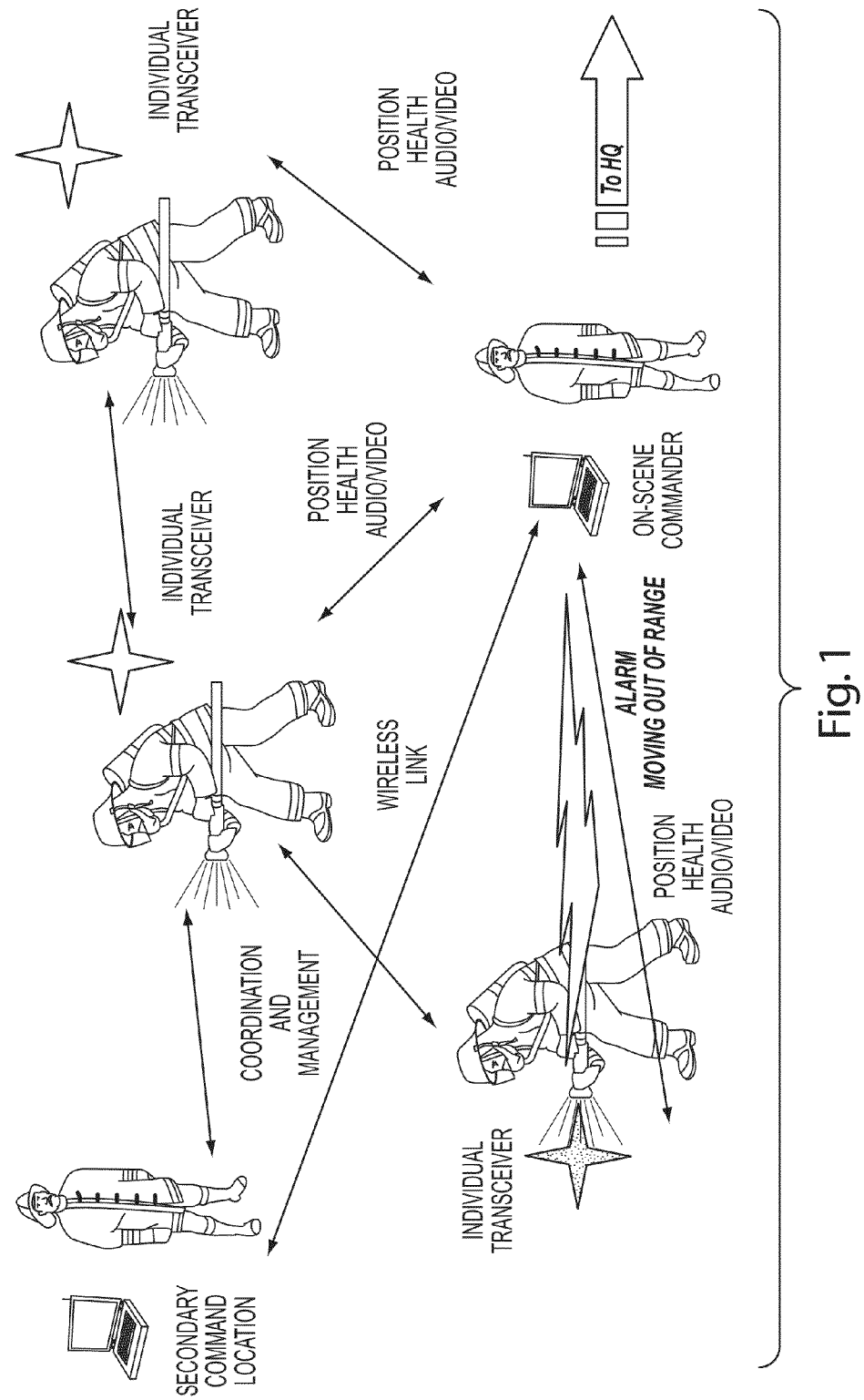
FIG. 1 is a diagrammatic view of a system according to the invention.

The present invention can be an integrated solution as shown diagrammatically in FIG. 1. The present invention can provide location and tracking, two-way communications, and data management functions. It can be an open system that can be tailored to a wide variety of applications—for example, applications directed to location, tracking, and status monitoring of personnel and/or assets. As such, in addition to tracking of first responders, it can be adapted to a variety of applications and can be expanded to meet a wide range of requirements, such as location and tracking of people and/or assets in campus environments, VIP status and monitoring, and blue force applications.

The systems and methods according to the invention can be used to enable an Emergency Incident or Situation Commander to monitor (for example, remotely from a safe distance) the location, vital signs, and other situational information of first responders including firefighters, police, EMS technicians, safety workers, military and paramilitary personnel and related personnel, both indoors and outdoors, during an emergency incident or other operation. The situational information can include information about the person, animal or asset, such as their orientation (the direction they are facing) and position (standing, sitting, crouching, on their back or stomach), whether they are stationary, walking, running or crawling, whether they are moving horizontally or up or down an incline surface or moving up or down stairs. The situational information can also include information about the environment of the person, animal or asset at a given time, such as temperature, atmospheric pressure, environmental radiation levels, the presence and level of chemicals in the air or on environmental surfaces (floors and walls).

Figure 2:
FIG. 2 is a photograph showing where the INU and CSM can be worn according to the invention.

The System can include an inertial navigation unit and a communication unit. The Inertial Navigation Unit (INU) can include inertial navigation sensors and signal processing components to determine the location, motion and orientation of the first responder. As shown in FIG. 2, the INU can be a small device that is worn on the first responder's belt. The Communications Module (CSM) can be in communication with the INU to receive the sensor data and communicate the data wirelessly to an Incident Command system via a radio transceiver. As shown in FIG. 2, the CSM can be a small device carried by the first responder. The INU and CSM can be connected by wires or wirelessly to transfer data between the INU and CSM. In addition, the INU and the CSM can be integrated into a single device. Each device can be powered by one or more batteries or by an energy source that generates electricity using heat or solar energy.

As described here, the system can also include an Incident Command system or base station provides for monitoring and management of all personnel and assets at a scene. It can include a computer (such as a portable or laptop computer) connected to a radio transceiver which allows the incident commander to receive data from all the emergency personnel (both inside and outside structures) via their Communication Units, and to transmit individual or broadcast messages to the personnel such as warnings to evacuate an area. The basestation can include software that coordinates all communications at the scene and can be customized to display all the location and related status information in a simple, yet comprehensive view.

Inertial Navigation Unit (INU)

INU can be small electronic instrument that is worn by the first responder. The INU can use inertial sensors and magnetic or electro-magnetic field sensors to produce data that can be used to determine location, motion and orientation of a first responder to be tracked. This can be accomplished by combining a variety of motion sensing components with a microprocessor or microcontroller which provides both I/O support for the peripheral sensors and computational capabilities for signal processing functions.

Figure 3:
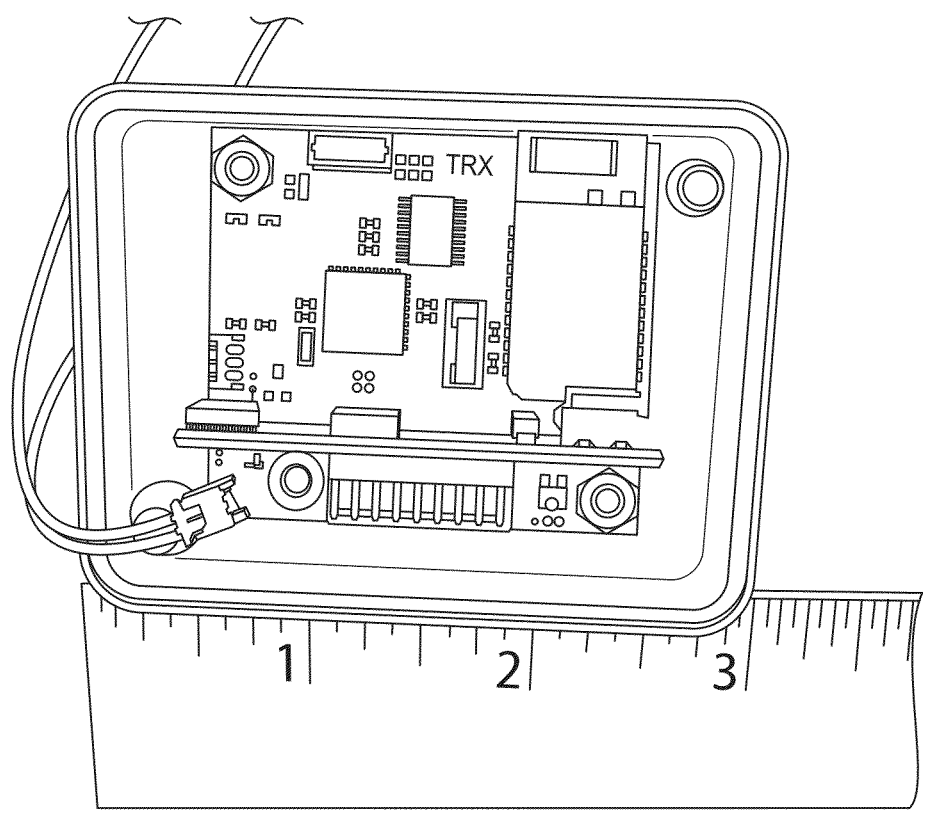
FIG. 3 is a photograph of an INU.

In one embodiment as shown in FIG. 3, the mobile INU is approximately 3 in by 1.5 in by 0.5 inches, and is worn on the first responder's belt. The INU can be designed and constructed with several motion detecting microelectronic sensors. These sensors can include Micro-Electrical-Mechanical System (MEMS) technology. The INU can include a combination of digital or analog accelerometers, gyroscopes and magnetic field sensors. In one embodiment the INU would include a MEMS three-axis accelerometer, a one and two axis MEMS gyroscope, and a MEMS 3-axis magnetic field sensor.

The data from the micro-accelerometer can be used to identify individual steps taken by the subject, the size and frequency of steps, as well as if a person is climbing stairs, or ascending in an elevator. The micro-gyroscope provides the rate of angular change of the user's direction. Data from the magnetic field sensors (or compass sensors) is also used to calculate the direction of the subject's trajectory. These sensors can be controlled by a DSC (digital signal controller) such as the dsPIC signal processing micro-controller chip manufactured by Microchip Inc. The data obtained from the sensors, is combined with unique algorithms to ascertain the precise motion and trajectory of the INU and thus the first responder or asset to be tracked. The sensor information and calculated coordinates can be transmitted, using a wireless (e.g. BlueTooth) link, to the Communications and Sensor Module (CSM), which is also worn or carried by the person, animal or asset.

The accelerometer can be digital or analog. Preferably, it has the capability of measuring three axes with a range of about 2 g in either direction. Preferably, the accelerometer can also have the capability to provide output data at a rate of 15 Hz. Preferably, the sensitivity is about 1V/g (analog) or 1024 bits/g (digital). A single three axis accelerometer or three individual single-axis accelerometers mounted orthogonally can be used. In the illustrative embodiment, the LIS3L02DQ 3-axis accelerometer from ST Microelectronics was chosen because it meets these requirements. In addition it is low cost and is available in a small package with digital outputs. Digital outputs save board space as an additional buffer IC is not needed as is the case for its analog counterpart.

The gyroscope can be digital or analog. Preferably, it has the capability of measuring angular rates up to 300 deg/sec or more. The gyroscope can also have the capability to provide output data at a rate of 15 Hz. In the illustrative embodiment, the ADIS16100 MEMS gyroscope was chosen because it meets these requirements.

The digital compass can be constructed using either magneto-resistive or magneto-inductive type magnetic field sensors. Magneto-inductive types are preferred as they generally require less power to drive. Preferably, the resolution can be 1 degree or better and the accuracy can be plus or minus 2 degrees. Preferably, the sample rate can be at least 10 Hz.

In the illustrative embodiment, the SEN-S magnetic field sensors from PNI were used for our digital compass. Preferably, this PNI part has an adapter for the sensor that allows for simplified vertical mounting to a PCB. In addition PNI provides a driver application specific integrated circuit (ASIC) that presents the data to the microcontroller in a digital SPI (serial peripheral interface) format.

Preferably, the microcontroller includes sufficient input/output pins to support the peripheral sensors. In the illustrative embodiment, the INU includes a total of four (4) sensors that use an SPI (Serial Peripheral Interface) bus for transferring data to and from the microcontroller. Preferably, the microcontroller can support an SPI interface in a hardware module and the microprocessor associated with the microcontroller operates at computation speeds sufficient to perform the necessary calculations and signal processing functions in real time. In the illustrative embodiment, the dsPIC30F3014 microcontroller with DCS (Digital Signal Controller) was used. This microcontroller supports all the peripheral devices and has RS232 and SPI modules built in. It can operate at 30MIPS (million instructions per second) and can utilize a signal processing controller capable of efficiently performing signal processing and filtering algorithms.

The INU can communicate with the CSM using a Bluetooth, Zigbee or other wireless transceiver obviating the need for wires. The INU and CSM sets up a wireless personal area network (WPAN) on each first responder allowing addition of other distributed wireless sensors on first responder's person as needed.

TABLE 1

A parts list for the components of one embodiment of an INU

| | |
|---|---|
| ADIS16100ACC | MEMS Inertial Sensor |
| BRC30A | Bluetooth RF Module-OEM |
| 490-1220-1-ND | Resonator 12.0 mhz Ceramic Indust. |
| DSPIC30F301430IML-ND | Ic dsPIC MCU/DSP 24k 44qfn |
| MAX3002 | 8ch Level Translator Ic |
| REG113NA-5/3KCT-ND | Ic Ldo Reg 5 v 400 ma |
| SEN-S65 | Magnetic Field Sensor |

Figure 4:
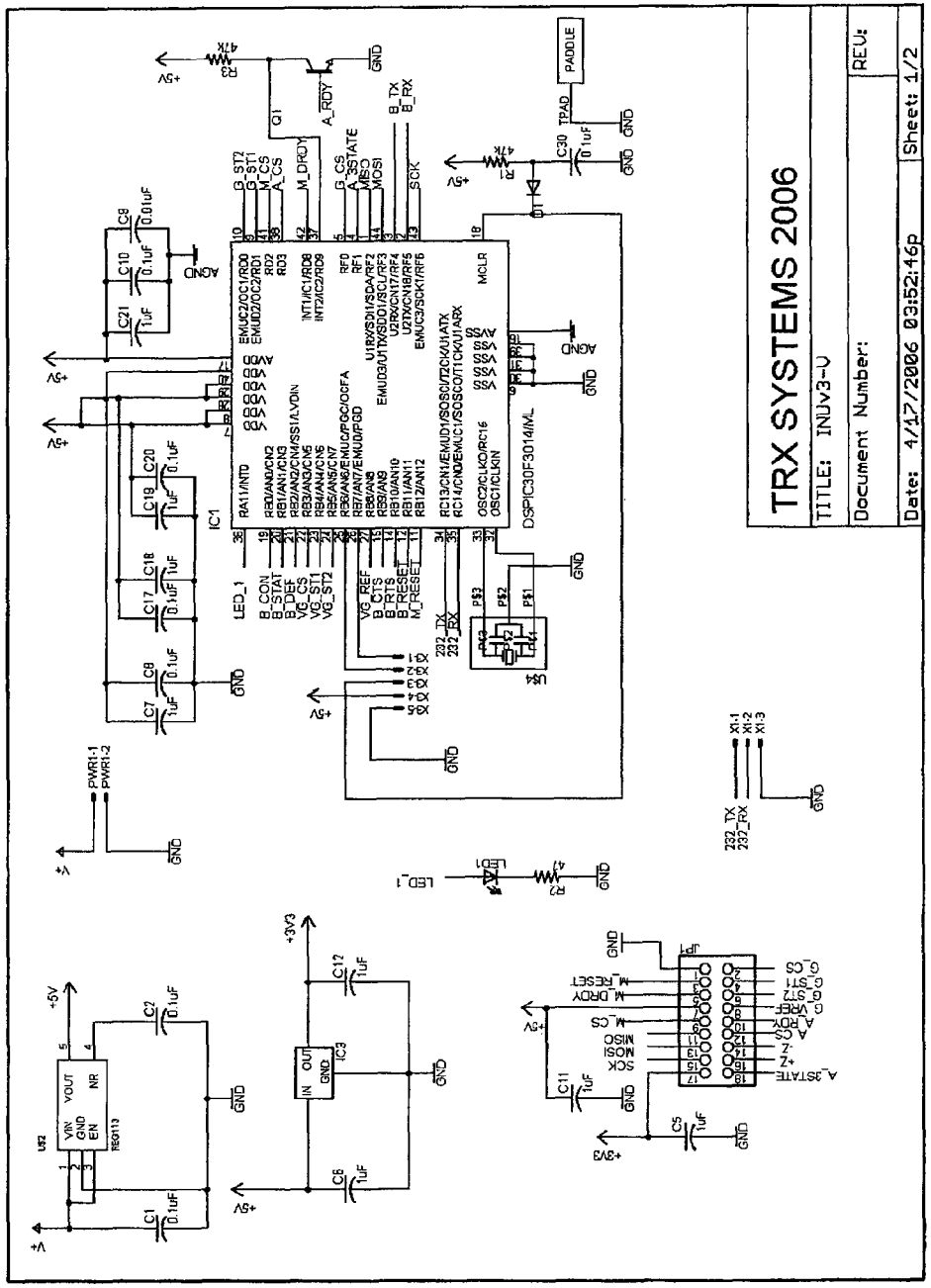
FIGS. 4-6 are schematic diagrams of an INU according to the invention.
Figure 5:
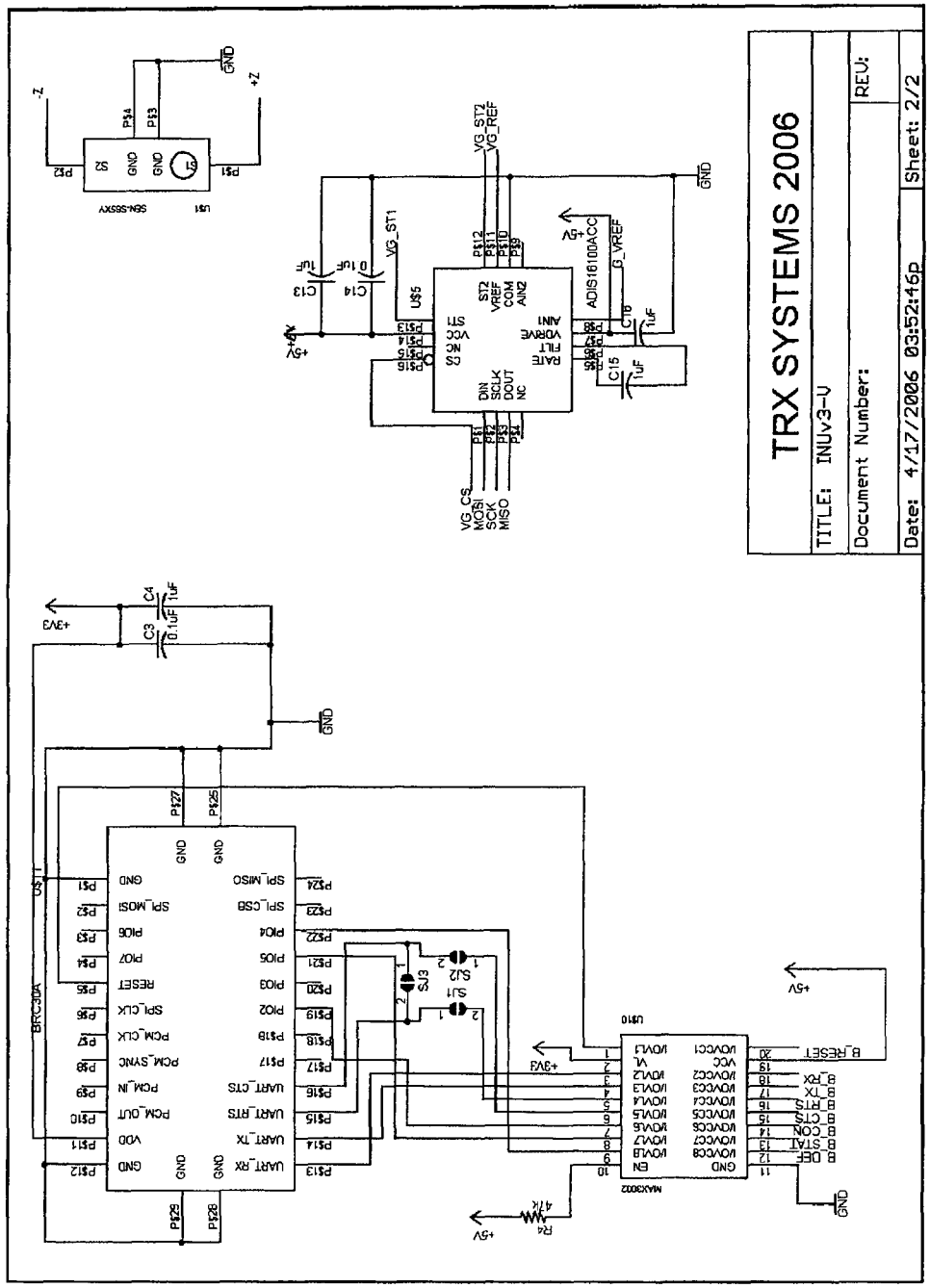
Figure 6:
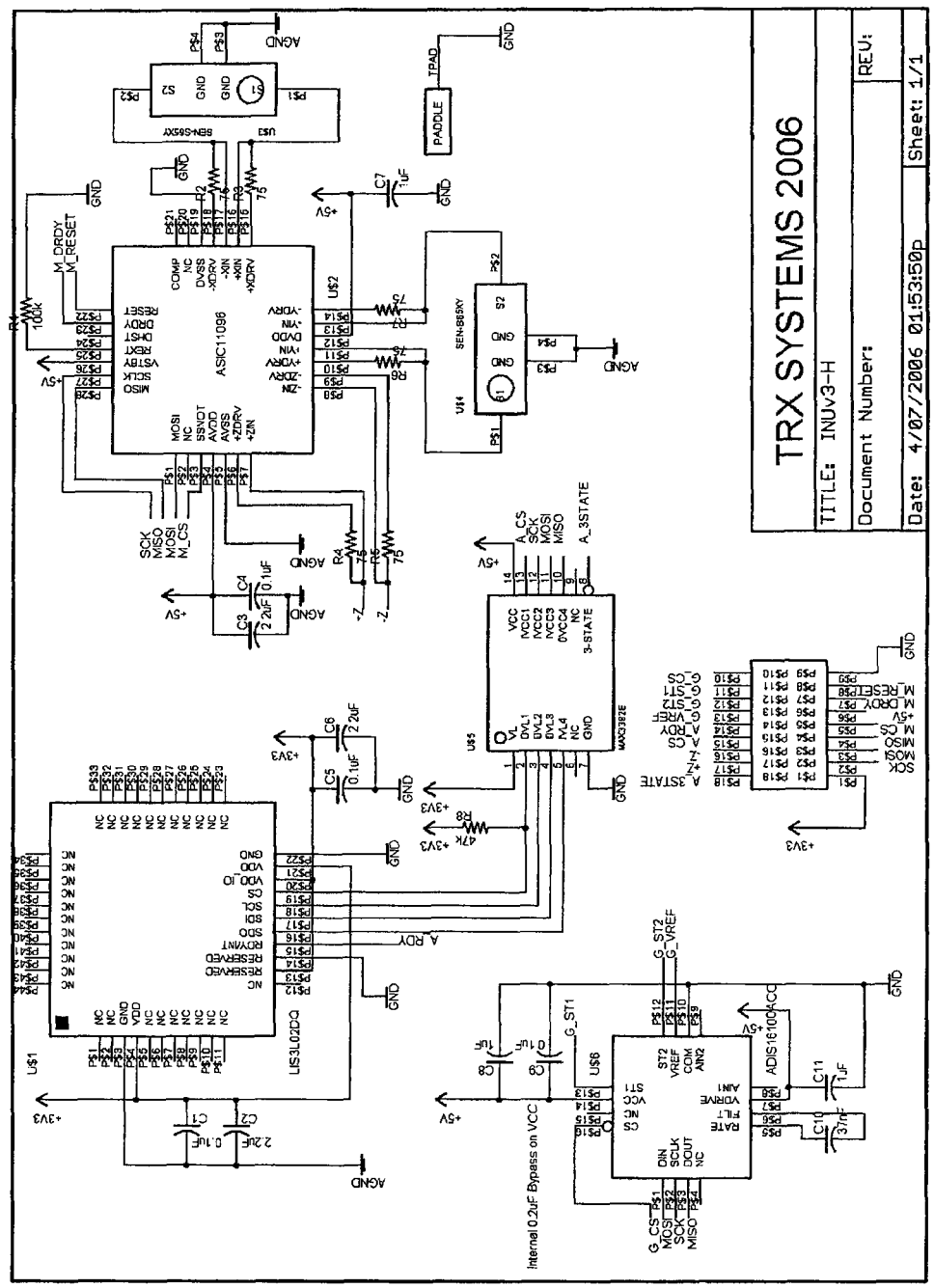
Figure 7:
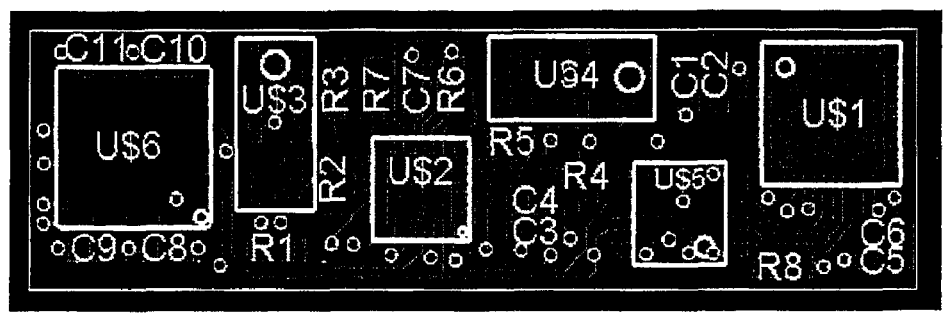
FIG. 7 is a layout of horizontal PCB of an INU according to the invention.

FIGS. 4-6 show schematics for the INU. The INU can have two PCB's. One oriented vertically, the other oriented horizontally when in use. This is provided to obtain the sensor data in 3 orthogonal dimensions. FIGS. 4 and 5 show the schematics for the vertical PCB, which houses the dsPIC, a roll gyro and one magnetometer (z direction). FIG. 6 shows a schematic of the horizontal PCB and FIG. 7 shows the layout of the horizontal PCB components. The horizontal board houses the yaw gyro, the x and y magnetometers, and the 3-axis accelerometer.

In one embodiment, two identical 3-axis accelerometers, oriented side by side but with opposite axis positive directions, differential output signals can be provided for each direction. This configuration enables the signal processor to accurately locate the zero acceleration point. In addition, this configuration provides for differential outputs which can be used to compensate for drift and other variable factors or characteristics of the sensors.

To translate the data received from the INU inertial sensors into trajectories of the INU (and people, animals or assets), the system uses a set of signal processing algorithms. The algorithms can be directed toward recognizing distinctive characteristics in the movement of the people, animals or assets. For example, the algorithms can be used to recognize distinctive characteristics in human (or animal) gait, and take advantage of the gait properties and their relation to kinetic movement and the sensor data. While monitoring accelerometer and gyroscope sensor data, the INU's processor uses third order high-pass, low pass and matched filtering techniques to compare the sensor data with a library of predefined gait motions and motion data. The usage of the MEMS magnetic sensor data provides another source of directional data in addition to that obtained from the gyroscope. The tracking algorithms can recognize the nature of the movement (walking, running, crawling, etc.) and select the appropriate signal processing algorithm to compute location data for the context. The system can also include a feedback algorithm that allows for optimal use of gyroscope and compass in an effort to minimize sensor errors. The algorithm can be coded using assembly language in the dsPIC. This microcontroller, which is optimized for signal processing, can implement the algorithm, and output XYZ coordinates of the ambulatory responder wearing the INU. The coordinates can be downloaded to the Communications and Sensor Module (typically worn in the first responder vest pocket) for incorporation into the node report, and eventual transmission to the base station.

Figure 8:
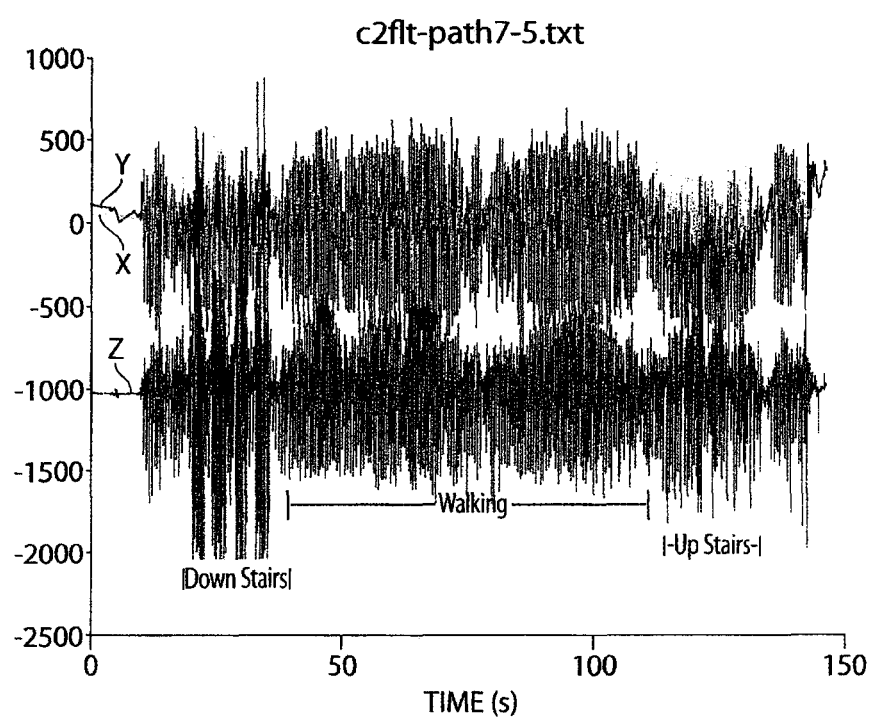
FIG. 8 shows Raw Accelerometer Data.
Figure 9:
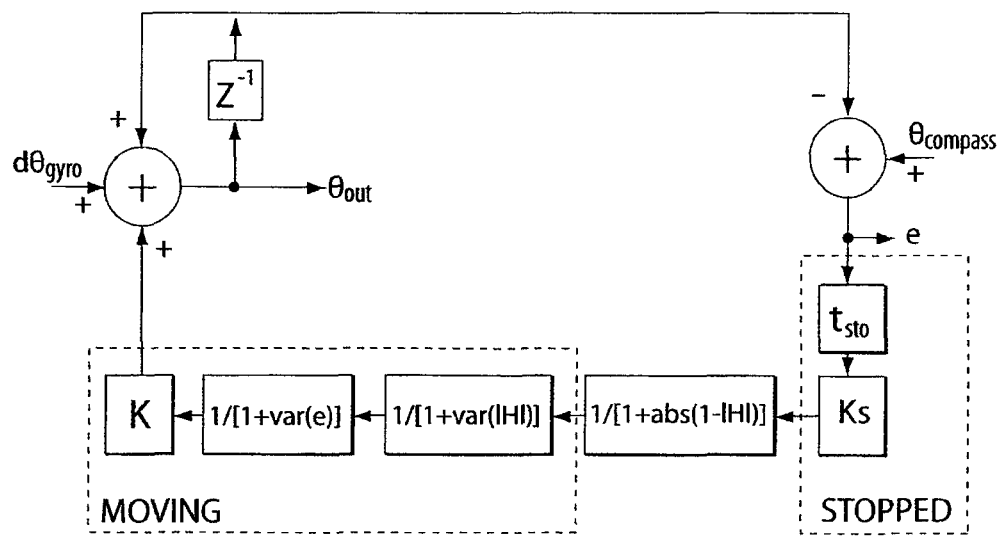
FIG. 9 shows an INU Fusion Angle algorithm according to the invention.
Figure 10:
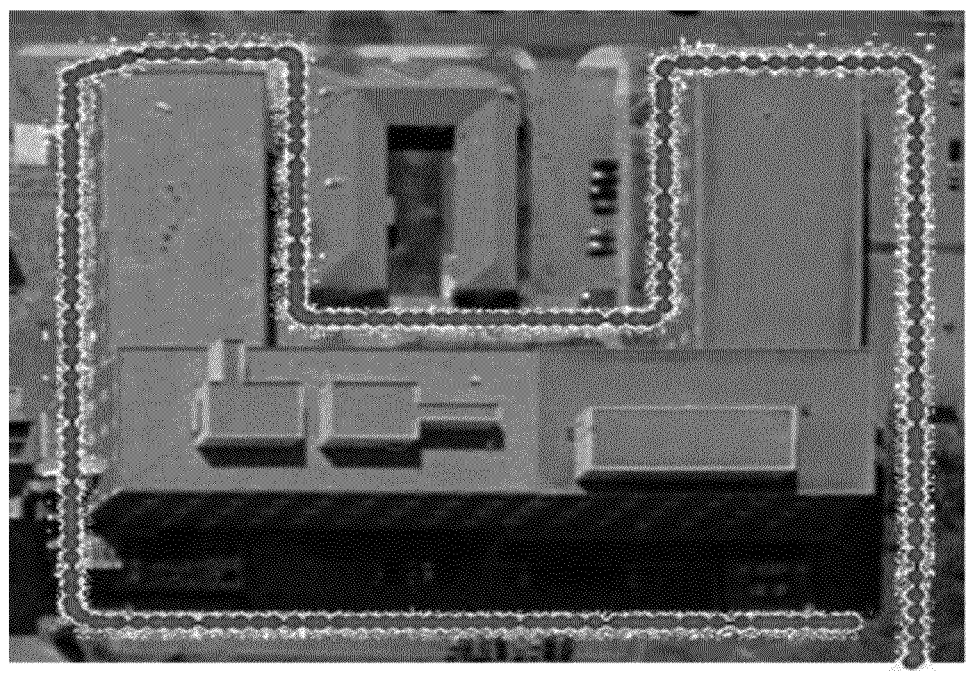
FIG. 10 shows a path traversed outdoors without GPS according to the invention.

Given the nature of inertial sensors and the differences between them, experimentation can be used to create a library of human movement sensor data that can be used to characterize human (animal or asset) locomotion. In addition, the frequency and the magnitude of the sensor signatures can be used to determine how quickly the person, animal or asset is moving. From the signatures of the different accelerometer axes, the system can determine if the individual is climbing or descending steps. The response of the azimuthal gyroscope can be used to determine if the person or animal is crawling, or is in a non-vertical position. Errors in compass readings resulting from nearby ferrous objects can be detected by comparing the total local magnetic field magnitude to that of the earth in order to recognize corrupted compass sensor data. In addition, the algorithm in the INU can take advantage of detected building architecture (as indicated by the magnetic field information) to correct potential errors. FIG. 8 shows typical accelerometer raw data that is processed. In FIG. 9 shows a block diagram of the feedback algorithm used to calculate direction using both contributions of the gyroscope and the magnetometers. FIG. 10 shows a path traversed outdoors using the INU without GPS.

Signal Processing Algorithms

The INU's can be used to monitor the position of personnel (animals and assets) and can provide more accurate location information over a longer period of time. The data from the accelerometer can be used to identify 1) individual steps taken by the subject, 2) the step size, type of step, and 3) whether the subject is ambulating on level or inclined ground or traversing stairs. The gyroscope can be used to provide that rate of angular change of the user's direction. This information can be used to help calculate the direction of the user's line of progress. Data from the magnetic field sensors (compass) can also be used to calculate the direction of the subject's trajectory.

The dsPIC can poll each sensor on board the INU for new data every 32 ms.

Accelerometer Signals can be filtered using a third order low pass Butterworth filter. The X Accelerometer signal describes acceleration in the lateral (side-to-side) direction. Y in the anterior-posterior (forward) direction, and Z in the vertical direction. When upright gravity should act only through the Z accelerometer. Therefore when the INU is placed on personnel who move, and may be bent forward or backwards, all accelerometers can be used to provide a combination of motion and tilt information.

Euler's angle algorithms can be employed to rotate the coordinate systems so that the system can be tilt-corrected back to the reference frame of the earth. These tilt angles can be determined by low-pass filtering the accelerometer signal.

Step detection can be achieved using peak-valley pair detection in the y-accelerometer signal that satisfies certain thresholds. In addition, these detected steps can be passed through a neural network that is trained to recognize the step signature based on the received accelerometer and gyro sensor data.

Short duration angle changes can be detected using the gyroscopes. The gyro angular rates of movement can be integrated (using dsPIC functions) over time to determine an angular direction. Parasitic drift, which often prohibits angle measurement, can be overcome through calibration. Each gyro can be temperature corrected by placing it in various temperature environments to obtain the temperature correlation to the gyro offset. Afterward, the gyros can be tested using known rotations to obtain a highly accurate angular conversion factor that relates actual binary output to angular rate.

In normal human locomotion, pelvic rotation averages about 8 degrees per gait cycle (stride); 4 degrees from center each way causing inaccurate heading estimation. The INU can correct for this by averaging accumulated gyro angles obtained over a single stride, which comprises a left and a right step. For an entire stride (two steps), the angular change should be zero. The INU, can determine the beginning and end of each stride and can integrate the angular rate data over a particular period. At this point, results not within the allowed error limits can be discarded and angular rates for each sample during the stride can be cleared to zero. In order to validate a step, lateral and vertical accelerations can also be examined. The vertical acceleration should correspond directly with the anterior-posterior acceleration and the lateral acceleration has been found to occur at approximately ½ the frequency.

The 3 magnetometers can be implemented on 3 orthogonal axes. By reading the local magnetic field, the inverse tangent of the x-y magnetometer reading can be used to reveal the compass heading. The third axis allows us to calculate the total magnetic field at a given point in space and time. This allows us to verify if the total magnetic field is of the correct magnitude. If it is not, then it can be presumed that there are local disturbances in the magnetic field rendering the compass reading in-accurate. For example, beams in building structures. In addition, magnetic profiles can be determined and used to identify specific locations based on matching the magnetic profile.

Each of the magnetometers can be calibrated for their full range and zero offset in an environment that is free of disturbances, and only contains the earth's magnetic field. Using these calibration parameters, the magnetometers readings can be normalized in real time to the earth's magnetic field.

The reliability of the compass angle can be calculated after a tilt correction is obtained from checking the variance and higher order moments of the total magnetic field achieved over a time-interval window of magnetic data.

Using the variances in the total magnetic field calculated above, the ratio of the calculated total magnetic field to the earth's magnetic field and the variance of difference in angle changes calculated separately by the gyro and the compass over a time-interval window, a compass reliability factor can be determined. A feedback loop, shown in FIG. 9, can be used to calculate angle increments based on the gyroscope information.

Mapping can be provided by measuring the magnetic field as function of position in a building and associating a specific field distribution to a building area or location. These mappings can be determined through a windowed convolution of real time data over the magnetic library.

For indoor tracking, a measure of elevation changes can be determined by recognizing stairwells and counting stairs. Indoor maximum riser (step) height is generally regulated by building codes and ranges between 7.5 inches and 8.25 inches depending on the jurisdiction. Typical riser heights range between 6.75 inches and 7.25 inches. Finished building floors are generally separated by distances of 9 to 14 feet. At the very most, a flight of stairs will rise one floor level. Typically, most building stairwells have one flight rise half the floor height to a landing and another flight rising in the opposite direction that completes the rise to the next floor. To achieve 3-dimensional stair tracking the INU can test each detected step to determine if the step has been taken on a stair. This can be achieved in several ways.

1. An increased z-accelerometer power divided by the y-accelerometer power since there is more impact in the vertical direction on stairs and less forward progress
2. While going upstairs forward tilt is observed using y-accelerometer.
3. Integration of z-accelerometer values after removing tilt yields stair presence and direction of motion (up or down stairs.)
4. Final method used is a trained neural network which returns a probability of a detected step qualifying as an up or down stair.

Elevators are tracked by straight double integration of tilt-corrected z-acceleration.

INU uses the presence of gravity to determine the posture of the personnel; meaning if the person is upright, crawling, standing still, or laying back or stomach.

Implementation of Tracking Algorithms on an INU

In a preferred embodiment, the indoor navigation and tracking method described above may be implemented as a programmed algorithm running on a microcontroller using either analog or digital inertial and non-inertial sensors communicating with the microcontroller through either an analog or digital bus.

The data acquisition, analysis and processing methods described above provide the basis for a series of tracking algorithms which can be implemented on an INU by way of a signal processing microcontroller (dsPIC). To implement the algorithm in a dsPIC, the algorithms can be translated into mathematic equations and logic. Equations and Logic can then be turned into assembly language code that is tailored specifically for the dsPIC.

The INU algorithm inputs sensor data and outputs accurate x, y, z location coordinates of person (animal or asset) being tracked relative to its environment.

Each of the INU sensors can be sampled 30 times per second. This rate can be chosen (for example, to be near 30 Hz) by determining from the Nyquist criterion and the data rate from all sensors (for example, at most 15 Hz). This can be accomplished using a free running timer (for example, that can be setup to overflow at a rate of 31.25 Hz). When it overflows an interrupt can be generated and a sample trigger flag can be set. When the flags is set, some or all sensors can be sampled. The main program loop can poll this flag after the loop is complete and can allow the loop to run again when the trigger flag is set.

Detecting a Step (Ambulatory Motion)

Figure 42:
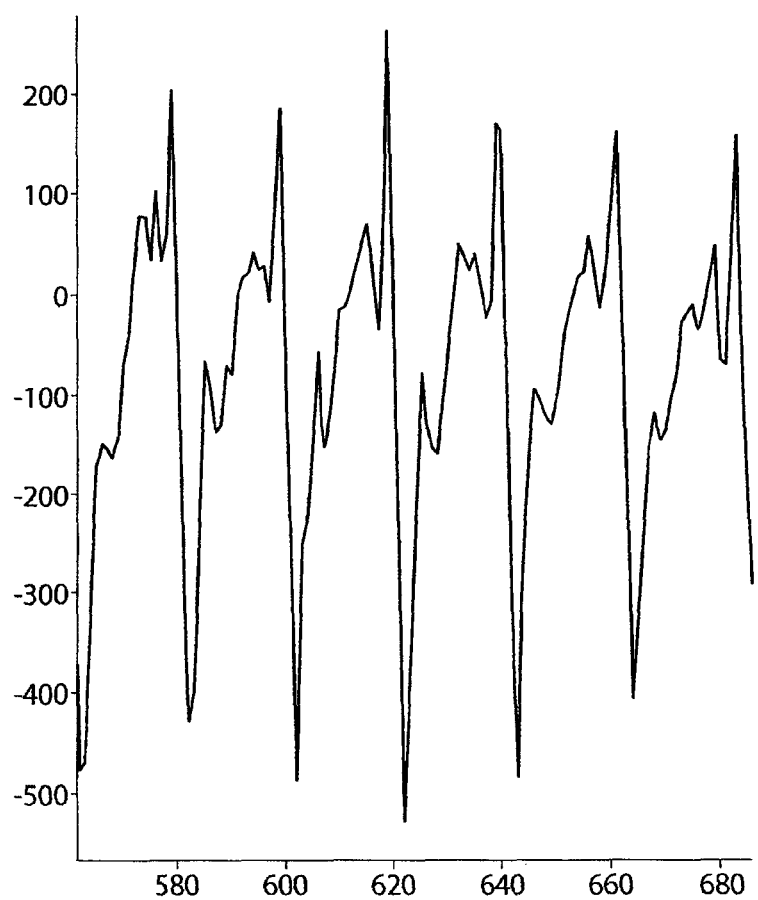
FIG. 42 shows a Y accelerometer signal when walking according to the invention.
Figure 43:
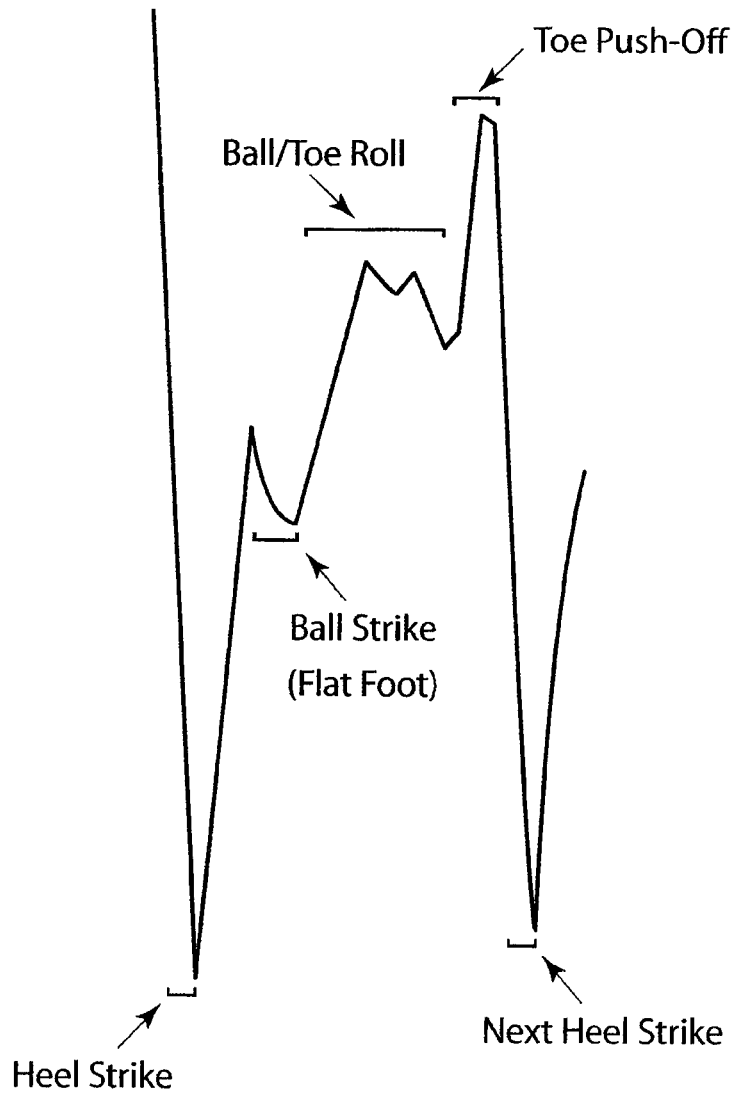
FIG. 43 shows the parts of the signal of FIG. 42 that correspond to movements according to the invention.

Steps can be detected using primarily anterior-posterior (Y-axis) acceleration data. FIGS. 42 and 43 show the raw acceleration data taken during a step and the correspondence to the physical motion. The detection process begins passing the acceleration data through a low pass filter with cutoff frequency near 4 Hz. This frequency is chosen because it is near the higher end of normal human walking frequency. In a preferred embodiment, accelerometer data is filtered by implementing a third order digital IIR (Infinite Impulse Response) filter with the filter function:

$$y(i)=b(1)*x(i)+b(2)*x(i-1)+b(3)*x(i-2)+b(4)*x(i-3)-a(2)*y(i-1)-a(3)*y(i-2)-a(4)*y(i-3)$$

where a(1:4) and b(1:4) are filter coefficients, x is the input and y is the output. For example, when filtering Y acceleration, x(i) is the current sampled acceleration, and y(i) is the current filtered output acceleration. (i−1) corresponds to the previous sample, (i−2) corresponds to two samples back and so on.

Transfer Function (z transform domain):

$$Y(z)=[(b(1)+b(2)z-1+b(3)z-2+b(4)z-3)/(1+a(2)z-1+a(3)z-2+a(4)z-3)]X(z)$$

The next operation in detecting a step is to locate local minimum and maximum points in the data. In order to find a local maximum point, the three most recent data points can be examined (n−2:n) and a test is performed to check if the middle point (n−1) is maximum. If the result of the test is true, the value of the local maximum point is recorded and a flag is set to indicate the local maximum is found. Once a local maximum is found, a local minimum is found in the same fashion. To qualify as a valid step, the difference between the local minimum and maximum points must exceed a threshold. Additionally, the time between the current step being detected and the time the last step was detected must be at least the minimum human step period.

If the time between steps is longer than the maximum human step period, one of two situations can be possible, the user has resumed walking after being stopped or a step was missed. If the time is longer than two maximum human step periods, it is assumed that the first case is true. If the time is near twice the previous step period, it is assumed that a step was missed. In this case the algorithm compensates by adding an extra step.

Step Length Detection

The next task is to determine the step length. It has been shown that, in general, step length increases with frequency. To better understand this relationship, test were conducted with several subjects walking at different speeds. Their speeds and step lengths where recorded and a linear best fit line was chosen to represent the relationship between step length and frequency. The following equation is a result of the tests:

$$\text{Step Length(decimeters)}=4.9238/\text{Step Period(seconds)}$$

While this equation is not exact, it does provide a sufficient estimate that can be improved at the base station. At the base station an algorithm is implemented where the step length is additionally modified with respect to the height of the personnel.

Azimuth Calculation (Calculating the Heading Direction)

Now that it is known that the user is walking and estimate of the magnitude of their movement has been found, the direction of their movement must be determined. The yaw gyro and the magnetic field sensors can be used to achieve this. The highly calibrated gyro rate data is corrected for temperature drift and integrated to track the user's relative angle.

The calibration parameters YAW_NULL_OFFSET and YAW_TDRIFT_RATE can be found experimentally, using methods described above, and their values can be stored in non-volatile memory. These define the theoretical offset value at OK and sensor output LSB/deg K respectively. The two variables used can be the sampled sensor rate (yawRate) and sampled temperature value (yawTemp) which comes from a temperature sensor built into the MEMS gyroscope. The temperature corrected rate is determined as follows:

yawOffset=YAW_NULL_OFFSET+
yawTemp*YAW_TDRIFT_RATE Corrected
Rate(LSBs)=(yawRate−yawOffset)

This rate can then be scaled to convert sensor units (LSBs) into degrees per second. The calibration parameter YAW_RATE_SCALE is determined experimentally and stored to non-volatile memory. The scaled rate is found by:

Corrected Rate(deg/s)=Corrected Rate(LSBs)/
YAW_RATE_SCALE

The relative angle can then found by integration/summation of all samples and they are taken.

Because the gyro only provides relative angle from the time the device was turned on, a digital magnetic compass is used to obtain a global reference (magnetic North). In a preferred embodiment three magnetic field sensors can be used to obtain magnetic field strength in three orthogonal directions. The first step to obtaining a compass bearing is to normalize and remove offset from sensor values. Calibration parameters for sensor offset and scale can be determined experimentally. The equation used to normalize the data for the X-axis sensor (magX) is:

NormalizedX=(magX−MX_OFFSET)/MX_RANGE

A value of 1.0 will now be read if the x-axis sensor is aligned with the Earth's magnetic field in the absence of other magnetic disturbances. Y and Z axis values can be modified in the same fashion.

Because we are interested in detecting the direction in the horizontal plane (parallel with earth surface), the angle that the device is tilted must be considered. The tilt angle are determined by passing the X and Y acceleration readings through a low pass filter. This estimates the direction of the constant gravitational acceleration and therefore is an indication of how the device is tilted relative to the Earth's surface.

These tilt values are used perform a 3D rotation of the calculated magnetic field vectors. The Earth field magnitudes on the horizontal(XY) plane are calculated from the tilt values and normalized magnetic field sensor values using the equations below:

magEarthX=magX*cos(tiltY)−magY*sin(tiltX)*sin
(tiltY)−magZ*sin(tiltY)*cos(tiltX)

magEarthY=magY*cos(tiltX)+magZ*sin(tiltX)

The compass angle is then found by taking the inverse tangent of (magEarthY/magEarthX).

The above compass angle calculation works well in areas where there is little magnetic interference. However, in many environments there are many sources of disturbances. In order to detect when these disturbances are corrupting the compass angle several experiments can be performed to determine the nature of the sensor readings in the presence of a disturbance. It was found that: 1) Compass angle is most correct when variance of the total magnetic field is lowest, 2) Compass angle is most correct when the total magnetic field is close to 1.0 (Earth field), 3) Compass angle is most correct when the compass angle follows the gyro angle, and 4) Magnetic field measurements are almost constant when the user is not moving.

To determine the validity of the compass reading, the INU can calculate the total magnitude of the sensed magnetic field. If this magnitude is different (e.g., greater) than that of the earth (either predefined or measured), the compass data can be indicated as invalid. The INU can also calculate the variance of the magnetic field data, when the variance is comparable to the average magnetic field, the compass data is not sufficiently accurate. These calculations can be performed in the algorithm control loop. The code is given below where the field calculations are indicated.

A method of fusing the angle from the MEMS gyroscope with the angle from the compass was developed that uses these observations to estimate a more accurate azimuth. The gyroscope is very accurate for shorter periods of time and tracks a relative angle while the compass is more accurate over long periods of time and provides an angle with absolute reference. The compass/gyro fusion algorithm functions to:

Attenuate data as a function of how accurate it is.
Allow gyroscope to control high frequency angle variations and compass to control low frequency variations in presence of "clean" Earth field.
Minimized output error variance.

FIG. 9 illustrates the operation of algorithm. Note that the algorithm changes when the user is not moving. This is because magnetic field variance is not an accurate indicator of compass correctness when the user is not moving. The fusion algorithm is written below:

$\theta out(i) = \theta out(i-1) + d\theta gyro$ (gyro rate integration) +

$[\theta compass(i) - \theta out(i-1)]$ (compass error $e$)*

$1/[1 + abs(1 - |H|)]$ (attenuation for total field error)*

$1/[1 + var(|H|)]$ (attenuation for unstable field)*

$1/[1 + var(e)]$ (attenuation for compass/gyro error)*

$K$ (time constant for rate of correction)

Where |H| is the magnetic field magnitude and the range for all attenuation factors is 0 to 1.

Updating Position

The x and y position coordinates are updated after each step. In this step, the following calculations are performed:

X_position=X_position+(step_size)*cos(current_direction) and

Y_position=Y_position+(step_size)*sin(current_direction)

Updating Status Flags

Along with position coordinates, status flags are also output by the INU. These flags provide additional information about the user's movements and about the user's environment.

Turning Flag ("T")—1 bit

The gyro angle is used to detect a turn. Turn detection is enabled on samples when a step has occurred. Each time a step occurs, the gyro angle is written to a buffer that holds the angle for the past several steps. The angle for the current step is compared to the angle recorded two steps (equal to one stride) back. This is done a full stride back rather than once step back to avoid including pelvic rotation which is typically about 8 degrees. If the angle change over the stride is greater than a threshold value, then a turn is assumed and the turn flag is set. The turn flag remains set until the end of a turn is detected.

The end of a turn is detected when the angle over a stride falls below a threshold. The turn flag is then cleared.

Hallway Flag ("H")—1 bit

In an effort to provide more information about the building that a person is in, the INU has built in a mechanism for detecting when the user is likely in a hallway. In most buildings it is difficult or impossible for a user to walk a long distance in a straight line unless in a large room or a hallway because of obstacles including furniture and walls/partitions. If a number of steps larger than a threshold value is exceeded and at the same time the gyroscope angle has not varied past a threshold value, the hallway flag is set. The flag is cleared when the next turn is detected.

Stairs Flags—Up and Down ("U" and "D")—1 bit each

In addition to modifying the Z location coordinate flags are set to indicate if a user is on stairs and whether they are heading up or down. When stairs are detected using either method described, the appropriate stairs flag is set. The flags are cleared when stairs are no longer detected.

Posture Flags—Stainding Upright, Crawling, Lying on Back ("P", "C", and "B")

Flags indicating the posture of the user sent to allow the base station monitor to make assumptions about the user's condition and environment. The user is determined to be standing upright, crawling, or lying on their back based on the tilt indicated by the INU's accelerometers. This is possible because the accelerometers are able to sense gravitational acceleration which is always directed perpendicular to the Earth's surface. When the sensors indicate the user is tilting forward past a threshold amount, the crawling flag is set. When the sensors indicate the user is tilting backwards past a threshold amount, the lying on back flag is set. When the accelerometers indicate the user not tilting past either forward or back thresholds, the upright flag is set. When either of these flags are set, the other two are cleared.

Non-movement Flags—Stopped and Still ("R" and "S")

Flags are set to indicate if a user is stopped or still. Stopped is defined as not changing location coordinates, but the user may still be moving parts of their body. If steps are not detected for several seconds, the stopped flag is set. This flag is cleared when a step is detected. Still is defined as no user movement. The still flag is set when the variance of the total acceleration (vector sum of x, y, and z) falls below a low-level threshold. Because this may indicate a serious condition such as the user being unconscious it automatically triggers an alarm at the base station.

User Path Segmentation

In order to improve assumptions made at the base station and provide order for path correction, the user path is broken into segments. A segment is defined as a portion of path that starts at the end of a turn and ends when the end of another turn is detected. A number with range 0-255 is termed "segment number" this number increments every time a turn end is encountered and rolls over back to zero after reaching 255. This is useful in a number of situations. For example, if the data link between base station and INU is temporarily disabled and several location points are not received. The base station can make assumptions about what happened between the last point before the data was lost and the first point when the link was re-established. If the segment number did not change, then it would be safe to "connect the dots" with a straight line.

Print Conditions

Transmitting position data from the microcontroller to external hardware is referred to as "printing" in the context of the present invention. Printing for a particular sample is conditional in order to reduce the bandwidth at the output channel. Data is printed during a particular loop iteration if one of the following conditions are met: a) the turn threshold angle is crossed; b) an end of a turn occurs; or a set amount of time has passed without printing.

These restrictions provide for higher resolution output where most needed during turns and minimum resolution output during predictable long straight paths or user non-movement.

In this embodiment the data transmitted can include 1) X, Y, and Z location coordinates, 2) Gyro, Compass, and Fusion Angles, 3) Compass and Fusion Accuracy Estimates, and 4) Flags for turning, hallway, stairs, posture, and non-movement.

Eliminating Gyro Error while Walking along a Straight Path

Because gyro data accumulates error over time, a mechanism must be put in place to recognize small errors and eliminate them. One approach is to simply set a threshold that all gyro samples must meet. With this approach, if the threshold is not met (e.g. the angle is too small) then the sample value is forced to zero. Since application of this method causes too much loss of data, the following alternative method is preferred.

It is well-known that the average human pelvic rotation is near 8 degrees, approximately 4 degrees in each direction. This change in direction occurs even when a person is walking in a straight line. Pelvic rotation occurs over the time period of a single stride (two steps). The net change in angle over the entire stride should therefore be zero. Samples during this period are integrated and the result is compared to a threshold near zero. If the result is under the threshold value, the result is removed from the accumulated gyro angle.

Detect Grid Angle

The method for detecting building grid angles has been developed. It is assumed that long hallways are aligned with one of the cardinal directions the building lies on. These directions are referred to as building "grid_angles" as they would lie along the grid on the floor plan. If the accumulated angle remains very small for a long period of time (NO_TURN_LIMIT), any accumulated angle is assumed to be error and is cleared. If no "grid angles" have been stored, then the current direction is stored as a building grid angle. If a grid angle had been stored, the current direction is compared to the building grid angle as well as the angle plus 90, 180 and 270 degrees. If the current direction is within an error margin of any of these angles, then the current direction is forced to the closest building grid angle (i.e. "locked to the grid"). A compass is used to verify the path when available. If this path is very near to a previously traveled path then alignment is forced since it is assumed to be the same corridor.

Crawling Motion Exception

According to fire and rescue organizations, hazardous building circumstances may require personnel to crawl at an incident scene up to 50% of their time within a building. Crawling movement is distinctly different from walking or other forms of upright movement. The methods and algorithms disclosed above are primarily employed for upright movement where turns are predominantly determined from gyroscope readings. For upright movement tracking, an INU device is typically equipped with a single gyroscope which measures the rate of change of angle around the Z axis with respect to the axis perpendicular to the gyroscope. Upright turns always result around this axis providing an excellent estimation of turns. However, for crawling motion, the entire INU tilts approximately 90 degrees forward, rendering the gyroscope's sensing axis parallel to the ground in the reference Y axis, thereby making it unable to predict change in angle about the reference Z axis which is still of interest. When sensing direction from measurements provided by a two axis compass, this requires the INU axes to be lined up with the reference X and Y directions. With crawling motion, the X axis of the compass lines up correctly, but the Y Axis now lines up with the reference Z axis. This disables any feasible readings from the compass to compute direction.

To overcome these hardware limitations in detecting and tracking crawling motion, in a preferred embodiment, an INU is equipped with two gyroscopes perpendicular to each other; one gyroscope is mounted on a horizontal circuit board, measuring rate of change of angle around the reference Z axis, the other gyro is mounted on a vertical circuit board measuring rate of change of angle about the reference Y axis when the wearer is upright. This additional gyroscope has additional utility in identifying other motion types when movement is upright. In this preferred embodiment, when an INU wearer crawls, the horizontal gyro measures rate of change about the reference Y axis, and the vertical gyro measures rate of change about the reference Z axis. This configuration ensures that one gyro can always sense turns around the reference Z axis which is the primary direction determining requirement. In addition, in a preferred embodiment, the INU is equipped with a 3 axis magnetic field sensor. During crawling motion, the Y and Z axes of the magnetometers interchange positions, and the X axis remains constant. This ensures that there are always two magnetic field sensors in the reference X-Y plane monitoring the direction. In the absence of ferromagnetic interference, the compass may also be used for determining direction while crawling.

When tracking actual indoor movements of rescue workers and firefighters, it is critical to be able to switch between data processing and analysis algorithms to ensure that both upright and crawling motions are detected with the appropriate sensors. In order to achieve this capability, in a preferred embodiment, the sensor data and particularly the accelerometer data must be able to recognize the transition between upright and crawling motion. In one preferred embodiment, the accelerometer data in both the X and Y axes are offset around the same point (i.e. value of acceleration) as the primary acceleration they experience is from movement with only marginal acceleration from the tilting of the device. The Z accelerometer detects both the acceleration from upward/downward movement and from gravity (9.8 m/s*s). Some small portion of gravity may act through the X and Y directions if the device is tilted. This will affect the compass too. The effect of gravity causes the offset of acceleration in the Z direction to be different from the X and Y direction. Tilt has only a small effect. When the wearer crawls, the Y and Z axes interchange and gravity now affects the Y axis accelerometer and the different offset is now visible in the Y axis accelerometer data. Since gravity acts downwards, the offset is smaller in the Z direction than in the X and Y directions when the wearer is upright, and smaller in the Y direction than in the X and Z direction when the wearer is crawling.

Proximity Detection and Correction

In one preferred embodiment, the INU module communicates with a node controller module using a Class 2 Bluetooth connection. A Class 2 Bluetooth device has a nominal range of 10 m. This means that the device will have the ability to discover nearby users within this range. When a nearby user is discovered, a RSSI indication from the Bluetooth radio will correspond to the distance between the nearby users. This has shown to be accurate within 2 m. With this information users can be grouped and their locations may be adjusted so that there is a match between their detected range and INU location coordinates.

Figure 11:
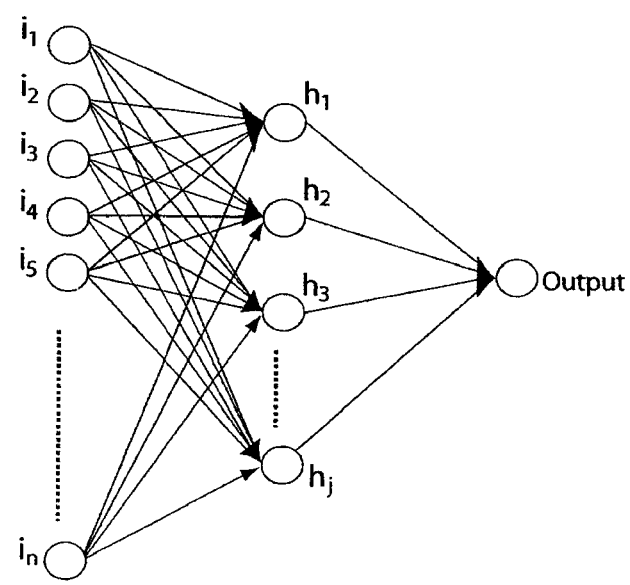
FIG. 11 shows a graphical illustration of neural network operation according to the invention.

An artificial neural network can be utilized as a pattern recognition tool for detecting different types of movement, such as movement on stairs. FIG. 11 shows a graphical illustration of neural network operation. The network can be comprised of three layers of nodes; an input layer, one hidden layer, and an output. The input data is made up of signals from inertial sensors as a result of the user taking a step. To obtain hidden node output values, input nodes are multiplied by hidden weights and summed together. The sum is then passed through a sigmoid function to produce the hidden node result. The hidden node outputs are then multiplied by the output node weights and summed. This sum passed through the sigmoid to obtain a result between zero and one.

Figure 12:
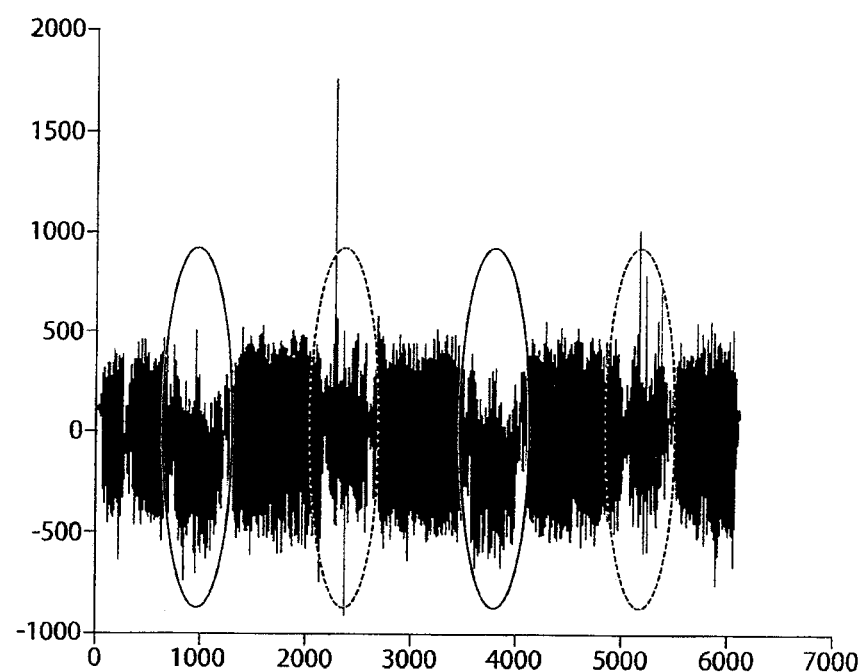
FIG. 12 shows a Y-axis accelerometer signal according to the invention.

The process of obtaining training data begins with a user walking a path consisting of level ground, up stairs, and down stairs. The y-axis (anterior-posterior) accelerometer signal is plotted and the corresponding terrain types during each section of the signal are noted. FIG. 12 shows Y-axis accelerometer signal, with Up stairs motion indicated by solid circle and the Down stairs motion indicated by dashed circle. The remaining motion indicated is over level ground.

Figure 13:
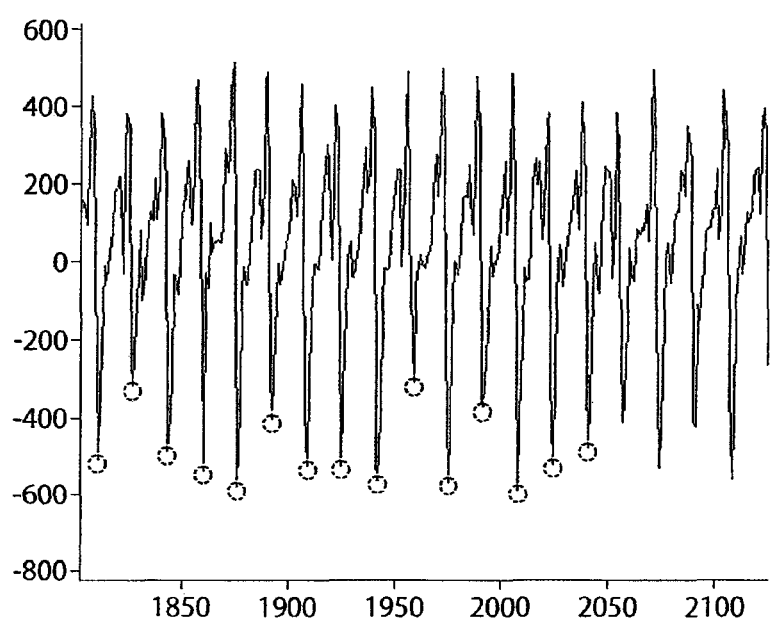
FIG. 13 shows heel strike signals according to the invention.

A heel strike is indicated by a sharp negative "spike" in the signal as shown in FIG. 13. A computer program can be created to allow these heel strikes to be manually selected with a mouse click. The sample number for each heel strike can be recorded by the program in a two column matrix. The signal between two consecutive heel strikes can be considered a feature. The feature can be defined in the two column matrix by a start index and an end index. To qualify as a valid feature, the feature length can be selected if it fits within human walking speed capability. This feature list can be created separately for all features during each user activity (i.e. up stairs, down stairs, level).

At this point three feature lists have been created; one for level ground, one for up stairs, and one for down stairs. Next, the feature list is used to extract all inertial sensor data for each feature. All samples between the start and end index are recorded from all inertial sensors. When compared to other features, the length and offset amplitude may vary. Because we want our neural net to identify motions by shape alone, these differences are removed. To remove the amplitude bias, the value at the start index is subtracted from all other samples in the feature for each sensor. To remove feature length differences, the signal from each sensor is stretched or compressed by interpolating linearly and re-sampling to a fixed length. This method is chosen over integer interpolation and decimation to meet processing and memory space restrictions in the embedded processor.

Once this process is complete for all feature lists, the data set can be used as input to a neural net. Each feature now exists in a row of large matrix containing signals from all inertial sensors. Training data sets are obtained by repeating the above process for multiple users. This ensures that the resulting weight values will not become "tuned" to one individual.

After hidden and output node weights have been found, the net can be used to detect stairs given a data set outside of training.

Automated Feature Extraction from Real-time Data

The biggest challenge in implementing the neural network is to develop an algorithmic approach to feature extraction. Feature extraction involves looking at the entire set of signals and segmenting it into meaningful pieces. Each segment of data can then be analyzed individually and metrics can be chosen to classify the data. The only classifier we are currently using is the shape of the signal over a step.

During the training phase, we were manually marking each sample where a heel strike occurred in order to determine the start and end indices of a step. The algorithm for automatically detecting the heel strike is described below:

Search a window five samples wide for local minimum value. (min(n−4:n))

If the local minimum value occurs at the middle sample (n−2), test to see if value is below average (DC) value by more than a specified threshold amount.

If this value meets the requirement, look back 5 samples for a local maximum.

If the local maximum value is greater than the average by a specified threshold, then a heel strike has been detected and the sample number for the heel strike is that where the local minimum value occurred.

Figure 14:
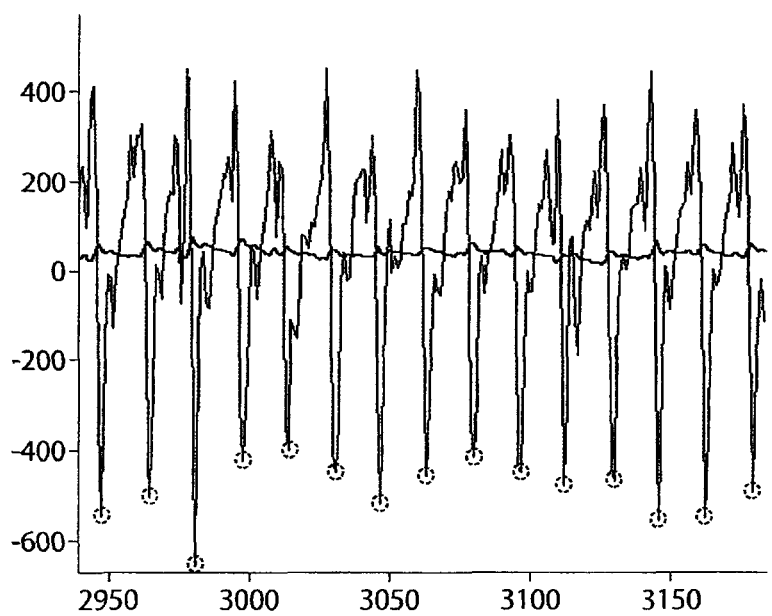
FIG. 14 shows the heel strike signals after processing by the heel strike detection algorithm according to the invention.

FIG. 14 shows the result of the heel strike detection algorithm. Anterior-posterior acceleration data is shown in blue. Filtered acceleration shown in green (DC). Circles indicate locations where heel strikes were detected. Note that this algorithm detects the heel strike two samples after it occurs.

Result of "featureList=featureExtractor('ben001/ben_001.bin')"

See The scientist and Engineers Guide to Digital Signal Processing, Steven W. Smith, Chapter 26, which is hereby incorporated by reference.

Microcontroller Processing

The microcontroller can provide three basic functions; sensor sampling, data processing, and sending location data to a receiver.

Sensor Sampling

The sensors can be sampled via the SPI interface at a fixed or variable time interval that can be timed by an on-chip timer that is programmed to trigger an interrupt at a fixed rate (31.25 Hz) or a variable rate (for example, to conserve battery power). The sampled data can be written to circular buffers which can hold the current sample and, in addition, many or all previous samples for a session or event. The data can include acceleration (x, y, z), angular rate(yaw, pitch, roll), and temperature at each gyro. The data can also include situational data such as elevation (and/or floor) data, structural information based on magnetic interference, and environmental data from various environmental sensors (e.g., temperature, atmospheric pressure, background radioactivity, presence of toxic gas, etc.).

In accordance with the invention, the Microcontroller can perform the following the Data Processing functions or operations:

Estimate tilt by calculating moving average (32 sample window) for accelerometer data.

Calculate moving average for magnetic field data so that it experiences same filter delay at tilt estimate.

Calculated total acceleration (vector sum of x, y, and z)

Normalized magnetic field data using calibration parameters and find mean magnitude and variance to be used in compass/gyro fusion algorithm.

Apply 3rd order Butterworth, low pass filter to y acceleration with cutoff at 4 Hz. This is used in step detection algorithm.

Detect step using anterior-posterior (Y-axis) acceleration data and algorithm.

Detect if user is stopped by counting time since last step. If longer than threshold time, set flag.

Detect if user is still. If total acceleration variance is below a threshold, set flag.

Detect crawl. Use averaged y and z acceleration values to estimate tilt. If tilted forward past threshold, assume crawling and set flag.

Detect user on back. Similar to detect crawl but with opposite tilt.

Detect user upright. If not tilted past a threshold, then user is upright, so set flag.

Calculate yaw angle by integrating corrected rate data.

Compute compass heading by normalizing and applying tilt correction to magnetic field data.

Compute fusion angle using feedback method shown in FIG. 9 of second provisional.

Detect heel strikes and apply neural network as described above. If stairs are detected adjust Z position.

Figure 15:
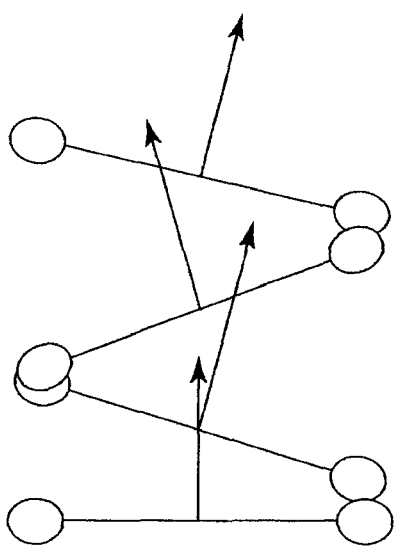
FIG. 15 shows a diagram of Line of Progress (LOP) determination according to the invention.

If a step was detected, as shown in FIG. 15:

Calculate angle change over stride (two-steps) for use in turn detection.

Detect if user is turning by testing stride angle against a threshold.

If the user is turning, test for a turn end by comparing stride angle to threshold.

Calculate line of progress (LOP) angle by averaging two consecutive steps for gyro, compass, and fusion angles.

If the user is not turning, attempt to detect hallway by testing distance traveled (in steps) since last turn. If distance is over threshold, set hall flag.

Calculated step length using step period and equation that estimates step length as a function of step frequency.

Update x and y location coordinates using LOP angle and step size.

Output data if one of the following is met:

MAX_OUTPUT_INTERVAL time is reached without an output.

User trajectory angle has changed by threshold amount since last update.

Alarm condition is met.

After performing all algorithms, the INU compiles a packet of data that is sent to the CSM. The INU can send the data packet over the Bluetooth link at intervals of approximately 1.5 seconds to the CSM. The contents of the data packet are summarized in Table 2 below.

TABLE 2

| INU Output Summary |
| --- |
| X Position |
| Y Position |
| Z Position |

TABLE 2-continued

INU Output Summary

Gyro Angle (LOP)
Reliability(0:127)       Compass Angle
Accuracy(−64:63)         Gyro/Compass Fusion Angle
T|H|U|D|P|C|B|S|Segment No. (0:255)
Checksum ◄──────────── 16 Bits ────────────►

- X Position and Y Position can be calculated by resolving each step using the cosine, and sine of the gyro line of progress (LOP) angle.
- Z Position increments for each step that qualifies as an up stair, and decrements for each step that qualifies as a down stair
- The Gyro Angle (LOP) is the gyro angle calculated using the stride algorithm and is unbounded (not restricted to 0-360)
- The Compass Reliability is a number between 0 and 127 that uses Magnetic field information and agreement with gyro angle to estimate how accurate the compass angle is.
- The Compass Angle is the compass angle calculated after tilt correction associated with the compass reliability
- The Compass Accuracy is determined based on the difference between the measured magnetic field strength and the known magnetic field strength of the earth (in the open air).
- The Gyro/compass Fusion Angle is the angle calculated by the feedback loop and is associated with the fusion reliability (−64-63), the midpoint 0 being most accurate.
- Lastly the INU sends out a list of flags indicating specific phenomenon. T: TurnFlag, high when personnel is turning, i.e. gyro angle change is over a threshold, H—Hallflag, personnel has been walking straight for 15 steps, Person, animal or asset moving U—upstairs, D—Downstairs, B—lying on Back., C—Crawling, S—Still (Not showing motion) followed by the Segment Number. The system can assign all points along a straight segment the same segment number and assign a new segment number at each new turn.

Figure 16:
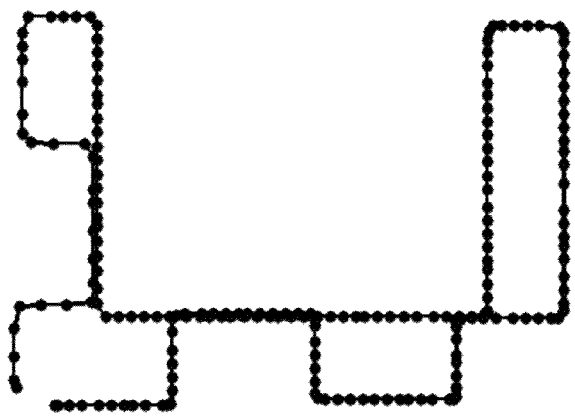
FIG. 16 shows the trajectory produced by the INU of a user walking on the third floor of the building shown in FIG. 10 according to the invention.
Figure 17:
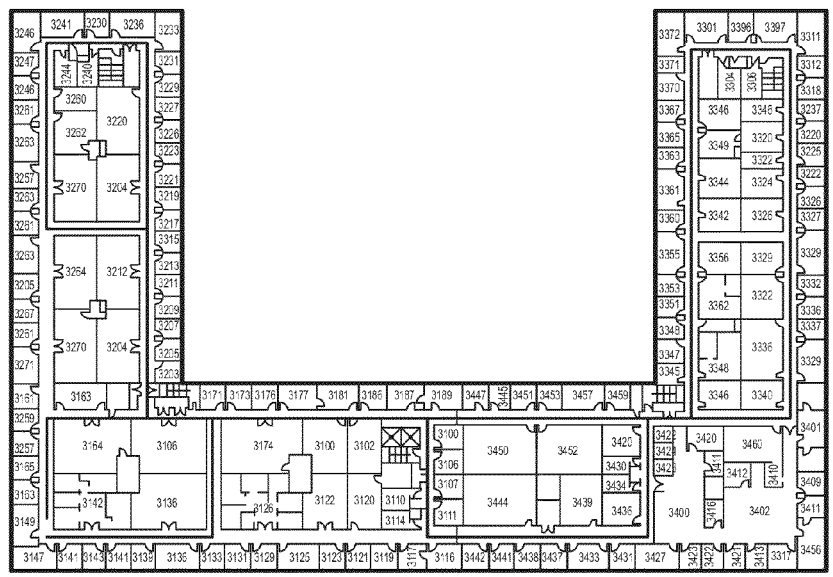
FIG. 17 shows the actual path of where the user walked inside the building of FIG. 10.

FIG. 10 shows the trajectory of a user walking outdoors, around the perimeter of a large U-shaped building generated by the tracking system. The trajectory generated by the system has been overlaid on a satellite map of the building. The dotted red line shows that the calculated trajectory and the actual path are almost y congruous. The total length of the trajectory is more than two fifths of a mile. FIG. 16 shows the trajectory produced by the INU Unit of a user walking on the third floor of the same building. The building houses electrical and computer engineering laboratories at the University of Maryland, necessitating the system to perform in the presence of several sources of radio frequency transmissions and magnetic fields. This indicates that the transmission techniques are robust and unlikely to be corrupted by external interference. FIG. 17 shows the actual path of where the user walked inside the building. Comparing the actual path, with the one determined by the invention show a high degree of alignment.

Communications and Sensor Module (CSM)

Figure 18:
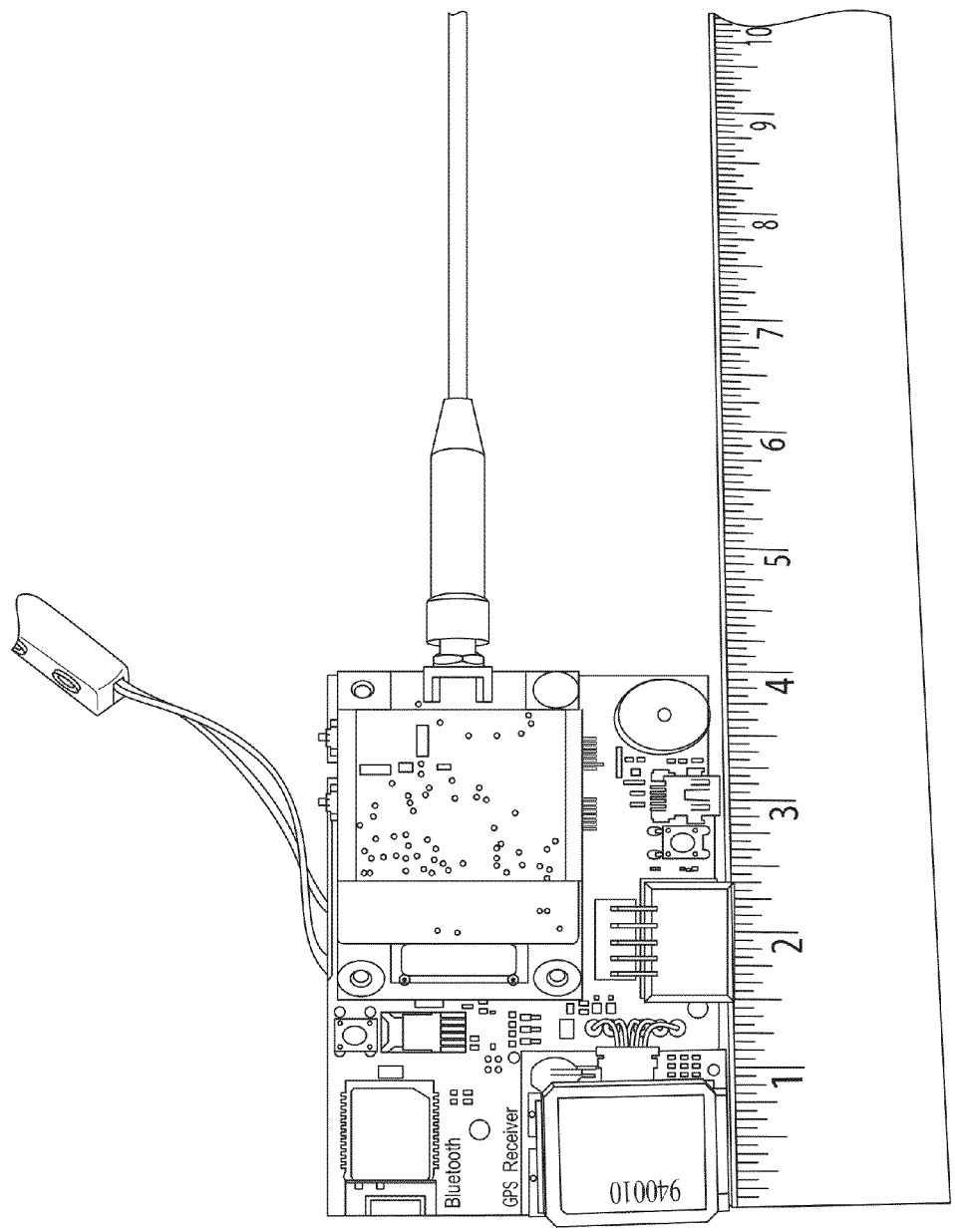
FIG. 18 is a photograph of a CSM according to the invention.
Figure 19:
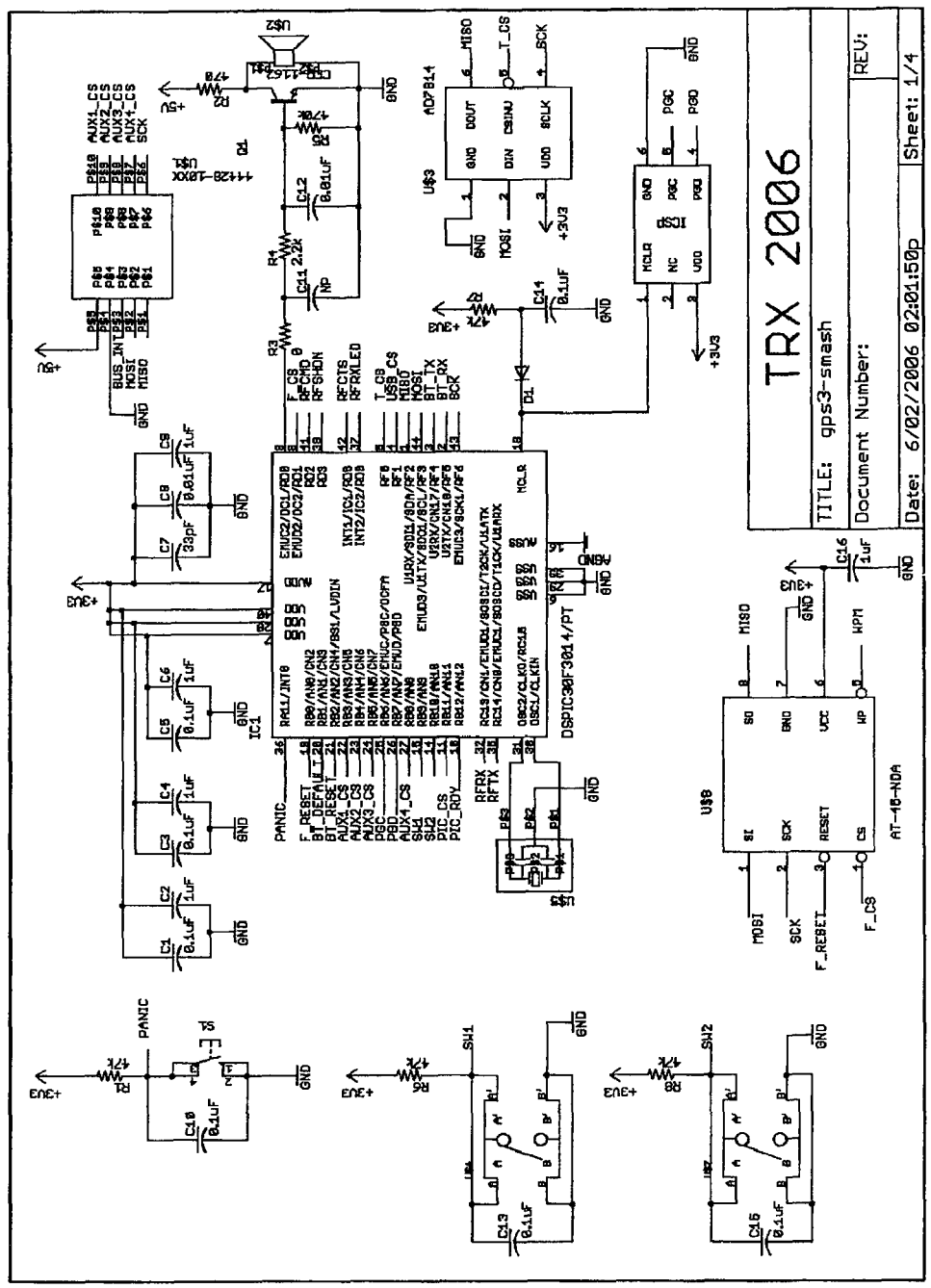
FIGS. 19-22 are schematic diagrams of the CSM according to the invention.
Figure 20:
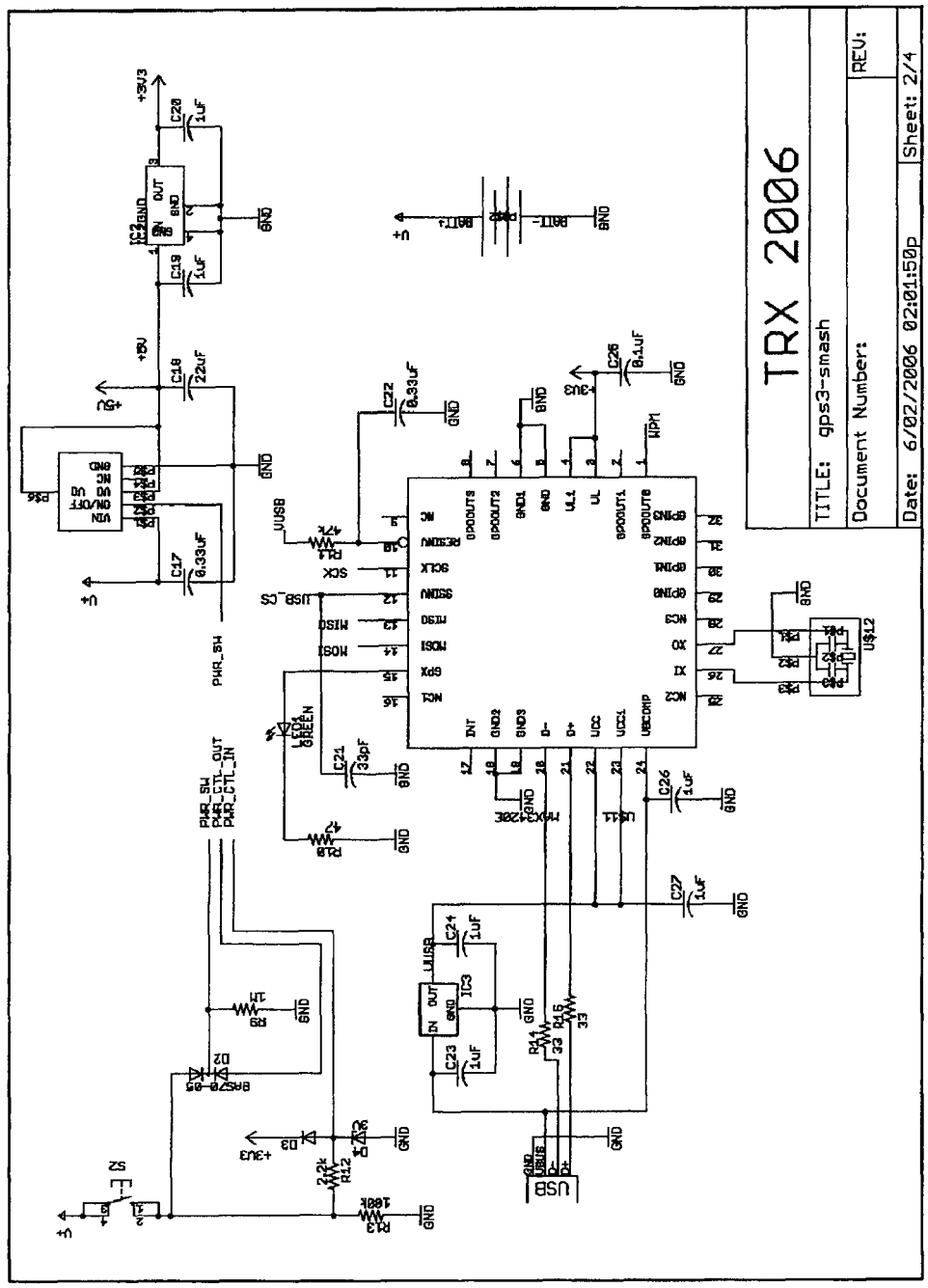
Figure 21:
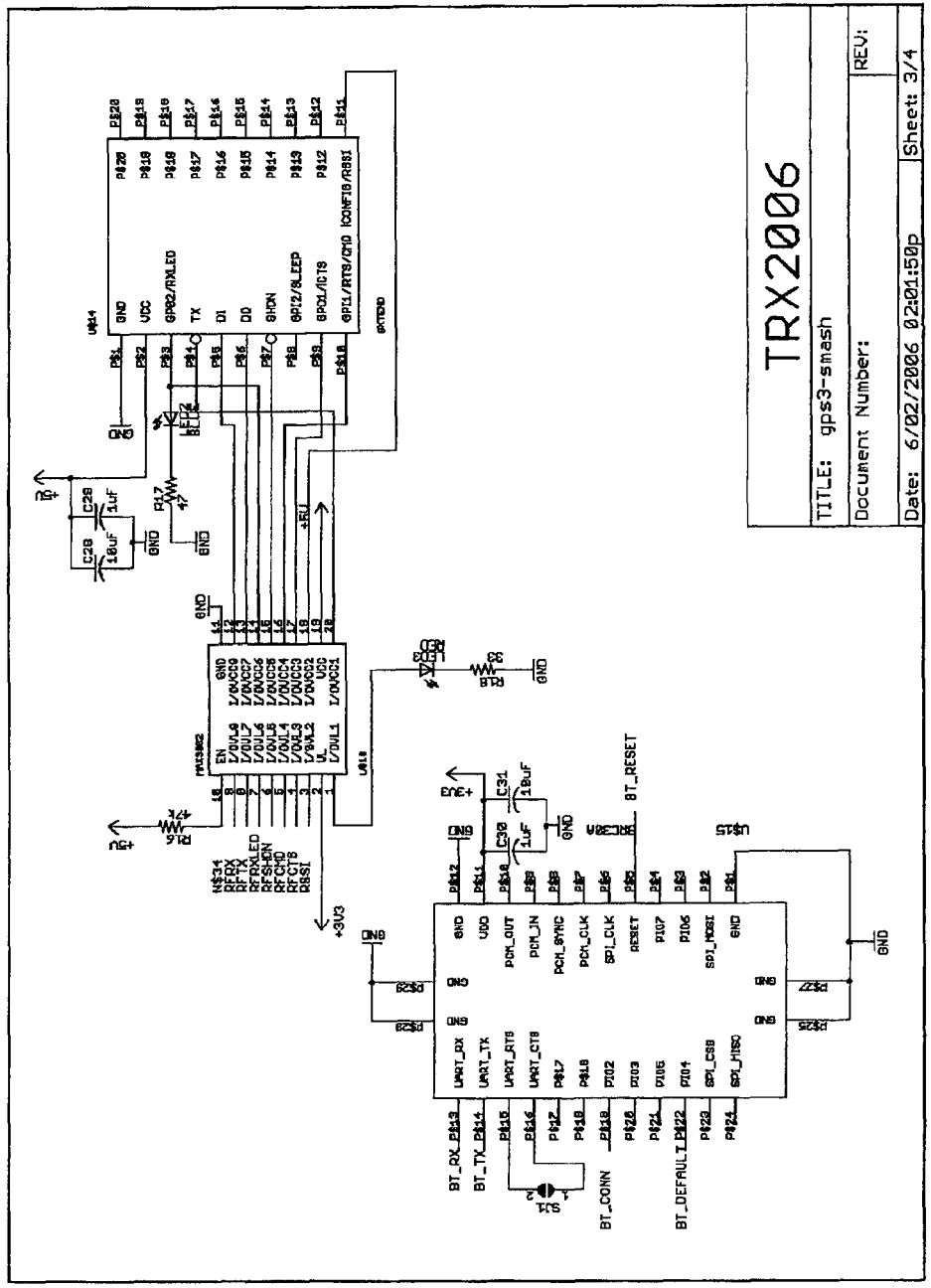
Figure 22:
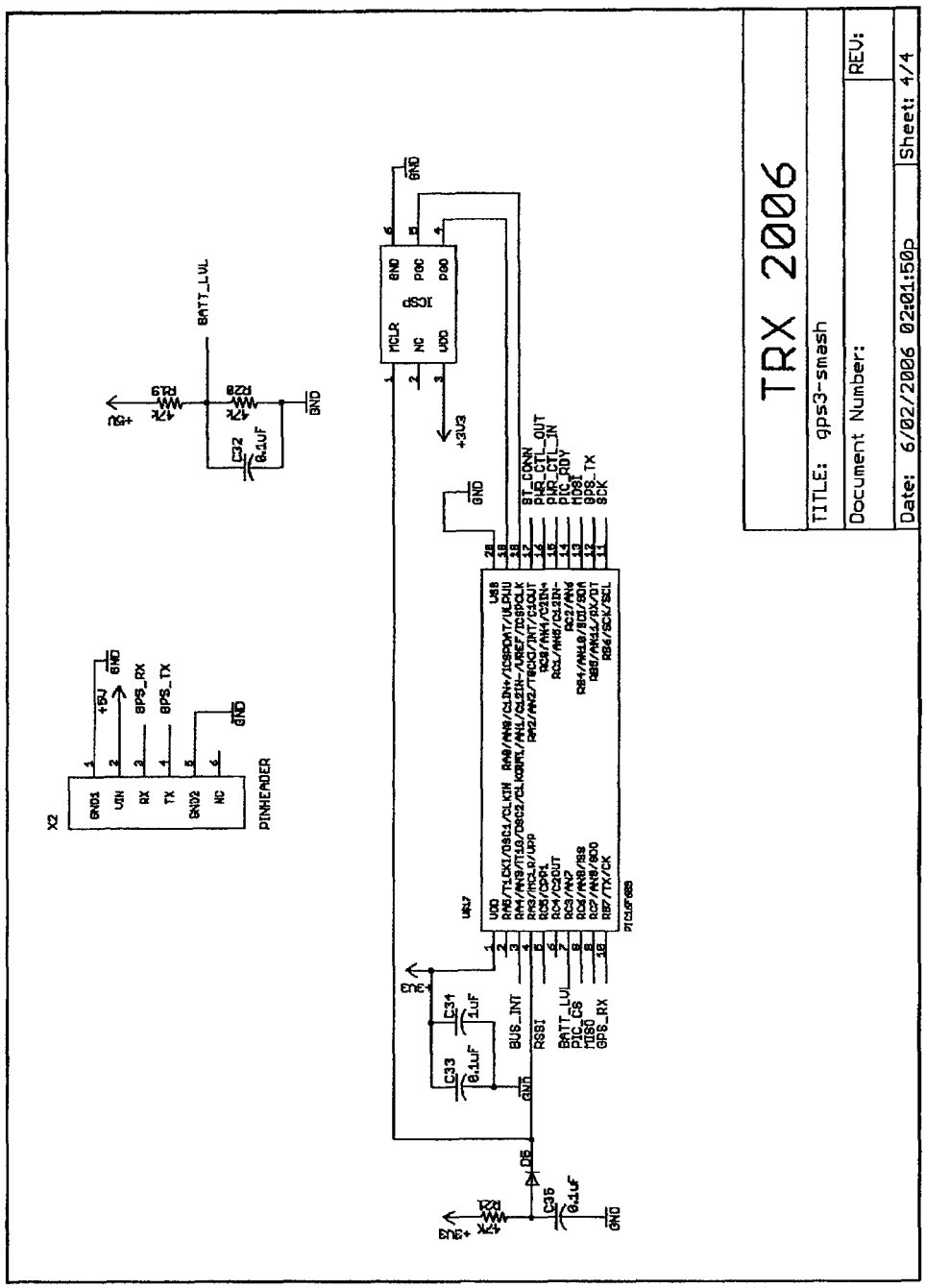
Figure 23:
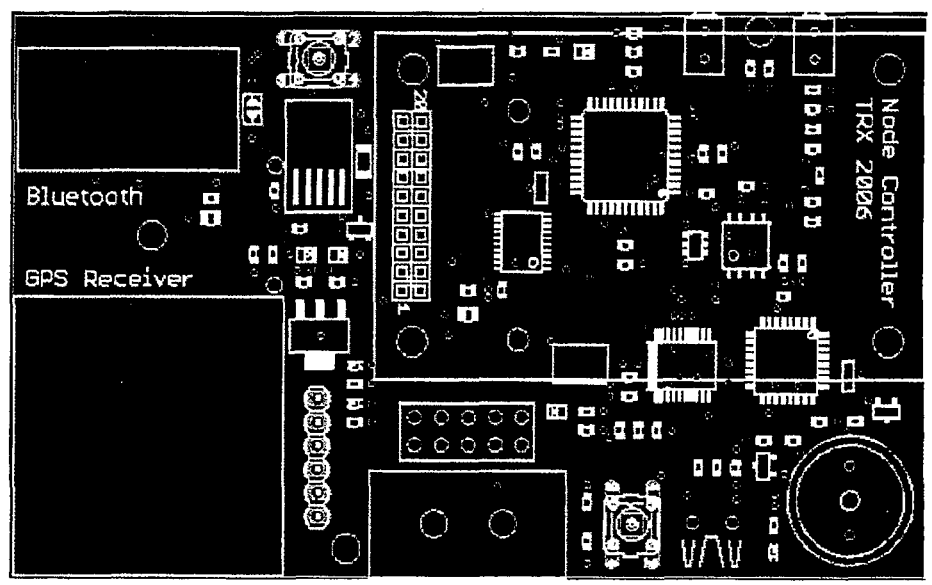
FIG. 23 is a layout of the CSM PCB according to the invention.

The Communications and Sensor Module Unit (CSM) or communication unit can control the sensor units and manage the communications between the person, animal and asset and the base station. The CSM can be about the size of a small cellular phone. The CSM can include a PIC Microcontroller manufactured by Microchip Inc. The PIC microcontroller can include a microprocessor which can be programmed in assembly language (or higher level languages) to read the data from the various sensors that can be connected to or integrated into the CSM, including the GPS, RSSI and, audio sensors. The CSM can also communicate with the INU over Blue Tooth or any wired, optical or wireless communication medium. The microprocessor can format and package the sensor data into an electronic node report. The report can contain several lines of hexadecimal information, with one or more lines or blocks from each sensor. The microcontroller on the CSM can be programmed to communicate using standard or proprietary communication protocols. The microcontroller can control the mobile unit transceiver to wirelessly transmit the node report (sensor and situational data) to the Base Station at regular intervals or asynchronously as communication condition permit. To communicate with the Base Station, the CSM can use the MaxStream 9XTend transceiver OEM (Available from MaxStream, inc. of Lindon, Utah), which can be connected to or integrated into the CSM. The MaxStream 9XTend can include an RSSI output port which can be monitored by the microcontroller and included in the node report. FIG. 18 shows an embodiment of the CSM according to the invention. FIGS. 19 through 22 show the schematics of one embodiment of the CSM, while FIG. 23 shows an embodiment of the CSM PCB layout.

Table 3 below contains the parts and part numbers of the more significant components of one embodiment of the CSM.

TABLE 3

| CSM Components | |
|---|---|
| AD7814ARTZ500RLCT-ND | DIGITAL TEMP SENSOR |
| AT45DB041B-SC-ND | MEMORY |
| BAS70-05TPMSCT-ND | DUAL SCHOTTKY DIODE |
| BRC30A | BLUETOOTH |
| 102-1134-ND | PIEZO BUZZER |
| 490-1220-1-ND | RESONATOR 12.0 MHZ CERAMIC INDUST |
| PIC16F689-I/SS-ND | PIC |
| DSPIC30F301430IPT-ND | DSPIC MCU/DSP |
| MAX3002 | 8CH LEVEL TRANSLATOR |
| MAX3420EECJ+-ND | USB CONTROLLER SPACE FOR FILTER CAP NO PLACE |
| SW401-ND | 10-XX SWITCH |
| EG2525CT-ND | SWITCH TACT RADIAL 180 GF |
| WM1998-ND | CON HEADER 10POS |
| X2 | PINHEADER |
| WM18689-ND | CONN RECEPT 6POS 2 MM LOPRO SMD |
| A31727CT-ND | CONN MINI USB RCPT RA TYPE B |
| 9XTEND | RF TRANSCEIVER |
| H1856-ND | CONN RECEPT 18POS 2 MM GOLD DIP |
| EM-406 | OEM GPS MODULE |

CSM Operation

The CSM can carry out the task of data aggregation from various sensors onboard including battery monitor (voltage), GPS data, temperature sensor, and distributed sensors such as the INU over Bluetooth establishing the Wireless Personal Area Network. In addition to sensor data, the CSM can also include a panic button to communicate distress, and general purpose buttons whose status must be communicated to the Sentinel Base Station for processing.

The CSM can compile all the sensor data into a Node Report which can be sent to the Sentinel Base Station in a predetermined format as discussed herein and can transmit a Node Report to the base station upon receiving a request. The Node Reports can include sequence numbers in order to provide communication error detection. The base station can request and the CSM can sent a specific Node Report (e.g., a Node Report corresponding to a specific sequence number).

After the Base Station is turned on, it can send out one or more Auto-Join Beacons to invite mobile units to join the network. The Base Station can periodically send out Auto-Join Beacons to invite mobile units to join the network. Upon receiving an Auto-Join Beacon each CSM backs off for a random amount of time, and transmits a Joining Beacon. If a mobile unit is polled in a round robin report request sequence, the mobile unit can assume that the Base Station is aware of it and it has joined the network. If the mobile unit is not polled in a round robin report request, the mobile unit waits the next Auto-Join Beacon to join the network.

By performing signal processing of the sensor data at the INU, the system obviates the need to stream data to the base station. In operation, only a relatively small amount of data needs to be sent to the CSM and by the CSM to the Base Station. Reducing the amount of data sent to the Base Station reduces the probability of wireless transmission errors and extends the range of communication between the CSM and Base Station to greater distance, for example, several miles. In addition, this feature also provides for reliable communication of data from deep within the confines of multi-story buildings and structures of the type that are found in urban and university campus environments Received Signal Strength Indication (RSSI)

The transceivers on the base station transceiver, and the CSM, the MAXStream 9Xtend, can be capable of recording received signal strength indication (RSSI) levels of incoming receptions. Received Signal Strength is measure of the power of the reception, i.e. the power at which the transmitting unit is broadcasting information with respect to the receiver. The RSSI value has an inverse relation with the distance between the units. A higher RSSI value indicates a shorter distance between the units and vice versa. Experiments can be conducted to determine position of mobile units using reference stations (for example 4 or more) recording the RSSI levels of the transmissions from the mobile nodes and communicating them to the base station. On the base station a program (such as a Visual Basic program or C program) can be implemented to locate the mobile units utilizing the RSSI information from the reference stations. Experiments have revealed that the RSSI values show exponential decay when an obstruction (example a wall) exists between source and destination. Using positioning with aid of additional transmitter signal power, RSSI can be used to estimate distance for units close to each other, to be polled for the multi-hop routing algorithm in the case where a mobile unit is out of range of the base station. In addition, RSSI can used in a search and rescue scenario providing accurate positioning information when one team member close to, for example, an injured or lost team member. The tracker can move towards the lost team member either guided by voice commands, or by other audible sounds indicating whether RSSI levels are increasing resulting from increasing proximity.

Incident Command Base Station

The Incident Command Base Station can be used for

Setting up and controlling the network of mobile units comprising CSMs and INUs, receiving reports from each CSM Storing and deciphering each received report in real-time and organizing the information to perform location determination base station algorithms Displaying all personnel status information in a simple yet comprehensive view Displaying Outdoor and Indoor Location information on appropriate maps for all personnel Performing Base Station Image Processing and Mapping algorithms to fuse GPS and INU tracking information and resolve location on maps Providing all other features that could benefit Incident Commanders such as satellite views and pre-plans.

Organize and save all information that could be used in the future in a well organized central database.

Information regarding the location and other situational data (temperature, heart rate, etc.) of a person (such as a first responder) or an animal can be assembled into a node report and transmitted by the CSM to the Base Station. The incident commander can manage the situation at the Base Station, which can be outside of and remote from the structure or area of interest and can display the location and person's (animal's or asset's) vital information on a graphical user interface. The Base Station can also control most of the communications and networking that allows the system to monitor numerous people, animals or assets, simultaneously.

The base station can include a computer (such as a laptop or portable computer) with a Maxstream modem transceiver connected to its USB Port. A desktop or other larger computer can also be used, for example, a computer built into an emergency response vehicle, armored vehicle or central station. The computer also has the associated application specific software developed for communications, as well as tracking and telemetry of people, animals or assets. Data to and from the people, animals or assets can be communicated to the base-station via the modem. The computer can use software to interpret the wireless node reports to obtain and display the situational information about the people, animals or assets. Using a time division multiplexing algorithm, the base station can communicate with each of the responders individually. The base station can fuse the data from the different location sensors associated with the people, animals or assets, and then can calculate and plot the trajectory of the people, animals or assets. The base station can also archive the data for later review and analysis.

Base Station Communication Protocols and Formats

The base station can use predefined standardized open and proprietary protocols and packet formats to communicate with the CSMs. For example, each packet can be one of a predefined type of packet which can interpreted by the CSM in order to determine an appropriate response.

TABLE 4

Base Station and CSM communication packet types
Packet Types

| | |
|---|---|
| P | Ping |
| K | Ping or Alarm Acknowledge |
| A | Alarm On |
| C | Alarm Cancel |
| R | Node Report Request |
| N | Node Report |

Ping (P) is a simple request for acknowledge to a CSM from the Base Station which generates and Ping or Alarm Acknowledge (K) from the CSM. 'A' turns the alarm of the target CSM on, and 'C' is the code to cancel the alarm. 'R' indicates a full node report request to a particular CSM from the Base Station to which the CSM responds with its complete compiled Node Report (R).

TABLE 5

Base Station and CSM communication RF packet Header Format

RF Packet Header Format

| # Bytes | 3 | 2 | 2 | 1 |
|---|---|---|---|---|
| Data | "@@T" | 0xSSSS | 0xDDDD | <CR> |
| Desc. | Start Delimiter and Type | RF Source Address | RF Destination Address | End Delimiter |

Example: Base Station Ping Node 1

| "@@P" | 0x0000 | 0x0001 | <CR> |
|---|---|---|---|

Example: Ping Acknowledge from Node 1

| "@@K" | 0x0001 | 0x0000 | <CR> |
|---|---|---|---|

TABLE 6

Base Station and CSM communication Node Report Format

Node Report Format

| # Bytes | 8 | 6 | 7-255 |
|---|---|---|---|
| Desc. | RF Packet Header w/Packet Type = 'N' | Node Report Header | Sensor Messages |

| # Bytes | 2 | 2 | 1 | 1 |
|---|---|---|---|---|
| Data | "@@" | 0xSSSS | 0xLL | <CR> |
| Desc. | Node Report Start Delimiter | Report Source Address | Number Messages in Report | End Delimiter |

TABLE 7

Base Station and CSM communication Sensor Message Format
Sensor Message Format
A sensor message is a "line" of data included in the Node Report.
The INU is considered one sensor. Other sensors include GPS,
board voltage, and temperature sensors.
Each sensor has a unique code associated with it so that it can be
recognized by the base station software.
Each report may contain any number of sensor messages. In any
order.

| # Bytes | 2 | 1 | 2 | 0-65535 | 1 |
|---|---|---|---|---|---|
| Data | "@@" | 0xCC | 0xLLLL | Data | <CR> |
| Desc. | Message Start Delimiter | Sensor Code | Number of Data Bytes | Sensor Message Data | End Delimiter |

Base Station Graphical User Interface and Display

The tracking system can include a remote interface (e.g., a base station) that allows a person to remotely monitor the position and status of the people, animals or assets carrying the CSM and INU units, the environmental conditions where they are located, and status of the people, animals or assets and their associated equipment including but not limited to the CSM, INU and other sensors or devices providing data to CSM. Data can be received via a wireless network at the base station using any of a variety of network protocols, for example, TDMA, CDMA or other self forming mesh communication network protocols. The remote interface can provides features including but not limited graphical display of people, animals or assets position estimates (including but not limited to estimates based on INU, GPS or fused sensor data) on maps of various kinds including those generated based on collected trajectory data, display of people, animals or assets identification and status information as determined by sensors connected to the CSM, including the INU. Maps and personnel data can be stored locally or remotely in databases that are accessed by the Base Station. The remote interface can provide various 1 or 2 way alarming features. Alarms may based on raw or processed sensor data received from CSM units, for example, no motion alarms or manually activated alarms.

The Base Station software can provide a user friendly interface where an incident commander or other operator type personnel (operator) can monitor the location and vital signs of people, animals or assets that are carrying the CSM and INU units. The Base Station can also provide situational information regarding the structures and general surroundings where the system is being applied. The interface can, for example, be written in the Visual Basic, C++ and/or C-Sharp (C#) programming languages. The software can be divided into various sub sections. The Base Station software can handle all data processing and algorithm computations. The user interface can display information on the current system state as well as provide run time control.

Software Components

Network Polling Process

Information from the CSM and any connected sensor, including the INU, can be collected for each of the people, animals or assets being tracked. This information can include, but is not limited to, location estimates, vital signs and current status. To achieve this information, collection in a robust and orderly fashion using a polling network methodology can be established and implemented. Information can be collected using a polling sequence. The polling sequence can run continuously, synchronously or asynchronously as conditions can dictate. The polling sequence can run in background and on a dedicated CPU thread. While this thread is operative, it can sequentially attempt to poll each CSM address. For each attempted poll, the CSM response can be deposited into a shared buffer as an array of bytes with varying length. After each poll cycle, the thread can report it status to the user interface. The status can contain information related to missed responses and can ensure that the operator knows which CSMs have and have not reported information. The network polling process can be run on a dedicated thread to ensure the modularity of the software. Because of this, the network polling process can be paused as opposed to simply stopped completely.

Additionally, the poll sequence can include transmit an Auto-Join Beacon to initiate the Auto Join process. In one embodiment, if the list of CSM addresses is empty, the Auto Join process can be initiated. The Auto Join algorithm can send out a predefined packet type or "beacon" and process CSM responses to add CSM addresses to its polling list.

The Auto-Join process allows new mobile units to join the polling sequence. When the CSM is powered on, a flag is set so that it will attempt to respond on reception of an Auto-Join Beacon from the Base Station. The auto-join beacon can be a ping "P" type packet with both source and destination address set to 0x0000 (reserved). If the Auto-Join flag is set in the CSM it can respond to the beacon with a ping response. The "beacon frame" can be 1.6 s long and contain 16 time slots for a mobile node to respond. The mobile node CSM can choose one of these 16 slots at random to respond. Upon receipt of a response the Base Station can add the mobile node to its poll list. The Auto-Join flag in the CSM can be cleared whenever the mobile node is polled and can be set if the auto-join beacon is detected twice without being polled at least once in between beacons. This provides a process for a mobile unit to re-join the network if it is ever dropped from the polling list.

Below is an example of a main program loop for executing the network polling process.

```
private void Run( )
{
int pollCount = 0;
while (!__Abort)
{
    pauseEvent.WaitOne( );
    FireUpdateProgress( );
    List<Node> nodeList = NodeList.GetAllNodes( );
    if (nodeList.Count == 0 || pollCount % 10 == 0)
        {
        AttemptAutoJoin( );
        pollCount++;
        }
    else
    {
        foreach (Node node in nodeList)
        {
            ProcessNodeRequests(node);
            Thread.Sleep(__SerialWaitTime);
            node.UpdatePollStatus( );
        }
        pollCount++;
    }
}
}
```

Data Structures

Figures 1, 24:
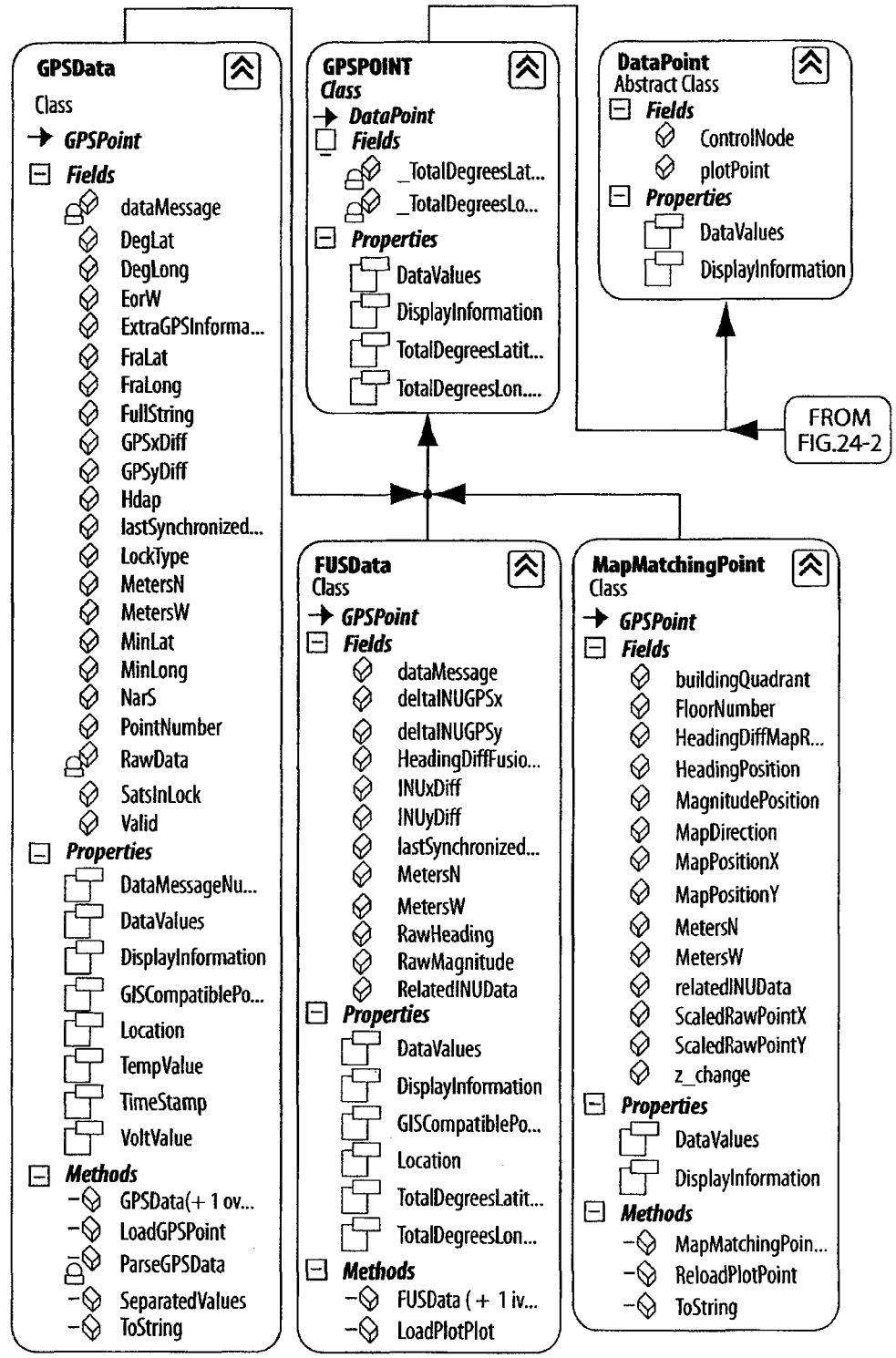
FIG. 24 shows a hierarchy of data processed by the Base Station according to the invention.
Figures 2, 24:
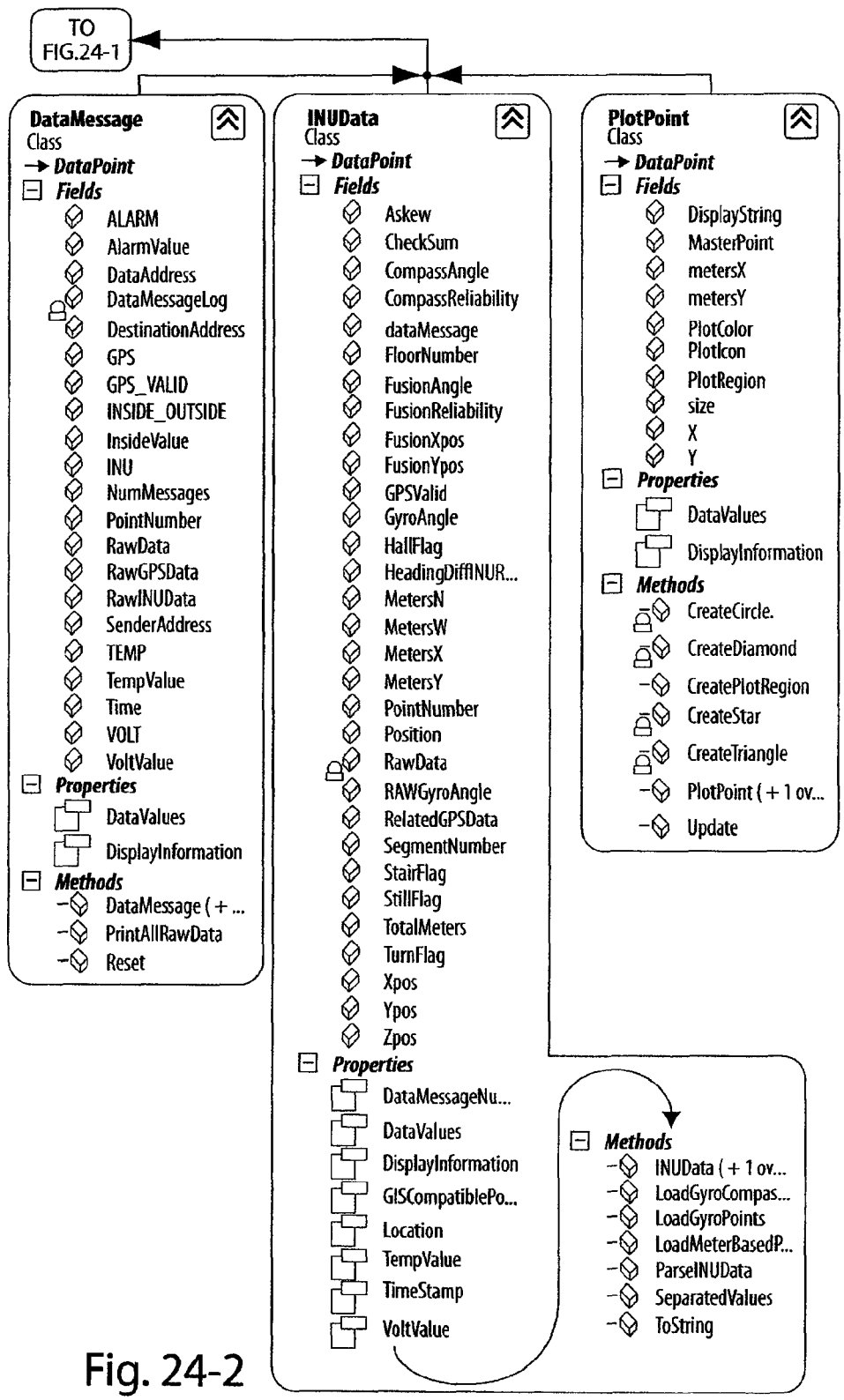

Data structures can be defined to store and access the information generated within the system. A hierarchy, as shown in FIG. 24, can be created to describe all data being processed by the Base Station. There can be many categories of data received from the various CSM units. For example, data categories can include data which contain valid GPS and those which do not. The different elements contained in each CSM transmission can result in the data being processed and utilized differently by the algorithms of the system. The Data structures can be used to keep all data organized and easily assessable to the various modules of the software. Each CSM response can be stored and broken up into various different data objects. These data objects can be passed to their appropriate GUI processes for operator viewing or passed to various algorithm functions for processing. For example, a CSM report which contains both INU and GPS can be processed using the INU/GPS fusion algorithm. While any CSM report containing invalid compass data will not be processed using any fusion angle algorithms.

Algorithm Processing

Information collected from the CSM via the polling process described above, can be thoroughly and carefully processed for error detection and correction, and optimizations. This processing can utilize various mathematic and statistical methods to reduce and/or eliminate errors. The algorithm processing routine can handle the execution of these major mathematical and statistical methods. Modularly handling these executions ensures the portability and stability of the software. In the event of an unforeseen critical error, execution on this specific data packet can be dropped and can be continued on the next available data.

In addition to various mapping and location algorithms, the collected data can be categorized into various data objects by the algorithm processing sequence. After successful execution of the necessary algorithms, the processing thread can signal a re-plot of all pertinent data. This processing sequence can run on a dedicated thread. While this thread is active, it can attempt to read from a shared data buffer filled by the Network polling Process described above. For each successful read, the data can be first parsed into a Data Message object. The Data Message object can be universal throughout the program and can contain raw unprocessed data from each individual CSM sensor. The data can be compiled together and tested to determine which appropriate algorithm can be run. The processing thread can attempt to run all scaling and processing on a new Data Message object. In the event of a critical error in any Data Message, a status report can be sent to the GUI in order to notify the Base Station Operator. Appendix A includes sample pseudo code can be used for supplying correct locations, and which can be used by the plotting code which display the information in the GUI.

Plotting Execution

In order to display position estimates to the operator, a drawing method can be implemented. This drawing method can be executed on command from the processing thread. When the plotting execution is triggered, all available scaled and processed data can be downloaded using the guidelines specified by the user. Unnecessary information can be filtered out. The data can be scaled to the proper zoom level and drawn to the screen. An example of filtering data is in a single floor view. To display only the data points for a particular floor, all other data points can be removed and only those for the desired floor can be shown. For example, to provide scaling where an operator desires to zoom out to a low resolution, the distances between the points on the screen will change and the points can be redrawn closer together. Pseudo code for the scaling process are provided below.

```
public void CreatePlot( )
{
Bitmap PlotImage = new Bitmap( );
ScalePointsToProperZoomLevel(CurrentPlotPoints);
using (Graphics g = Graphics.FromImage(PlotImage))
{
    g.Clear(Color.White);
    DrawPlotControlObjects(g);
    foreach (Node nodeToDraw in CurrentNodesToPlot)
    {
        List<DataPoint> nodePoints = new List<DataPoint>( );
        foreach (DataPoint point in CurrentPlotPoints)
            if (point.ControlNode == nodeToDraw)
                nodePoints.Add(point);
        DrawPoints(g, nodePoints);
    }
    DrawBottomScaleBar(g);
    DrawSideScaleBar(g);
    DrawPlotHeader(g);
}
PlotDisplayPictureBox.Image = toDrawOn;
}
```

Graphical User Interface (GUI)

The Base Station Software can include the ability to maintain, process, display and edit a Building Database. The Building Database is a database containing information about building inside of which people, animals and assets can be tracked. This database can be physically stored: locally, on a remote server, or a portable memory device, or any combination of all three. This database can be created over time and compiled together to be shared with any user of the Base Station software. For example, a random building loaded into the database for a city in College Park, Md. can be reloaded and used on any Base Station computer throughout the country. Once loaded, the Base Station can be used to provide a visual representation of a building. The data base can also include useful information to pick out a particular building using various search techniques. The building database can include the following for each building:
1. GPS location estimated to the center of building and each corner of the building, as well as GPS coordinates of exits.
2. Satellite imagery, represented, for example, in JPG format.
3. Pre-Plan template taken from each first responder station. If template is empty it is displayed for reference anyway.
4. Geographic Information Systems (GIS) polygon representation.
5. All available maps and floor plans.

Building Loader Window

The building database is parsed and displayed in a window on the monitor which can be referred to as a Building Loader Window. The building loader window can be comprised of two panels and several buttons. One panel contains many building loader controls, which are the visual representation of the building. The other panel starts empty, and can be filled by a drag-drop operation on the building loader controls just mentioned. Once loaded, the base station operator can remove unwanted buildings, and highlight structures of importance to the incident. One or more buildings can be "Loaded" into the System prior or during an incident. To load a building, its associated Building Loader Control is clicked and dragged by the user to the loaded building panel. Once the building is loaded, all processing regarding indoor location, as well as indoor-outdoor transitions around this building, will be performed with respect to this building.

Figure 25:
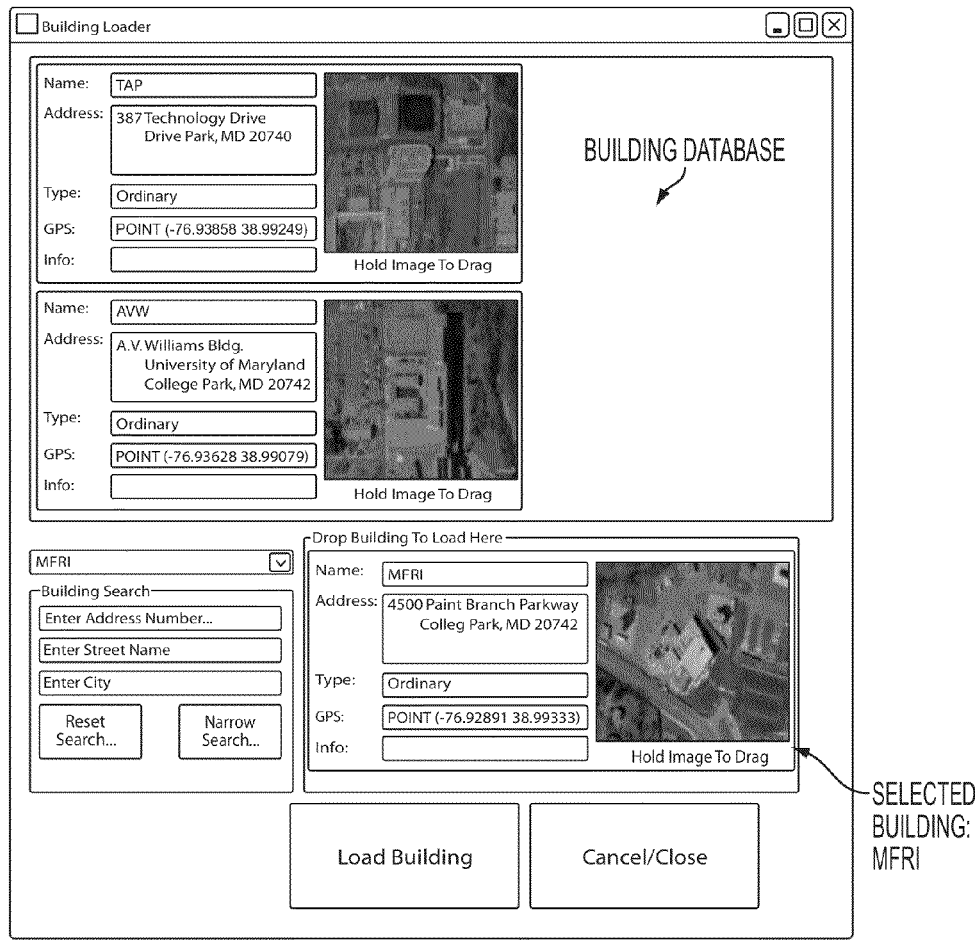
FIG. 25 shows a diagram of the Building Loader system according to the invention.

FIG. 25 shows a Building Loader which can be used to load a building for real time tracking inside of loaded building.

Building Satellite View

Satellite views of the building are provided to give the Incident Commander geographic and structural awareness of the incident scene. These images can be interactive in the sense an incident commander can zoom or pan the images to get a broader range of geographical awareness. One specific purpose of this view is to give incident commanders as much detail about the roof of a building. Using high resolution images is the most practical and accurate way to show roof information. The database for each building contains automatically updated downloads of a top view aerial photograph, as well as a photograph of the building from each of the following directions. North, South, East and West views and saves them for each building for viewing at the incident scene. The satellite view screen has no buttons, only the thumbnail images of the buildings. Upon clicking a particular image, it is brought the middle of the screen and displayed larger.

FIG. 26 shows the Base Station Satellite Top View.

Figure 27:
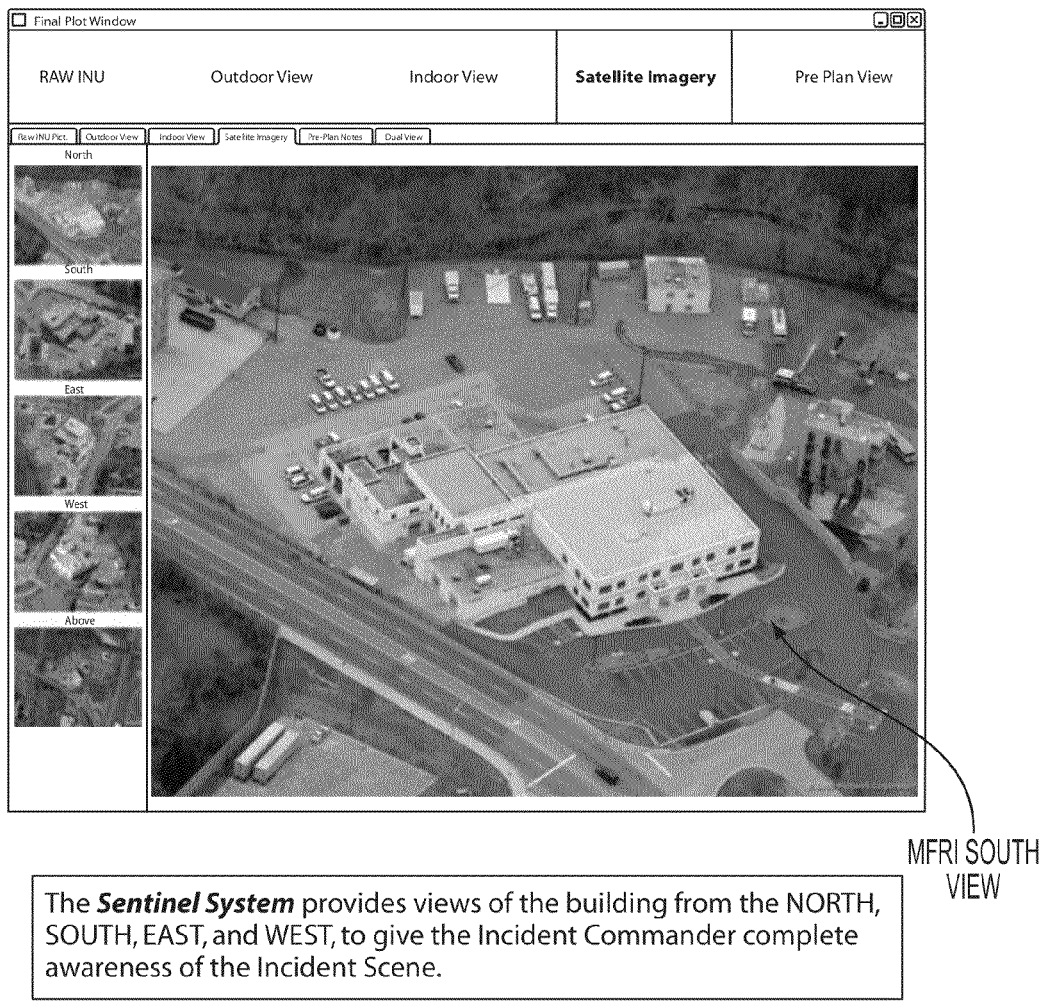
FIG. 27 shows a diagram of the System Satellite Side (South) View according to the invention.

FIG. 27 shows the Base Station Satellite Side (South) View

Building Preplan View

First Responders often maintain preplans of areas/buildings which they might be potential incident scenes. The Base Station allows these plans to be viewed within the Base Station in electronic format, and to be edited, and saved in the building database for future reference removing the need for unorganized hard copies, and providing a complete solution for all the needs of first responders. These pre plans can be in any compatible file format including but not limited to: .JPG, .BMP, .GIF, .PDF, .TIF FIG. 28 shows the Base Station Pre-Plan View.

Personnel Database

The Base Station Software has the ability to maintain, process, display and edit a Personnel Database. This database can be physically stored: locally, on a remote server, or a portable memory device, or any combination of all three. This database can be created over time and compiled together to be shared with any user of the Base Station software. For example, a random Personnel loaded into the database in College Park, Md. can be reloaded and used on any Base Station computer throughout the country. Once loaded, the Base Station creates a visual representation of each loaded Personnel. The representation is not only a picture of the person, but contains useful information to pick out particular personnel using various search techniques. The personnel database contains the following for each building:
1. A associated name of personnel
2. An associated team name for personnel. This team acts as a categorizing group during software run time.
3. Personal information including but not limited to: Height, Weight, Age, Shoe size, photograph. Personal information is useful in future scaling and position estimating during software run time.
4. A color used to represent the personnel on all plotting and display windows throughout the incident.

Personnel Loader Window

Figure 29:
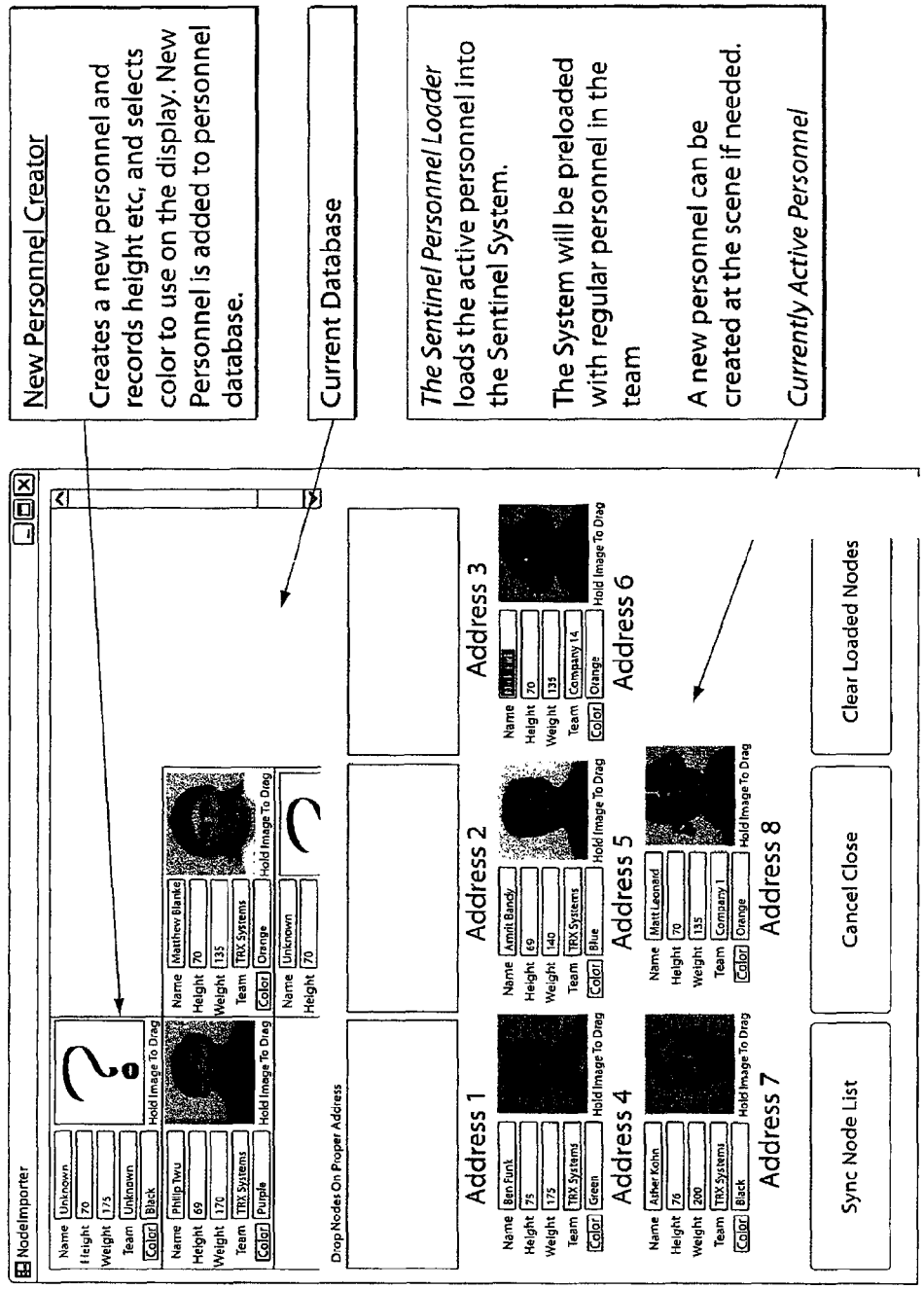
FIG. 29 shows a diagram of the System Personnel Loader according to the invention.

The personnel database is parsed and displayed in a window on the monitor which can be referred to as a Personnel Loader Window. The personnel loader window can be comprised of two panels and several buttons. One panel contains many personnel loader controls, which are the visual representation of the personnel. The other panel starts empty, and can be filled by a drag-drop operation on the personnel loader controls just mentioned. Once loaded, the base station operator can remove unwanted personnel, and highlight personnel of importance to the incident. One or more personnel can be "Loaded" into the System prior or during an incident. To load personnel, its associated Personnel Loader Control is clicked and dragged by the user to the loaded personnel panel. Once the personnel are loaded, all processing regarding data collected from this personnel will be scaled processed and saved with reference to the associated personnel FIG. 29 shows the Sentinel Personnel Loader which can be used to load personnel for real time tracking and monitoring.

Base Station Information Panel

The Base Station Information Panel (BSIP) is responsible for displaying Personnel-Status-Information for each personnel currently loaded into the system. The BSIP is designed to display a simple yet comprehensive view of all the personnel information available at the Base Station.

Figure 30:
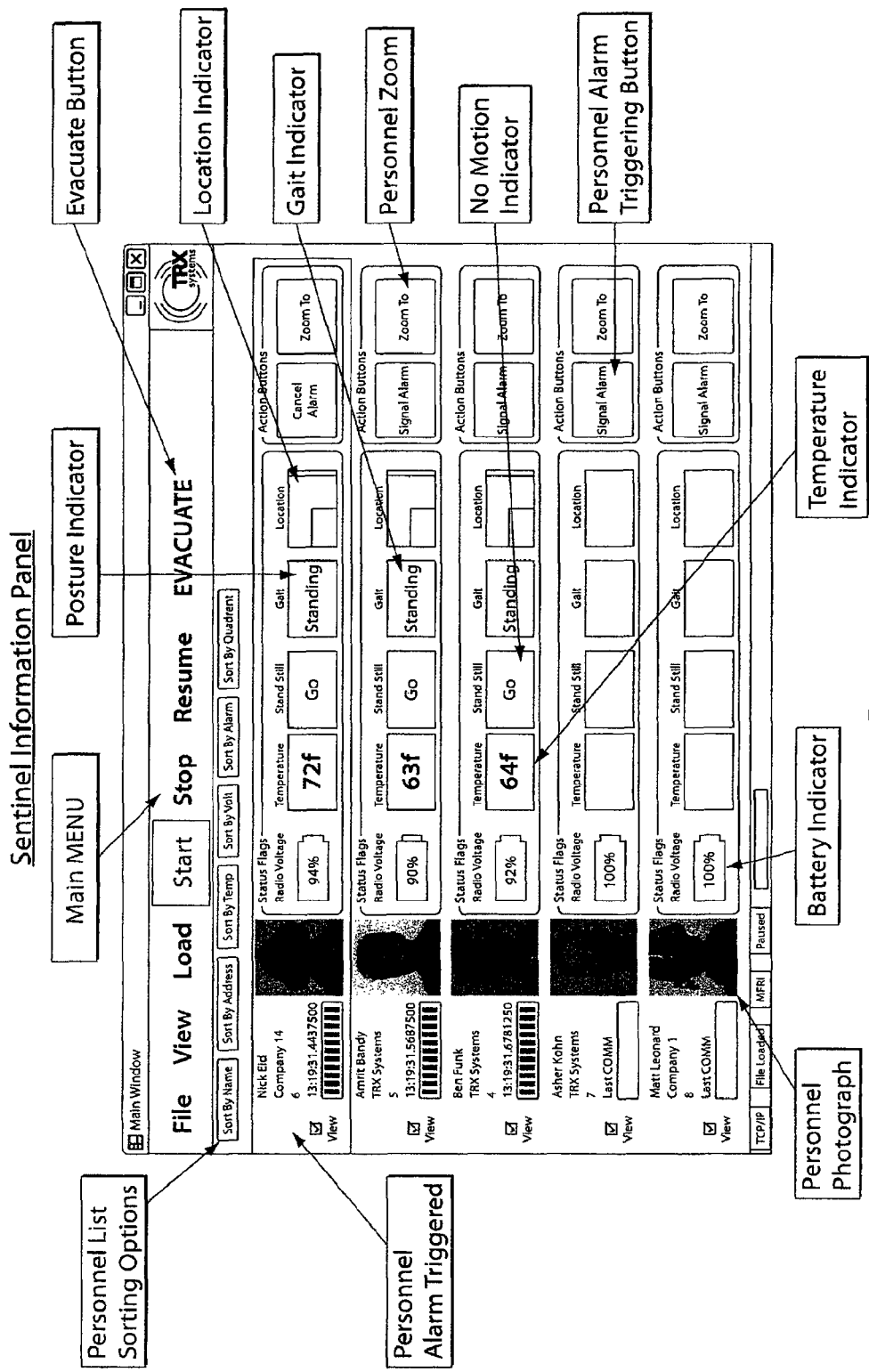
FIG. 30 shows a diagram of the System Information Panel and Features according to the invention.

FIG. 30 shows the Base Station Information Panel and Features.

The Personnel Status Information used in the Base Station Software is characterized with large buttons which can be found easily and pressed while wearing gloves on a touch screen. It allows an operator to easily view critical information about personnel as well as immediately navigate to any personnel's location on the indoor or outdoor view described below. It also allows instant signaling of individual personal alarms for each of the personnel.

Status information can contain but is not limited to the following information:
a. A checkbox used to toggle the visibility of a personnel location icon on all location views. This is used if there is no interest in actively tracking particular personnel but interest may remain in monitoring these personnel's vital signs or if interest remains in notifying these personnel with evacuation alarms b. A general information section which displays
   i. Personnel Name—As stored and read from personnel database described above.
   ii. Team—As stored and read from personnel database described above.
   iii. Data receiving progress bar—This is a standard Microsoft windows form object of type ProgressBar. The status bar is the source of indication to the incident commander. On each successful radio transmission the status bar indicator will increase till the maximum and on each failed radio transmission the status bar will decrease till zero.
   iv. Personnel Photograph—As stored and read from Personnel data base described above.
c. Various real time sensor information including but not limited to:
   i. Battery Indicator: Since personnel in a crisis situation will not have time to check their own battery levels at the incident scene, their battery levels are monitored at the Base station (ex. can be polled less if battery low). For easy visibility and comprehension the battery status indicator is displayed to represent a battery indicator and fills green as the battery life increases.
   ii. Temperature Indicator: Temperature of personnel's suit
   iii. No Motion Indicator: 'Go' (green) if personnel are moving, 'Still' (red) if personnel are not moving.
   iv. Posture Indicator: Information regarding whether personnel is walking (green), crawling (yellow), or lying on back (red)
   v. Location Indicator: Displays 'Outside' when personnel is outside. When indoors, shades the Quadrant in which personnel is located on the floor plan. (Color used to shade quadrant is the same color used to plot personnel on the floor plan). Solid black line to assign one side of the floor plan as the 'ALPHA side' to reference the other quadrants. (alpha-bravo, bravo-charlie etc . . . )
      1. If top-left quadrant shaded, on zooming to personnel, he/she will be found on the top left quadrant of the floor plan.
d. Personnel Action Buttons including but not limited to:
   i. Personnel Alarm Control Button: This button remains in one of two states.
      1. SignalAlarm is used to remotely activate the alarm on the CSM of the selected personnel
      2. Cancel Alarm is used to remotely deactivate the alarm on the CSM of the selected personnel.
      A state approach was taken to minimize multiple controls on the user interface. When personnel signal there alarm through there CSM the Base Station changes states accordingly.
   ii. Personnel Zoom: Press to zoom to chosen personnel. If personnel are outdoors the outdoor view window described below is brought forward. If personnel are indoors the indoor view described below is brought forward.

When tracking multiple personnel at an incident the order in which these information controls are displayed is dynamic. The orders in which personnel information controls are displayed include but are not limited to
   a. Temperature: Personnel can be arranged by ascending or descending temperature readings.
   b. Alarm: Personnel can be arranged by ascending or descending alarms indicators. Personnel with an active alarm can be brought to the top or bottom. In the event a personnel alarm is trigger by the personnel the personnel information control is automatically brought to the top.
   c. Battery: Personnel can be arranged by ascending or descending battery readings.
Quadrant: Personnel can be arranged by ascending or descending building quadrant locations.

Base Station Control Panel

The Base Station Control Panel (BSCP) is software responsible for displaying and processing main menu actions for an incident commander (or operator) on the monitor. The BSCP is characterized with large buttons which can be found easy and pressed while wearing gloves. It allows an incident commander or operator to easily navigate and control various subsections of the Base Station as desired.

Main menu controls can be but are not limited to:
   1. Starting, stopping and pausing of the operation of the entire system, or any part of it.
   2. Selecting various view windows as mentioned above.
   3. Choosing to save or load incident data.
   4. Individual or incident wide alarms and panic signals.

FIG. 30 shows the Base Station Control Panel.

Base Station Outdoor Tracking View

In order to display a clear estimate of personnel location, the Base Station can show the location of personnel at an incident scene outdoors relative to surrounding landmarks. These land mark are loaded from local GIS layers. While buildings are loading as discussed above, the GIS layer used to represent the building polygon is loaded as well. Polygons for any building can be colored and rendered as allowed by standard GIS schemes. Different building can be rendered different colors to highlight certain aspects. Some are but not limited to:
   a. Building construction
   b. Building height
   c. Building age
   d. Building occupancy Personnel who are outdoors are shown as blue circular icons. Personnel indoors in are shown as green circular icons, and personnel with currently signaled alarms are show as red circular icons. The GIS map is chosen for its simplicity, lack of unwanted colors, and layered standard format. The Outdoor view allows an incident commander the ability to track personnel relative to a particular building or outdoor scene.

Figure 31:
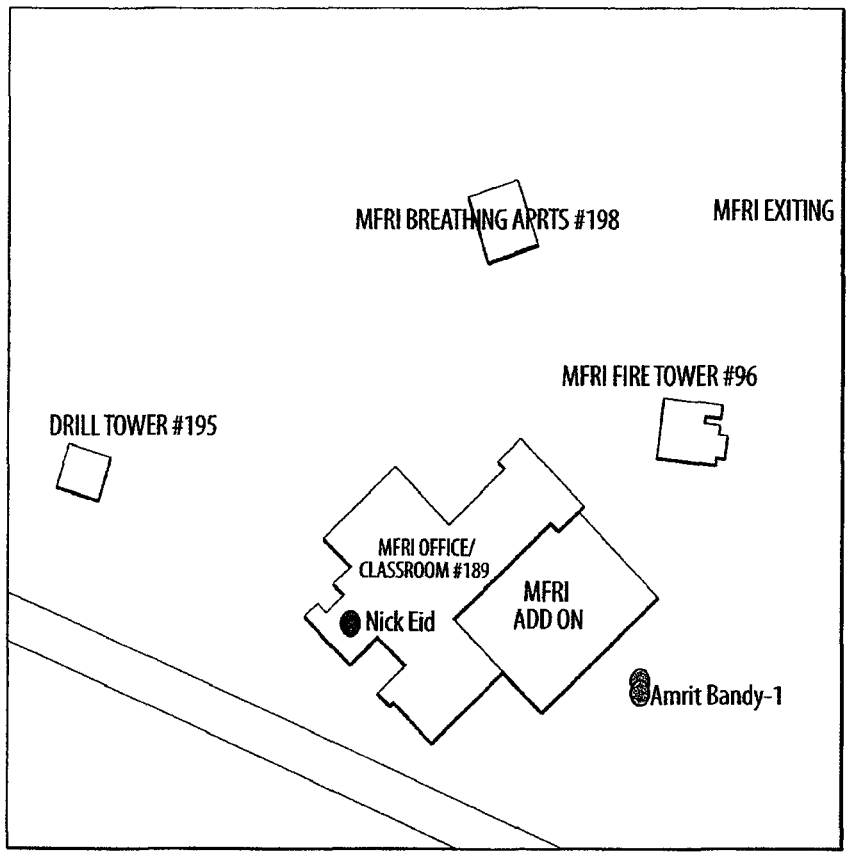
FIG. 31 shows a diagram of the System Outdoor Tracking View (GIS) according to the invention.

FIG. 31 shows the Base Station Outdoor Tracking View (GIS).

Base Station Indoor Tracking Views

The Base Station can display real time position estimates of personnel. When a digital copy of a loaded build floor plans is available the Base Station is capable of overlaying position estimates on this digital image. The image can be loaded while its associated building is being loaded in the building loader process described above. On each execution of the plot refresh discussed above, a copy of this image is created locally and drawn upon using C# GDI techniques. Each image copy can be physically changed and displayed to operator on screen. Each person (animal or asset) while indoors can be represented as arrows pointing in the direction the tracked person (animal or asset) is facing at remote time, this direction is relative to the floor plan. Each personnel can be displayed in a unique color as specified from the Personnel Database. On the Base Station Indoor Tracking view, the operator can have the ability to identify any personnel currently visible by simply clicking on the visual representation of the desired personnel on the screen. A visual information box is displayed. This visual information box, whether a form or control, contains information about the selected personnel. The information that can be displayed includes but is not limited to:
 a. Current Temperature.
 b. Current battery status
 c. Assigned team
 d. Duration in building The floor plan can be drawn stretched to the current set screen resolution on the Base Station laptop running the software, this can be done to maximize visual clarity.

On the Indoor Personnel Tracking View, the left side of the indoor tracking view is dedicated to floor selection. Floor selection is done by an icon that is used to represent the desired floor. This icon can be text filled or an image, it can be colored or not colored. Taking advantage of the database structure created and discussed above, the Base Station is able to display the number of personnel on each loaded floor. In real time as Personnel change floors the numbers reflect the current state. The currently selected floor is highlighted in white.

Figure 32:
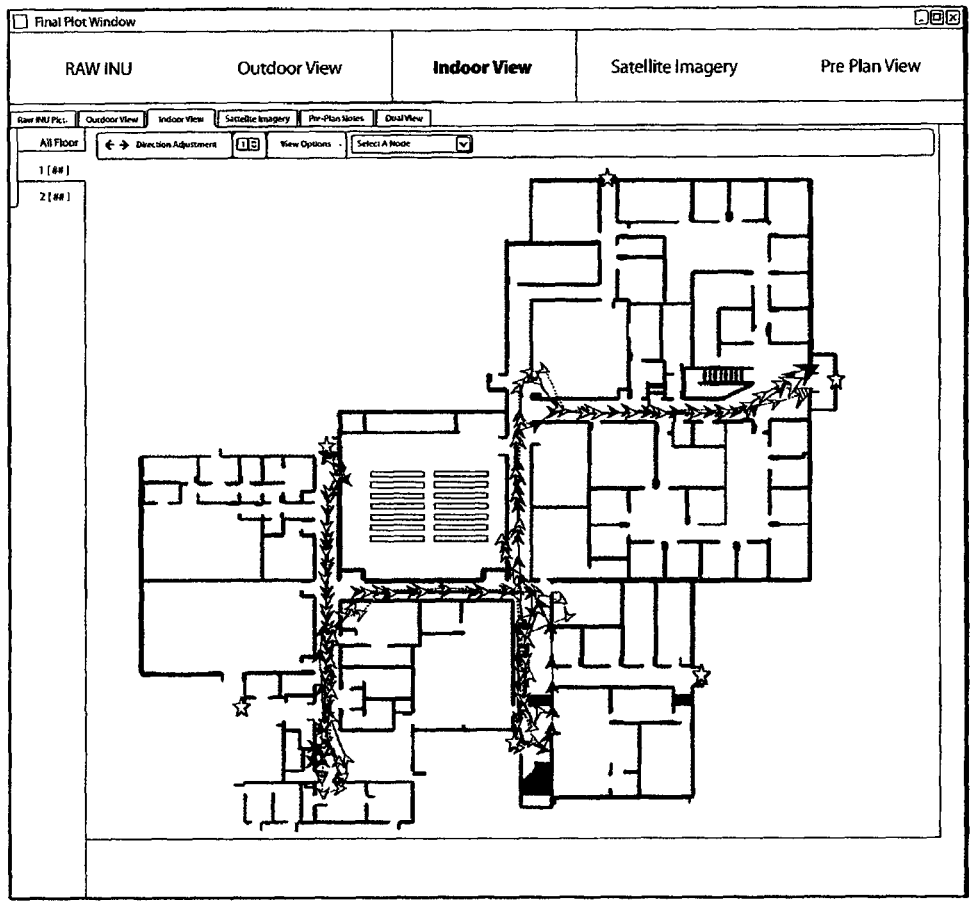
FIG. 32 shows a diagram of the System Indoor Tracking View (Floor Plan View) according to the invention.

FIG. 32 shows the Base Station Indoor Tracking View (Floor Plan View).

Figure 33:
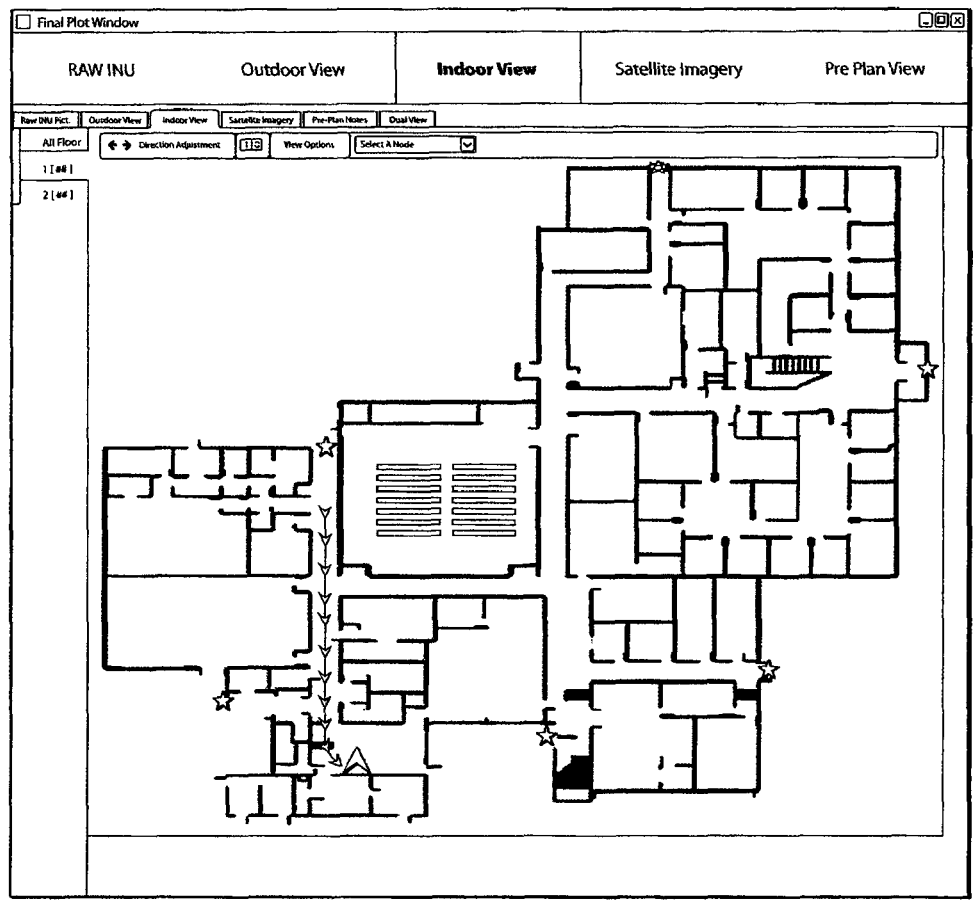
FIG. 33 shows a diagram of the System Indoor View— Alarm Situation according to the invention.

FIG. 33 shows the Base Station Indoor View—Alarm Situation.

Base Station Image Processing and Mapping Algorithms
Map-Matching Algorithm
 The Map Matching Algorithm helps the incident commander easily visualize where personnel in a building are located if floor plans of the building are available.
 While developing the map-matching algorithm it is important to remember that the human brain has highly advanced pattern recognition intelligence and the computer does not, making the task of programming the computer to map-match a rather challenging project though at times it may 'look' trivial.
 The floor plans of each floor of the building are 'profiled' using a Map PreProcessing program (MPP) MapPreProcess locating features in each floor plan such as turning nodes (corridor intersections and limits), stairwell and elevator locations, and Exits if the floor is an Exit Floor.
 These features are recorded in a Map Matching File(MMF text file) to be read by the Map-Matching Program
 The Map Matching Program (MMP) reads the floor plans of the building, and corresponding MMF files, records all the features, inputs a startpoint on the floor plan either from a click input or from the last known GPS-INU Fusion point and starts plotting the free raw points on the map. If incoming data suggest that a correction can be made, it is made. If the correction type involves an angle correction, the angle is corrected and held until the incoming points indicate a turn. At this point we let the path be plot free again, with respect to the current direction taking all corrections into account and await the next correction.

Figure 34:
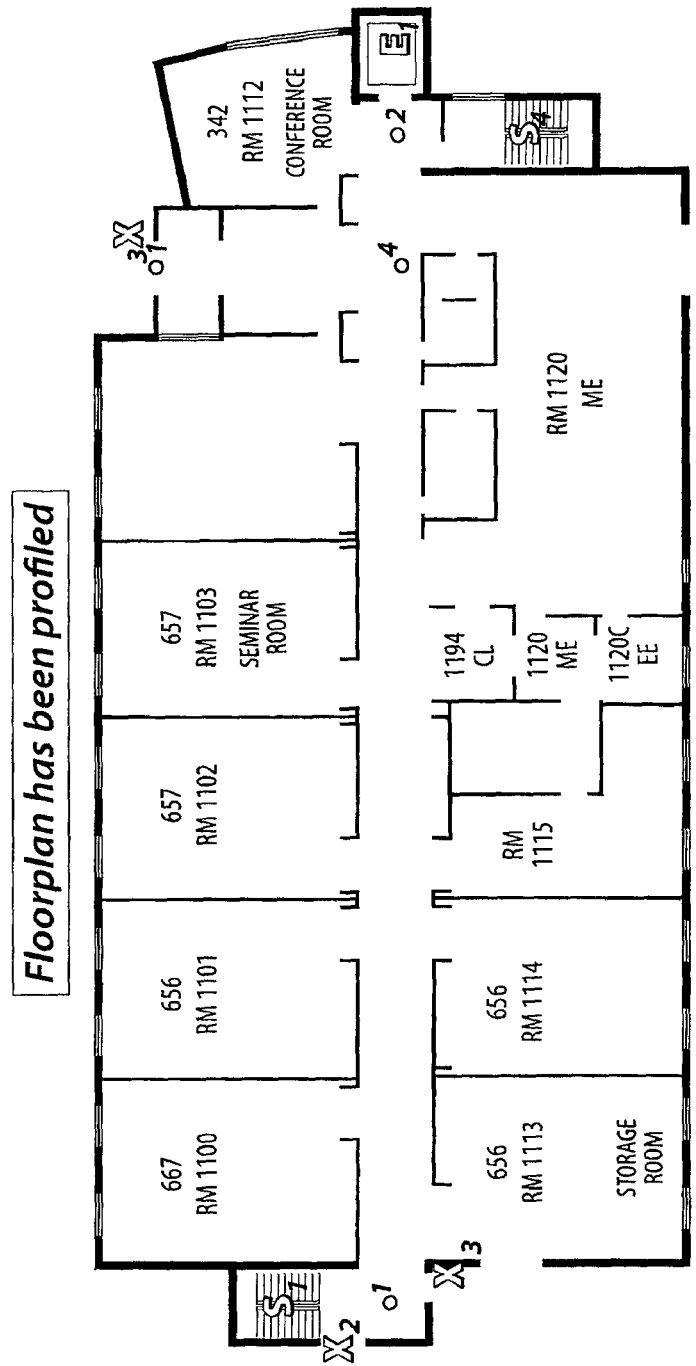
FIG. 34 shows a diagram of the System Map Pre-Processing Feature Detector according to the invention.

Map Pre-Processing and MMF File:
 FIG. 34 shows the Sentinel System Map Pre-Processing (MPP) Feature Detector
 The MPP inputs floor plan images of a building scaled and rotated to each other.
  The floor plans should be of the same size and orientation such that identical features on different floors (ex. Same Stairwell) have the same pixel location on each map.
  Future version of MPP will perform scaling and alignment of floor plans automatically.
 The User is prompted to first click on
  Nodes (Corridor Intersections) in any order (nodes 1, 2, 3 and 4) in FIG. 34
  Stairwell Locations (S1, S2 in green)
  Elevator location (E1 )
  Exit Locations if its an Exit Floor (X1, X2, X3)—Usually first floor, could be 2 or multiple floors
 The MPP then processes the input feature information
 1. Process and Save Node Information
 If two nodes are too close to each other, one is removed (redundant nodes—clicking error)
 Checks for all possible sets of nodes that 'see' each other ('see' implies that their bounding box on the map does not have any black pixel (obstruction). If so, they are part of the same Corridor.
 If all their x or y locations are within a CORRIDOR_WIDTH_THRESH, they are considered to be orthogonal corridors and their constant co-ordinate is made equal. (their constant co-ordinate may be slightly different due to clicking differences) This constant co-ordinate will later be used to correct paths to the corridor. Non-orthogonal nodes are aligned along their best fit line.
 The Corrected Node x, and y positions are stored in a 2-D array NodePositions—First Column-x, Second Column-y, Row Index=NodeId
 Nodes 'seen' by Node are updated in a NodeLinks array, where for each Node (array index) we store a list of all the nodes that share a corridor with it.
 2. Process and Save Corridor Information
 Each unique set of nodes that 'see' each other is a new Corridor. These nodes are sorted in ascending order of their varying coordinate (in orthogonal case
 A CorridorInfo Array is updated where Array Row Index is the CorridorId. In non-orthogonal case will be sorted in the order encountered if moving in the smaller of the two possible map corridor directions (ex. 120 for a corridor aligned 120 & 300)
  The first column entry is the Corridor Start NodeId (Cannot go straight a threshold beyond this node if on this corridor else might be on wrong corridor)
  The second column entry is the Corridor End NodeId (Cannot go straight a threshold beyond this node if on this corridor else might be on wrong corridor
  The third column entry is the SLOPE of the corridor in Map Convention (90 vertical, 0 horizontal on map) Slopes will always be between 0 and 179 since they include directions 180 degrees apart depending on which way personnel is headed.
  The fourth Column onwards is a list of all other Corridor Node Ids encountered while walking from Start Node to End Node on the corridor. These nodes serve as checkpoints for map-matching. All arrays are padded with zeros if different sizes.
  The CorridorSlope could also be saved as a Compass Direction to help associate with fusion Angle, GPS information is required to set this up while Pre Processing or the Map-matching Program will just keep a track of what compass angle the Map 0 degrees represents.
 3. Process and Save StairWell and Elevator Information
 Stairwell/Elevator Locations are saved in an array StairPositions/ElevatorPositions similar to NodePositions.
 A StairLinks/ElevatorsLinks Array contains the list of corridors that are accessible from the stairwell/elevator.

4. Process and Save Exit Information

Exit Locations are saved in an array ExitPositions

An ExitLinks Array contains the list of corridors that are accessible from the Exit.

Each Exit also has an associated GPS location to enable Indoor/Outdoor mapping transitions The MPP prints the floor plan features to the MMF file.

The MMF file is saved as the floor plan file name without extension,_mmf.txt (example. TAPfloor1_mmftxt for TAPfloor.jpg)

Figure 35:
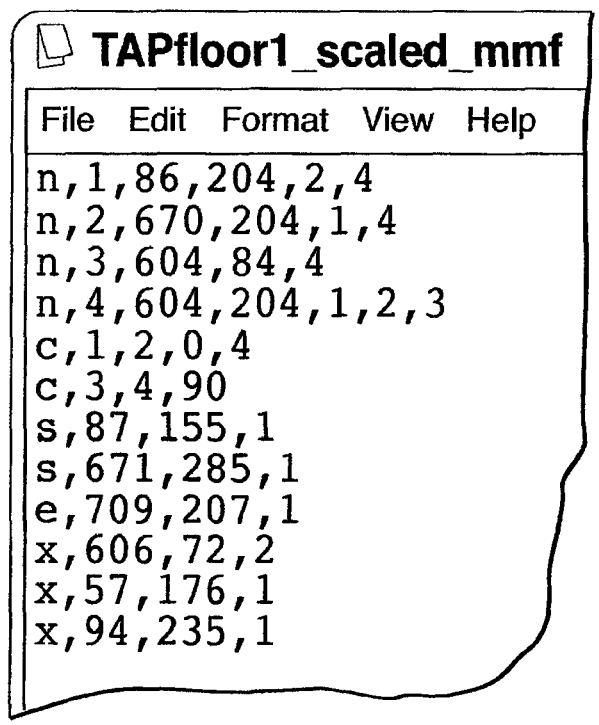
FIG. 35 shows a diagram of a System Map-Matching File according to the invention.

Data Format:
- n, NodeId, NodePositionX, NodePositionY, list of same corridor nodes
- c, Corridor Start Node, Corridor End Node, Slope, Sorted Intermediate-Node List
- s, StairPositionX, StairPositionY, list of corridors
- e, ElevatorPositionX, ElevatorPositionY, list of corridors
- x, ExitPositionX, ExitPositionY, list of corridors
- g, GPSReferenceX, GPSReferenceY, latitude, longitude FIG. 35 shows a Sentinel System Map-Matching File (MMF).

Most floor plans take a few seconds to profile.

The clicking operations can be replaced by pattern recognition techniques.

Map-Matching Algorithm and Program (MMP)

Each set of points that are considered to be inside the building are associated with a Map Matcher which is pre-loaded at the start of the program with all the features of the building and is initialized with the first point to a startpoint on the map and an initial direction. The startpoint is either determined by a click on the GUI for an indoor start, or the last known Outdoor position from the INU-GPS fusion algorithm.

Each following point in Map Matching goes through the following process

Using the previous point information, the magnitude of the current point's increment and the current points heading are determined. If stationery the heading is determined from the gyro angle.

If the best-fit line over the current Segment Number has a deviation less than a threshold the Segment is considered to be possibly on a corridor. Also, if the INU Hall Flag is true, the segment is definitely considered to be on a corridor. The corridor checks are not performed however if the entire segment lies inside a large room, i.e. on white space on a floor plan.

For each point, if the Segment is already matched to a hall, the direction is kept aligned to the chosen hall; if not, the heading is decided to be the gyro angle subject to all previous rotations.

If a new hall may be detected, a loose threshold is set for the INU hall flag, and strict (small) threshold for small straight segments.

For each corridor on the floor a check is performed to see the displacement of the first point on the current segment from the hall, the required rotation to correct it to the hall, and the closest point on the corridor to make the correction to. If the first point in the segment, the first-HallPoint, is within the bounds of the corridor and the correction distance and rotation are below the set thresholds, the point is corrected to the corridor, and all other points on the segment are corrected to the corridor. This is a corridor correction performed when the distance traveled in a straight line is greater than a threshold or the points have been found to go through walls (encounter black pixels)

Last we check to see if the z position is incrementing or decrementing to perform 3D tracking and floor changes. If change in z position (number of stairs encountered, +ve for up, −ve for down) is noticed a stair flag is turned on to indicate a possible floor change. Once the change settles and is zero, the algorithm attempts to resolve this change. If the number of stairs encountered is less than a threshold, dependent on building, the change is ignored. If total number of stairs is divided by the expected number of stairs between each floors to see the number of floors incremented or decremented. If it is the first time this stairwell has been traversed by any personnel the WINDING is recorded. Winding is either clockwise, anti-clockwise, or none looking upwards. When the floor change is confirmed, the closest stairwell on the floor is found and the personnel's current point is corrected to the stairwell exit point. The WINDING later on serves to help resolve floor changes for other personnel. Floor changes close to known stairwells in the WINDING direction mean the personnel is going upstairs, and winding in the opposite direction indicates downward motion.

After all corrections and checks are performed, the difference in the Map direction and gyro prediction is calculated to obtain the current rotation to be used for the next point.

Using the GPS references of the map, the current point on the floor plan is converted go a GPS latitude and longitude to be used for display on the GIS map, and for Indoor/Outdoor transitions.

Map-Building Algorithm

In the absence of Floor Plans of the building, the Sentinel System is capable of building floor plans of the building using the tracking information of all personnel at the scene. More personnel at the scene cause the building to be discovered (mapped) faster. The general shape of the building is obtained from the GIS vectors of the building. As personnel move through the building the points are updated in the same way as in the map-matching case but each feature is now not available before hand, but recorded in real-time.

For each time that a personnel is found walking straight for a long time indicating a corridor, the program checks if there is a corridor close by discovered by some personnel. If there is one, the personnel is corrected to it as in map matching. If the data suggest it to be a new corridor, it is recorded as a new corridor, recording its slope, and its start and end points are set in real-time as discovered.

Each time floor changes on new stairwells are determined, the location of stairs are recorded, with their winding, start and exit points, and used to match floor changes for other personnel depending on proximity of stair detection to existing stairwells.

Events that are hard to resolve such as a short corridor are noted and confirmed by other personnel discovering and confirming the existence of the feature under question.

Distance calculated by the INU is based on stride length as described above. Because there is inherent error in the stride length determination, a correction should be made for long distances. When a command station receives position information from many users walking the same path, user trajectories should vary slightly. The "beaten path" algorithm performs an averaging function on these trajectories to determine the most probable pathway.

Figure 36:
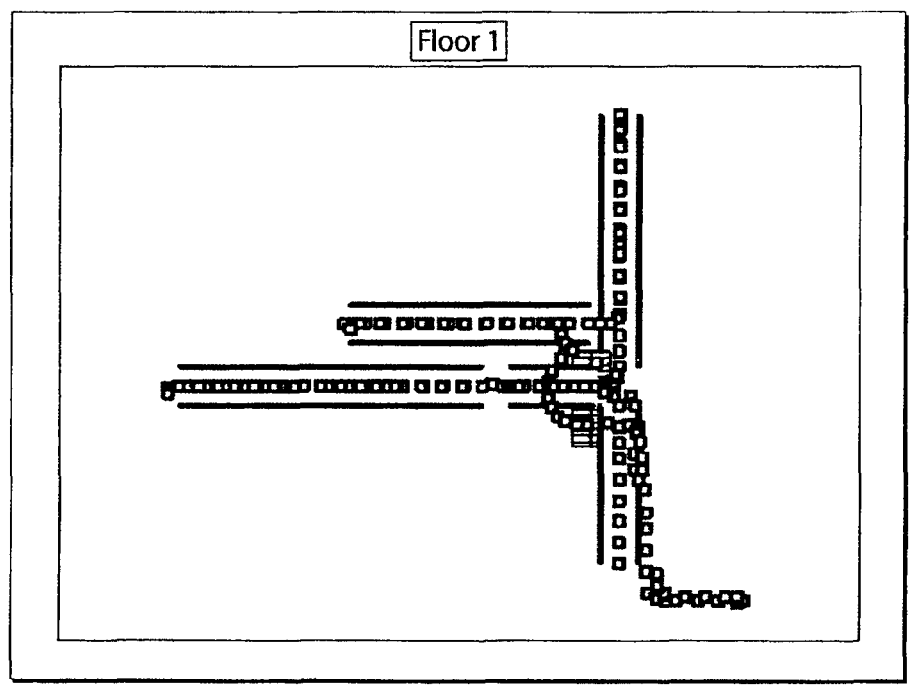
FIG. 36 shows a diagram of a System Map Building for a Building with Stairwell Information according to the invention.
Figure 37:
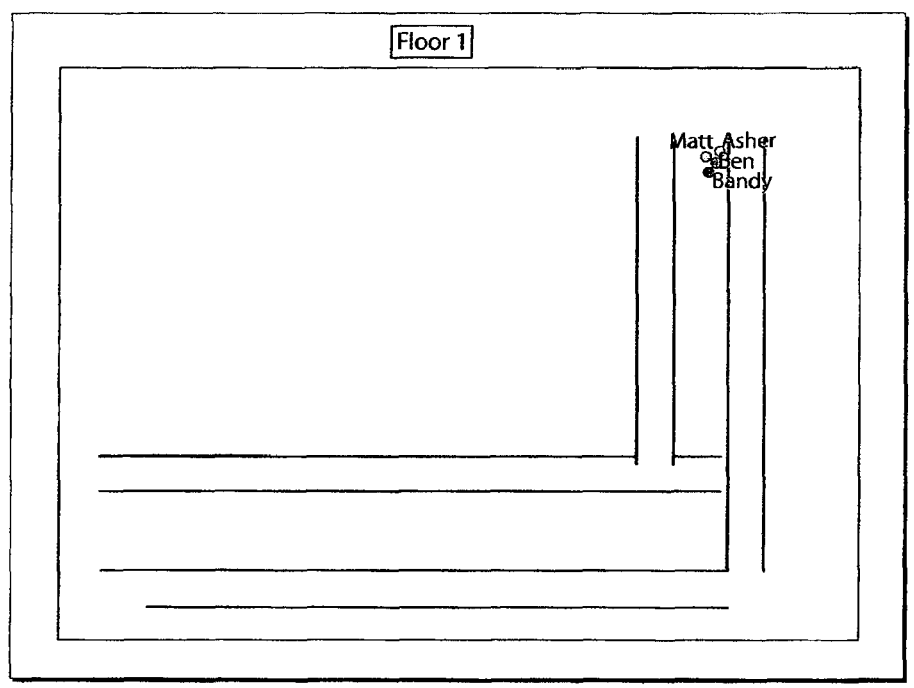
FIG. 37 shows a diagram of a Sentinel System Map Building for a building created by Four Personnel according to the invention.

FIG. 36 shows the Sentinel System Map Building for a Building with Stairwell Information. FIG. 37 shows a Sentinel System Map Building for a building created by tracking the movements of four personnel.

Figure 38:
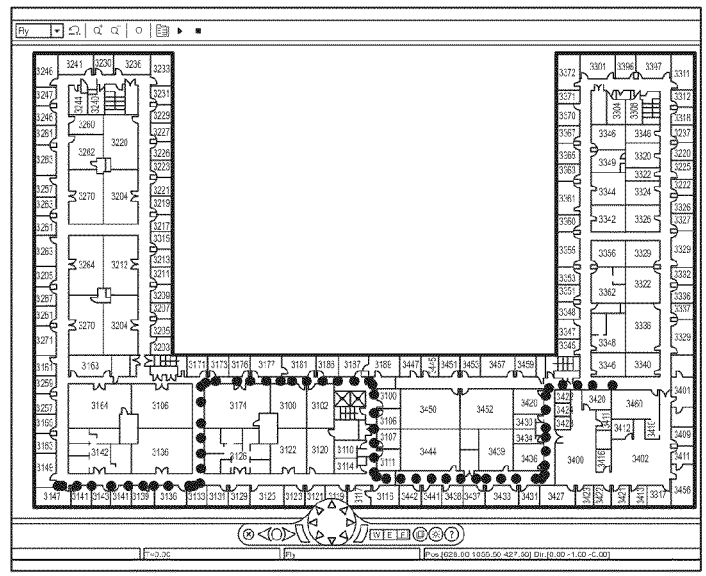
FIG. 38 shows Base station screen image of a part of the path that was shown previously in FIG. 17 above, according to the invention.
Figure 39:
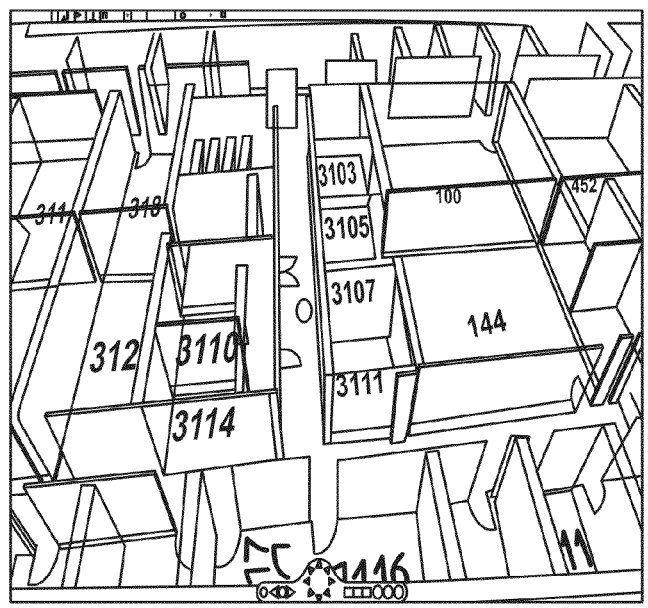
FIG. 39 shows a 3 dimensional view of a portion of the map of FIG. 38 above, according to the invention.

3-D Rendition of Floor Plans 3D renditions of 2D floor plans have been developed to provide Incident Commanders with the real-life representation of their personnel's position in a building for guiding and directing. The 3D mapping can be performed to give a 3D look to rooms and corridors FIGS. 38 and 39 show a Base station screen image of a part of the path that was shown previously in FIG. 17. It is plotted on a floor plan of the building's third floor by the map-matching Virtual Reality software. FIG. 39 shows a 3 dimensional view of a portion of the map.

3-D Building Views 3D views of complete buildings have been generated by taking floorplans of each floor stacked up, one above the other connected by thin columns representing the overall picture of the building in consideration. Clicking on a particular floor results in the complete focus moving onto that floor represented by a detailed floor plan in 2D or 3D. While viewing the points, the user may at any time switch to a 3D representation, where the marker indicating the user is seen from a perspective view as they pass through corridors. This tool allows the incident commander to assess the situation of the user and guide them in a search or exit situation.

INU-GPS Outdoor Fusion Algorithm

The system also tracks personnel outdoors. To achieve outdoor tracking, it is useful to utilize GPS. However, GPS is often not accurate. Often, satellites are not available which causes erroneous location values to be provided by GPS units operating without assistance. In addition to indoors, satellites are often not available in urban canyons, and very close to buildings, causing GPS errors. To compensate for GPS errors during outdoor location, we have developed a location method based on the fusion of GPS and INU data.

GPS-INU Fusion Units, Conventions and Initialization

The outdoor path of personnel can be plotted, for example, on outdoor maps such as GIS maps and Satellite Imagery such as Google Earth and Live Locals maps.

The position estimates for the trajectory for the INU and GPS (or other position sensor) must put in to similar reference frame (initial reference coordinates and scale factor) so that position data can be fused. In this embodiment, the calculated trajectory of the personnel is measured in meter offsets from a GPS Reference Point. This point does not need to be the starting point of a personnel's trajectory but is an arbitrary point in the tracking area to serve as a common reference point for all personnel paths calculated. Using a meter convention also helps correlate the INU rectangular coordinate tracking data to the GPS degree convention.

The system can use the GPS coordinate of a vehicle for example, equipped with GPS as the GPS Reference Point. If this is unavailable, the system can use the first reported GPS coordinate from any mobile unit as the GPS Reference Point. Once the GPS Reference Point is set its own meter based offsets are 0 meters South and, 0 meters East. Each tracking location is then calculated using a map convention, as offsets south and east in meters from the GPS Reference Point. A Latitude Scale and Longitude Scale for the area are then calculated using the latitude and longitude of the GPS Reference Point from the following equations. These scales are used to measure meter distances of incoming points from the reference.

LatitudeScale=560*Cos(ReferenceLatitude*PI/90+PI)+111130) LongitudeScale=LatitudeScale*Cos(ReferenceLatitude*(PI/180))

Storing and Converting GPS and INU Points to Common Units

Figure 40:
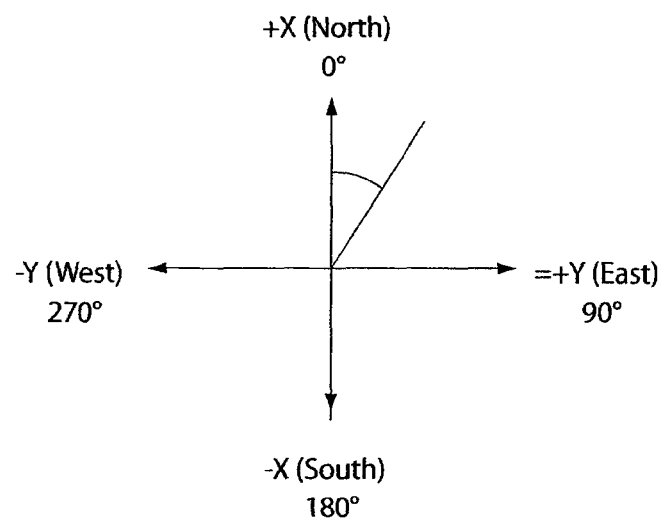
FIG. 40 shows the INU Coordinate system according to the invention.
Figure 41:
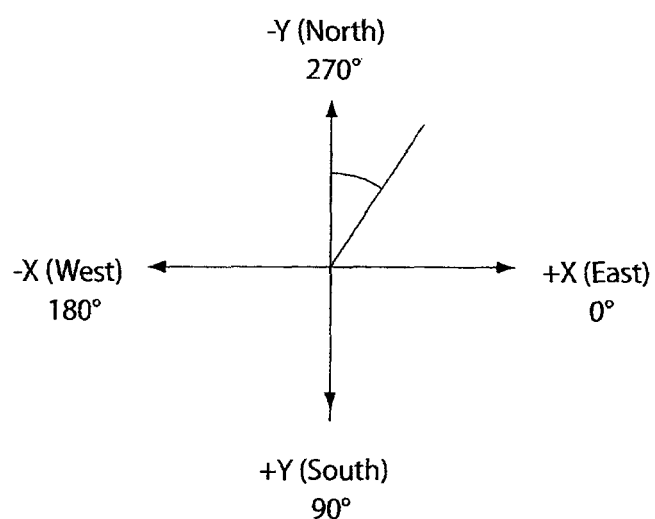
FIG. 41 shows the Display Map Coordinate system according to the invention.

A GPS point (GPSPoint) latitude and longitude degrees received from personnel communication modules is first converted to meter offsets from the GPS Reference Point using the following equations delta_lat=ReferenceLatitude−GPSPointLatitude;

delta_lon=ReferenceLongitude−GPSPointLongitude;

GPSPointMetersS=delta_lat*LatitudeScale;

GPSPointMetersE=−1*delta_lon*LongitudeScale;

An INU Tracking Point is an Offset in X and Y from the start point, say INU_X_raw, INU_Y_raw FIG. 40 Shows the INU Coordinate System. FIG. 41 shows the Display Map Coordinate System.

To convert the tracking points to a mapping convention a 2D rotation (−90) can be applied to INU_X_raw and INU_Y_raw to give the INU_X and INU_Y.

[INU_X INU_Y]=[0 1]×[INU_X_raw][−1 0][INU_Y_raw]

OR

INU_X=INU_Y_raw and INU_Y=−INU_X_raw

INU position can be determined by counting steps and a step length (or distance) can be determined for this purpose. For example, double integration of the accelerations along the direction of travel can be used to determine step length and distance traveled. Alternatively, linear or nonlinear filtering techniques that can reduce the accumulation of error caused by, for example, noisy measurements or other measurement errors, including but not limited to Kalman filtering can be used to determine step length and distance traveled. In addition, a scale factor determined heuristically that varies as a function of individual height can be used to determine step length and distance traveled.

After converting the INU points into a mapping convention, they can be converted to meter based units for direct comparison to the GPS meter offsets. INU_X and INU_Y are in terms of INU units which can be converted to meters by multiplying by scale factor, such as an INUUnit2MeterScaleFactor. This Scale Factor can be determined for a person of average height (5' 9") experimentally and is found to be 0.066. For variations in height an additional HeightScaleFactor can be included to account for the fact that taller people take larger steps and shorter people take smaller steps. The ratio of the height of a given person to the average height used to determine the INUUnit2MeterScaleFactor can be used to determine the Scale Factor for each given person.

Therefore,

INU_X_meters=INU_X*INUUnit2MeterScaleFactor*HeightScaleFactor

INU_Y_meters=INU_Y*INUUnit2MeterScaleFactor*HeightScaleFactor

GPS-INU Fusion Algorithm

The Base Station can be equipped with an Outdoors INU-GPS fusion algorithm to determine the best possible location for personnel outdoors. The INU-GPS information can be transmitted from the INU-CSM units to the base station in the node report. This information can contain only GPS data, only INU data or both GPS and INU, depending on the data available.

If GPS points are coming in without INU Data the best estimate of a person's (animal's or assets') position can be obtained by track smoothing and best-fit lines through the GPS points using the number of satellites, satellite locations, and dilution of precision indicators to assign reliabilities to the GPS If an INU point comes in, the current magnitude can be converted to meters using persons height for scaling. The direction to apply the new point from the previous INU-GPS fusion point can be either the compass angle, if the compass angle is above a reliability threshold and the personnel is not turning. The compass angle is corrected for the Magnetic Declination of the area to align with GPS directions, or the gyro angle subject to all rotations of the previous point if personnel is turning or compass in not reliable The step magnitude (INU_X_meters, INU_Y_meters) and direction can be used to determine the new location from the previous point.

If GPS is available with the current INU information, the algorithms looks back to the last time GPS and INU came in together, compares the meter increments from both estimates computed individually to determine a GPS feedback factor.

Agreement of these increments within a threshold validates the GPS data to be accurate and the new position calculated based on the INU data is pulled towards the GPS data by the GPS feedback factor.

When personnel moves outdoors to indoors, the last INU-GPS fusion position is used to find the closest available exit on the floor plan to initialize map-matching, and the best rotation angle between the current direction and gyro angle is estimated to give map matching an initial direction since map matching follows the gyro angle with an initial rotation due to inaccurate compass data indoors.

When personnel continues indoors Map Matching algorithms are performed, and when personnel exits the building, moves outdoors to indoors, the closest Exit to the last known map-matching point is used as the restart of the outdoor algorithm and the last known heading from MapMatching is used to give the outdoors algorithm its current heading. After leaving the building, the compass reliability improves once away from the building and takes over the heading, and GPS reliability improves once both North and South satellites are visible unobstructed by the building.

The first step of the algorithm can be initializing the start point. In the presence of a high precision GPS unit on a truck or vehicle that drives the personnel (or animals or assets) to the scene, this high precision GPS information can be used as the start point. If none is available, the first GPS point reported by the CSM can be used. Since some reports contain GPS, some INU and some both, it is desirable to sync the GPS and INU using a report which contains both. For each person (animal or asset), if GPS data is being reported without any INU data the GPS-INU Fusion Algorithm can switch to a GPS only algorithm, if INU data is coming in and no GPS has been received, a GPS-INU sync can be awaited or tracking points can be calculated using external GPS data source (e.g., from the vehicle). Once the first GPS and INU tracking point pair are available in the same report, the first Fusion Point can be determined by making the meter offsets of can be rotated from their actual direction, so each Fusion Point can record a the Fusion Point the same as that of the current GPS Point. Also, the INU tracking points HeadingDifferenceMapRaw which holds the angle difference between the map direction of the person (animal or asset) and the INU direction.

Once GPS and INU points are synced up, the first Fusion Point can be determined. The algorithm can build the new Fusion Point using the new GPS and INU points based on the previous Fusion Point. There can be a Fusion Point associated with each INU Point received by the Base Station. The magnitude of the segment joining the current INU Point to the previous INU point can be obtained using the distance formulae on the meter-based INU Points and the raw heading or direction can be obtained by finding the slope of the segment. In case of frequent reporting, the raw heading is expected to be close to the gyro_angle associated with the INU report since the points are based on the gyro_angle. If they are significantly different (e.g. 10%), it signifies either longer periods in between two reported points or fast turns. In either case the path taken by the person (animal or asset) cannot be assumed to be a straight line between the two points. These gyro and compass values can be used to determine the change in direction predicted by the INU since the last calculated Fusion Point. We can use the compass angle if the compass data is reliable (if the compass reliability factor is less than the COMPASS_RELIABLE_THRESHOLD), and if the personnel are not performing many turns (The amount of turning can be determined by the gyro by noting if the difference between gyro_angle and raw heading since last point is not larger than a threshold determined by the gyro (GYRO_RAW_ANGLE_DIFF_THRESHOLD angle)). This threshold can be the reliability above which the compass_angle is not as accurate as desired for tracking. If the above conditions do not hold, the direction can be assumed to be the gyro_angle with all the rotations of the previous point applied to it. The rotation of the previous point from the gyro_angle can be determined the HeadingDifferenceMapRaw associated with the previous point. Once the map direction of the current point is determined the HeadingDifferenceMapRaw for the current point can be calculated as the angle difference between the map direction and the gyro_angle. The magnitude can then be applied in the map direction by the equations:

$$FusionMetersE=FusionMetersE\_prev+FusionMagnitude*\cos(FusionHeading)$$

$$FusionMetersN=FusionMetersN\_prev+FusionMagnitude*\sin(FusionHeading)$$

Use of GPS Correction on Fusion Point if GPS is Available and Accurate

The above step can result in the meter offsets of the Fusion Point from the preivous Fusion Point using the INU prediction. The next step can be to validate the Fusion Point if the GPS point is available to adjust the location estimate. If no GPS information is available, the next tracking information is awaited by the system.

The validity of a GPS location can be performed by several methods, for example:

1) Using GPS parameters such as Dilution of Precision (HDOP), Number of Satellites used, location of satellites used, and signal strength of satellites used.
2) By comaparing the incremental changes in GPS with incremental changes over the same time period in the INU since the INU is more accurate in the short term.
3) Doing both of the above over a memory of GPS points, such as the last five GPS points or all points in the last 5 secs, for example.

GPS tests performed going in and out of buildings, standing outdoors very close to buildings, and near windows inside buildings can be used to analyze the GPS qualifiers. The HDOP can be reported as a number and is expected to be above a threshold when the GPS data was incorrectly reported, though certain bad GPS points were noted for good HDOP readings. Also, it is expected that almost all the GPS points for high HDOP readings are found to be inaccurate, and a HDOP above a threshold can be used to disqualify a GPS point. In addition, the HDOP was found to rapidly increase and then become invalid when personnel went from outdoors to indoors. The number of satellites observed for accurate GPS points was 4 or above and preferrably 5 or 6. Also when the GPS was very close to, or on one side of a building, the satellites in half of the sky are blocked by the building yielding a bias to that side and poor triangulation, resulting in incorrect GPS points displaced towards the satellite bias. Therefore, poor azimuthal distribution of satelites around a GPS receiver, for example, seeing only satelites south of a reciever can yeild disqualified or invalid GPS points.

GPS Sensor Parameters Qualifiers and GPS Memory

Using a combination of the above studied metrics, the GPS can be deemed inaccurate. If the HDOP is above a certain treshold, depending on the module and the number of available satellites is below a threshold (for example 4), and if the satellites visible are not well distributed (for example, all North or South satellites), the GPS can be deemed inaccurate. By keeping the thresholds slightly less strict, accurate GPS corrections can be enforced by adding a GPS memory. Generally, good GPS points come in successively when the person (animal or asset) is in an open area the satellites are not obstructed and inaccurate GPS points are usually received after highly inaccurate GPS sensor parameters are noted, and continues to be so for some time. This appears to be the case because even after the parameters improve, for example, after leaving a building, the first few GPS points are almost always inaccurate irrespective of the values of HDOP etc. Therefore, the GPS correction can be made dependant on the last threshold number of GPS points being qualified as accurate GPS points, resulting in a waiting period to follow GPS after the GPS is deemed to be inaccurate.

GPS comparison with INU

After testing the sensor qualifiers, the incremental distance predicted by the new GPS point from the last GPS point, can be tested against the INU increments predicted between the same two points. Since both incremental distances can be converted to meters, they can be tested to see if the change in increment in one direction (e.g., South) is within a threshold, and the change in the increment an orthogonal direction (e.g., East) is within the same threshold. Since the INU is relatively accurate for short distances, GPS increments (readings) of within 75% of the prior reading can be required in order to feed back the GPS point into the INU-GPS Fusion algorithm. If not, the GPS point can be ignored and next point of the trajectory can be taken from the INU only. Due to GPS fluctuations, using a best fit line through the GPS points for track smoothing can help in increasing the number of GPS points used to correct the path.

Feedback GPS when Qualified as Accurate

When the GPS point is found to be both accurate in sensor parameters, and in comparison to the INU, there are several standard feedback control techniques that can be used control the speed of convergence of the Fusion Point toward the GPS point. These include but are not limited to PID (proportional, integral, derivative) control or adaptive control. In this embodiment we choose to use an adaptive proportional control. A percentage of the difference of the Fusion Point calculated solely using the INU increments from the smoothening GPS point can be fed back to the Fusion Point. This feedback function pulls the Fusion Point towards GPS points that are deemed accurate, and helps correct the track when the INU has caused the tracking to drift away in the absence of GPS. The feedback paramter can be a constant such as 0.2 times the distance, or can be made adaptive on the basis of how long the GPS has been accurate by increasing feedback when GPS is found to be accurate over a long period of time to achieve fast corrections.

$$FusionPointMetersE = FusionPointMetersE + (GPSPointMetersE - FusionPointMetersE) * GPS\_FEEDBACK\_K;$$

$$FusionPointMetersS = FusionPointMetersS + (GPSPointMetersS - FusionPointMetersS) * GPS\_FEEDBACK\_K;$$

Where GPS_FEEDBACK_K is the percent of error from GPS to be fed back for correction Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

```
public void Run( )
{
   while (!_Abort)
   {
      pauseEvent.WaitOne ( );
      Thread.Sleep (_WaitTime);
      byte [ ] toParse = dataLoader.GetRawData ( );
      if (toParse ! = null)
      {
         FireUpdateProgress ( );
         List<DataMessage> readMessages = new List<DataMessage> ( );
         if (Parse(toParse, readMessages))
         {
            foreach (DataMessage toProcess in readMessages)
            {
               StoreDataMessage (toProcess);
               FireNodeUpdate (toProcess);
            }
         }
      }
   }
}
public void StoreDataMessage (DataMessage toStore)
{
   lastCommunication = DataTime.Now;
   Boolean GPSIncludedInMessage = false;
   //Process, Update and Store DataMessage
   lock (dataMessages)
   {
      toStore.PointNumber = dataMessages.Count;
      toStore.ControlNode = this;
      toStore.plotPoint = new PlotPoint (0, 0, this, toStore);
      dataMessages.Add (toStore);
      PointIndicesToShow [1] = dataMessages.Count;
   }
   //Update Voltage, Temp, Inside/Outside And Alarm Information
   CurrentLocation = toStore.INSIDE_OUTSIDE ? toStore.InsideValue : InsideOustsideStatus.Unknown;
   CurrentVoltage = toStore.VOLT ? toStore.VoltValue : -1;
   CurrentTemp = toStore.TEMP ? toStore.TempValue : -1;
   Alarm = toStore.ALARM ? toStore.AlarmValue : false;
   //Create, Process And Store GPS Information If Available
   if (toStore.GPS)
   {
```

-continued

```
GPSData toAdd = new GPSData (toStore);
allGPSDATAPOINTS.Add (toAdd);
if (ValidateGPSData (toAdd) )
{
   GPSLOCKED = true;
   toStore.GPS_VALID = true;
   FormatGPSData (toAdd);
   toAdd.LoadGPSPoint ( );
   toAdd.PointNumber = GPSDataPoints.Count;
   GPSIncludedInMessage = true;
   lock (GPSDataPoints)
   {
      GPSDataPoints.Add (toAdd);
   }
}
}
//Create, Process And Store INU Information If Available
if (!toStore.INU)
MissedINUPoints++;
else (toStore.INU)
{
   MissedINUPoints = 0;
   INUData toAdd = new INUData (toStore);
   BuildMeterBasedPoints (toAdd);
   FormatINUData (toAdd);
   BuildFusionAnglePoints (toAdd);
   toAdd.LoadMeterBasedPoints ( );
   AllINUDATAPOINTS.Add (new INUData (toAdd));
   if (ValidateINUData (toAdd))
   {
      CurrentPosition = toAdd.Position;
      StandStill = toAdd.StillFlag;
      toAdd.PointNumber = INUDataPoints.Count;
      toAdd.FloorNumber = this.CurrentFloor;
      toAdd.GPSValid = GPSIncludedInMessage;
      if (toAdd.GPSValid)
      {
         toAdd.RelatedGPSData = CurrentGPSPosition;
      }
      lock (INUDataPoints)
      {
         INUDataPoints.Add (toAdd);
      }
      INUIncludedInMessage = true;
   }
}
//Create, Process And Store FUSION Information If Avaiable
ProccessGPSINUFusionAlgorithm( );
//Create, Process And Store MAP MATCHING Information If Available
if (CurrentLocation == Inside &&mapMatcher.MapMatcherReady)
{
ProccessGPSINUFusionAlgorithm( );
}
nodeInformationControl.UpdateInformation ( );
}
```

What is claimed is:

1. A computer-implemented method of reducing errors in inertial tracking data, the method being implemented by a computer that includes a physical processor, the method comprising:
  obtaining, as input, tracking data for a trackee at a location, wherein the tracking data includes a collection of position estimates generated based on data obtained from inertial sensors including at least one accelerometer, at least one gyroscope, and at least one magnetic field sensor, and wherein each position estimate includes at least three-dimensional location coordinates;
  calculating a path from the tracking data that tracks the trackee;
  developing one or more location-related sensor profiles from the tracking data;
  inferring one or more building features from the tracking data;
  correcting one or more of the position estimates based on the one or more location-related sensor profiles and the one or more building features to reduce tracking errors associated with the inertial sensors; recalculating the path based on the one or more corrected position estimates; and
  causing the one or more corrected position estimates to be displayed via a graphical user interface associated with the computer.

2. The method of claim 1, wherein the trackee comprises a mobile person or mobile asset.

3. The method of claim 1, wherein the one or more building feature are inferred based on the one or more position estimates.

4. The method of claim 1, wherein the one or more building feature include a known building feature on an image of a floor plan displayed via the graphical user interface.

5. The method of claim 1, further comprising:
  determining that the trackee is moving in a corridor when a number of steps taken by the trackee, as determined from data obtained from the at least one accelerometer, exceeds a threshold value, and when a gyroscope angle obtained from the at least one gyroscope has not exceeded a threshold value.

6. The method of claim 5, wherein the one or more building features includes the corridor.

7. The method of claim 1, further comprising:
  determining that the trackee is moving in a possible stairwell based on detection of an elevation change comprising incrementing or decrementing "z" position values as determined from data obtained from the at least one accelerometer, wherein each "z" position value change corresponds to a stair encountered by the trackee.

8. The method of claim 7, wherein the one or more building features includes the possible stairwell.

9. The method of claim 7, further comprising:
  determining that the trackee has started moving in the possible stairwell based on a change in the "z" position value; and
  determining that movement in the possible stairwell has ended when the change in the "z" position value is zero over a threshold period.

10. The method of claim 7, further comprising:
  ignoring a total change in "z" position over the possible stairwell if the number of stairs encountered is less than a threshold.

11. The method of claim 7, further comprising:
  resolving elevation change data into floor numbers of a building by comparing the number of stairs counted to an expected number of stairs between floors in the building.

12. The method of claim 7, further comprising:
  recording the winding of the possible stairwell, the winding being either clockwise, counter clockwise, or straight.

13. The method of claim 1, further comprising:
  determining different types of movement of the trackee, utilizing a neural network as a pattern recognition tool, based on data obtained from one or more of the at least one accelerometer, the at least one gyroscope, or the at least one magnetic field sensor.

14. The method of claim 13, further comprising:
  obtaining, by the neural network, input comprising training data obtained when the trackee has moved on the path including level ground, up stairs, and down stairs.

15. The method of claim 13, further comprising:
classifying, by the neural network, each individual step taken by the trackee as either being on level ground, up a stair, or down a stair.

16. The method of claim 15, further comprising:
classifying, by the neural network, each individual step based on a shape of a signal obtained from the at least one accelerometer for each individual step.

17. The method of claim 16, further comprising:
measuring the shape of the signal between two consecutive heel strikes.

18. The method of claim 15, further comprising:
obtaining a stair count of each individual step taken by the trackee if the step is up a stair or down a stair.

19. A non-transitory computer-readable storage medium comprising executable code for reducing errors in inertial tracking data, the computer executable code, when executed by one or more processors, causing the one or more processors to:
obtain, as input, tracking data for a trackee at a location, wherein the tracking data includes a collection of position estimates generated based on data obtained from inertial sensors including at least one accelerometer, at least one gyroscope, and at least one magnetic field sensor, and wherein each position estimate includes at least three-dimensional location coordinates;
calculate a path from the tracking data that tracks the trackee;
develop one or more location-related sensor profiles from the tracking data;
infer one or more building features from the tracking data;
correct one or more of the position estimates based on the one or more location-related sensor profiles and the one or more building features to reduce tracking errors associated with the inertial sensors;
recalculate the path based on the one or more corrected position estimates; and
cause the one or more corrected position estimates to be displayed via a graphical user interface associated with the computer.

20. The method of claim 1, wherein the at least one magnetic field sensor measures a magnetic field as a function of position, and wherein the location-related sensor data profile is a magnetic sensor data profile comprising a specific magnetic field distribution associated with a specific location.

21. The method of claim 20, wherein the specific location is an indoor location.

22. The method of claim 20, wherein the magnetic sensor data profile is one of a plurality of magnetic sensor data profiles stored in a database.

* * * * *